United States Patent
Xin et al.

(10) Patent No.: US 11,716,784 B2
(45) Date of Patent: Aug. 1, 2023

(54) RTA INTERFACE BETWEEN MAC AND APP LAYER

(71) Applicant: SONY GROUP CORPORATION, Tokyo (JP)

(72) Inventors: Liangxiao Xin, San Jose, CA (US); Mohamed Abouelseoud, San Francisco, CA (US); Kazuyuki Sakoda, Campbell, CA (US)

(73) Assignee: SONY GROUP CORPORATION, Tokyo (JP)

( * ) Notice: Subject to any disclaimer, the term of this patent is extended or adjusted under 35 U.S.C. 154(b) by 46 days.

(21) Appl. No.: 16/998,569

(22) Filed: Aug. 20, 2020

(65) Prior Publication Data
US 2021/0195683 A1 Jun. 24, 2021

Related U.S. Application Data

(60) Provisional application No. 62/952,681, filed on Dec. 23, 2019.

(51) Int. Cl.
*H04W 24/10* (2009.01)
*H04W 4/70* (2018.01)
(Continued)

(52) U.S. Cl.
CPC ............. *H04W 80/12* (2013.01); *H04W 4/70* (2018.02); *H04W 24/10* (2013.01); *H04W 76/18* (2018.02); *H04W 80/02* (2013.01); *H04W 84/12* (2013.01)

(58) Field of Classification Search
CPC ......... H04W 24/10; H04W 4/70; H04W 4/80; H04W 76/18; H04W 80/02; H04W 80/12; H04W 24/04; H04W 84/12
See application file for complete search history.

(56) References Cited

U.S. PATENT DOCUMENTS

| | | | |
|---|---|---|---|
| 7,742,429 B1 | 6/2010 | Huang | |
| 2006/0039281 A1* | 2/2006 | Benveniste | ....... H04W 28/0284 370/230 |
| 2006/0262769 A1* | 11/2006 | Ganz | ................. H04W 72/1236 370/449 |

OTHER PUBLICATIONS

Avdotin, Evgeny et al., "OFDMA Resource Allocation for Real-Time Applications in IEEE 802.11ax Networks", 2019 IEEE International Black Sea Conference on Communications and Networking (BlackSeaCom), Sochi, Russia, 2019, pp. 1-3, doi: 10.1109/BlackSeaCom.2019.8812774.IEEE, downloaded from arXiv:1909.00603v1 [cs.NI], published online Sep. 2, 2019.

(Continued)

*Primary Examiner* — Melvin C Marcelo
*Assistant Examiner* — Natali Pascual Peguero
(74) *Attorney, Agent, or Firm* — O'Banion & Ritchey LLP; John P. O'Banion

(57) ABSTRACT

A Real-Time Application (RTA) interface between the Medium Access Control (MAC) and Application (APP) layers of interworking communications in the OSI model for use in wireless local area networks (WLANs). The interface between MAC and APP layers can be utilized for RTA packets, while non-RTA packets can still use the regular OSI model. In initializing a new RTA session the APP layer communicates a set of requirements to the MAC layer. The MAC layer monitors the channel and measures key performance indicators (KPIs) and either accepts or rejects the request. The interoperability between the APP and MAC layers provide enhanced abilities to reduce RTA packet latencies, as well as other benefits.

24 Claims, 43 Drawing Sheets

(51) Int. Cl.
*H04W 76/18* (2018.01)
*H04W 80/02* (2009.01)
*H04W 80/12* (2009.01)
*H04W 84/12* (2009.01)

(56) References Cited

OTHER PUBLICATIONS

Kiszka, Jan et al., "RTnet—A Flexible Hard Real-Time Networking Framework", 10th IEEE Conference on Emerging Technologies and Factory Automation, Catania, Italy, Sep. 19-22, 2005, pp. 1-9.
Advotin, Evgeny et al., "Enabling Massive Real-Time Applications in IEEE 802.11be Networks," 2019 IEEE 30th Annual International Symposium on Personal, Indoorand Mobile Radio Communications (PIMRC), Istanbul, Turkey, 2019, pp. 1-6, doi: 10.1109/PIMRC.2019.8904271.

* cited by examiner

RTA KPI measure request frame 830

| Frame Control | Duration | RA | TA | Action | RTA KPIs Measure Method | RTA KPI Report Method | FCS |

FIG. 32

RTA KPI measure report frame 850

| Frame Control | Duration | RA | TA | Action | RTA KPI Measure Report | FCS |

FIG. 33

Bandwidth Measure Request 870

| Measure Code | Start Time | End Time | Timeout |

FIG. 34

| Bandwidth Measure Report | Measure Code | Channel bandwidth measure time | Best throughput MCS | PER of Best throughput MCS | Second best throughput MCS | PER of Second best throughput MCS |

890

| Best probability MCS | PER of Best probability MCS | Average channel access delay | Deviation of channel access delay | Transmission time | Estimated channel bandwidth |

FIG. 35

Packet Transmission Latency Measure Method

| Measure Code | Start Time | End Time | Timeout |
|---|---|---|---|

Packet Transmission Latency Measure Report

| Measure Code | Avg. transmission latency | jitter | Max transmission latency |
|---|---|---|---|

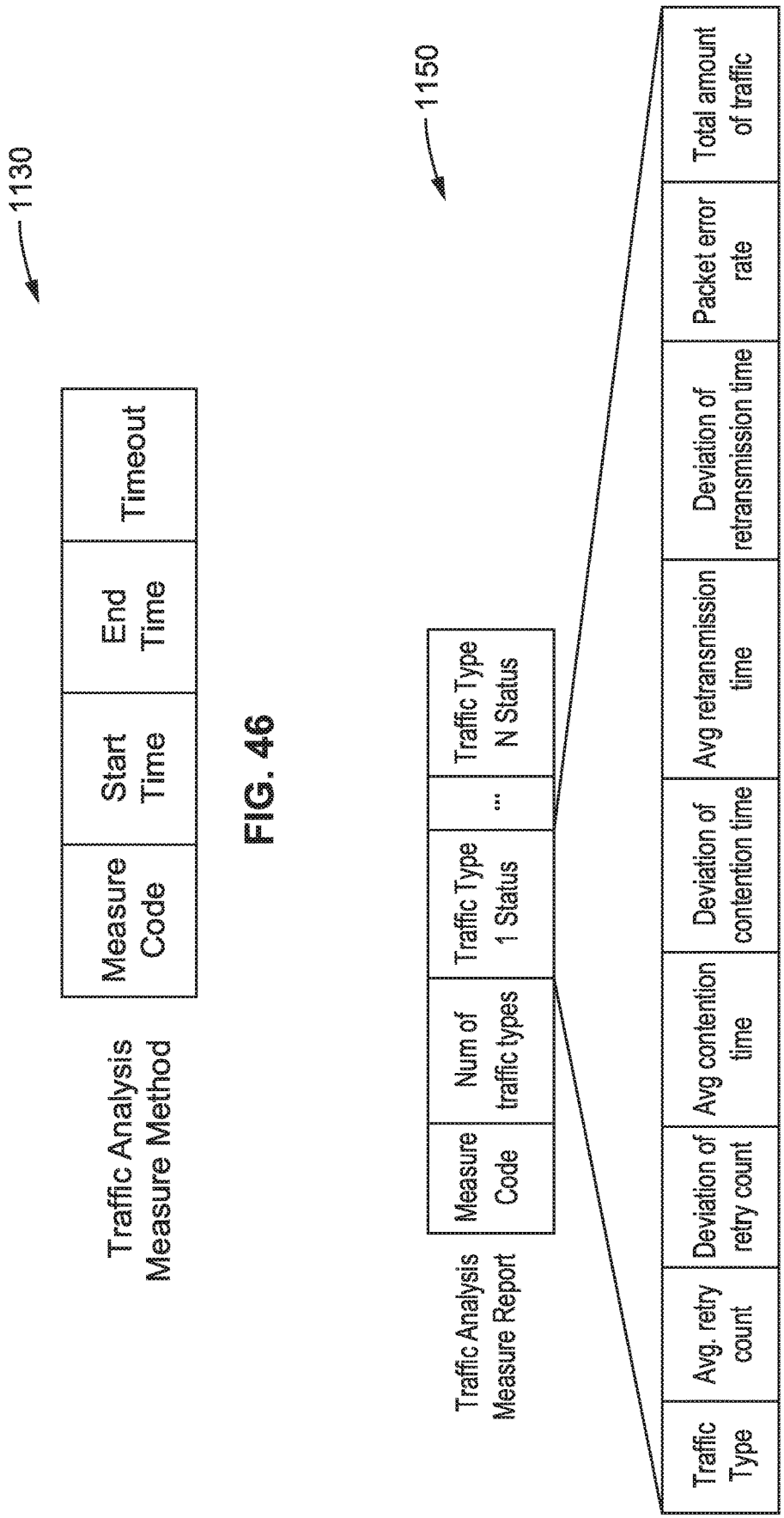

RTA INTERFACE BETWEEN MAC AND APP LAYER

CROSS-REFERENCE TO RELATED APPLICATIONS

This application claims priority to, and the benefit of, U.S. provisional patent application Ser. No. 62/952,681 filed on Dec. 23, 2019, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communications, and more particularly to implementing a specific Real-Time Application (RTA) interface between the Medium Access Control (MAC) and Application layers of a wireless communication device protocol.

2. Background Discussion

Current wireless technologies using the Open Systems Interconnection (OSI) model, such as the IEEE 802.11 protocols, do not provide low latency capability. However, a wide range of applications, such as real time applications (RTA), require low latency.

RTAs require low latency communication and use best effort communication. The data generated from the RTA is called RTA traffic and is packetized as an RTA packet at the transmitter station (STA). Conversely, the data generated from a non-time sensitive application is referred to herein as non-RTA traffic and will be packetized as a non-RTA packet at the transmitter STA.

The RTA packet requires low latency due to its high timeliness requirement on packet delivery. The RTA packet is only valid if it is delivered within a certain period of time. To achieve this requirement, new communication functions are required in the OSI model, as well as the interworking communication between the network layers.

OSI is a conceptual model defined by the International Organization for Standardization (IOS) to establish telecommunication between various computing systems with standard communication protocols. Typically, OSI consists of seven layers, application (APP) layer, presentation layer, session layer, transport layer, network layer, data link layer, and physical layer. Those layers are used to define and standardize the functions utilized in various forms of communications. When two systems share the same communication protocol at the same layers, they are able to exchange information between each other.

When communication occurs, each layer provides service to the layer above it and requests service from the layer below it. Therefore, the interworking communication between the network layers in the OSI model is utilized for enabling these services.

IEEE 802.11 protocols define the standard communication protocols at the data link (i.e., MAC) and physical (i.e., PHY) layers. The current 802.11 protocols only focus on obtaining throughput performance of the wireless networks. However, the latency performance of the wireless networks is not considered and this is problematic for RTAs. When the network transmits RTA packets they are typically only valid for a certain period of time, it requires the APP layer and the MAC layer to establish the interworking communication to control and monitor the traffic transmission within that time, thus a measure of control over packet latency is required.

Existing technologies do not meet the timeliness requirement of the RTA packet and are not directed toward minimizing RTA packet transmission latency.

Accordingly, a need exists for enhanced latency control of RTA packet traffic in WLAN system. The present disclosure fulfills that need and provides additional benefits over previous technologies.

BRIEF SUMMARY

The current wireless communication systems of IEEE 802.11 do not identify the RTA packet and non-RTA packet. All the packets use the same OSI model. The current OSI model of IEEE 802.11 does not characterize or standardize the functions of low latency communication for RTA packets. IEEE 802.11 standards at this time do not address controlling the latency to which an RTA packet is subjected. The lack of these functions makes the current IEEE 802.11 protocols unable to satisfy the low latency requirements of RTA packets.

To satisfy the low latency requirement of RTA traffic, the present disclosure describes distinguishing RTA packets and provides a beneficial RTA interface between the Medium Access Control (MAC) and Application (APP) layers which are part of interworking communications in the OSI model.

The task of creating an RTA interface between MAC and APP layers is more challenging due to the coexistence of RTA traffic and non-RTA traffic on the network. The challenge in this process can be summarized as: (a) identifying and distinguish between RTA packets and non-RTA packets; (b) designing new interworking communications between network layers to support low latency requirements of RTA packets; and (c) allowing RTA packets to use the new interworking communications for obtaining low latency service, while non-RTA packets can utilize existing interworking communications to benefit from a high throughput service.

The RTA interface between MAC and APP layers aims to consider the time-validity of RTA traffic and provide possible low latency service by interworking communication where RTA and non-RTA traffic coexist in a wireless network.

It is possible that several functions of low latency communication will be characterized and standardized at the MAC or PHY layer. In order to enable those functions in the OSI model of IEEE 802.11, a new interworking communication between the network layers of the OSI model is necessary.

The RTA traffic is primarily concerned with end-to-end latency, which is the time between when the traffic is generated at the APP layer of the transmitter and the time that the traffic is received at the APP layer of the receiver. Therefore, it is beneficial to allow the APP layer to have some capability to control and monitor the MAC layer functions for RTA traffic.

The present disclosure teaches an RTA interface between MAC and APP layers as a part of interworking communication in the OSI model for RTA packets, while non-RTA packets can still use the regular OSI model. The present disclosure may be applied to IEEE 802.11, and more preferably IEEE 802.11be and beyond.

The RTA interface between MAC and APP layers allows the APP layer to manage the RTA session at the MAC layer. Often, an RTA generates traffic periodically, in the manner of connection-oriented communications. RTA connection-oriented communication established by an application between STAs is called an RTA session. It is possible that a station (STA) can have multiple RTA sessions in the network. The APP is able to manage those RTA sessions properly by using the disclosed interface between the MAC and APP layers.

The RTA interface between the MAC and APP layers allows the APP layer to manage the RTA queues at the MAC layer. The APP layer is able to send commands to set the parameters of the RTA queue through the RTA interface. The interface also allows the MAC layer to report RTA queue status to the APP layer.

The RTA interface between the MAC and APP layers allows the APP layer to measure RTA Key Performance Indicators (KPIs) at the MAC and PHY layers. The APP layer sends an RTA KPI measurement request to the MAC layer and the MAC layer reports the KPI measurement results to the APP layer through the RTA interface.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 32 is a data field diagram of an RTA Key Performance Indicator (KPI) measure request frame format according to at least one embodiment of the present disclosure.

FIG. 33 is a data field diagram of an RTA Key Performance Indicator (KPI) measurement report frame format according to at least one embodiment of the present disclosure.

FIG. 34 is a data field diagram of an RTA Key Performance Indicator (KPI) measurement method field format for channel bandwidth measure according to at least one embodiment of the present disclosure.

FIG. 35 is a data field diagram of an RTA KPI Key Performance Indicator (KPI) measurement report field format for channel bandwidth measurement according to at least one embodiment of the present disclosure.

FIG. 46 is a data field diagram of a RTA KPI measurement method field format for traffic analysis according to at least one embodiment of the present disclosure.

FIG. 47 is a data field diagram of a RTA KPI measurement report field format for traffic analysis according to at least one embodiment of the present disclosure.

Figure 1:
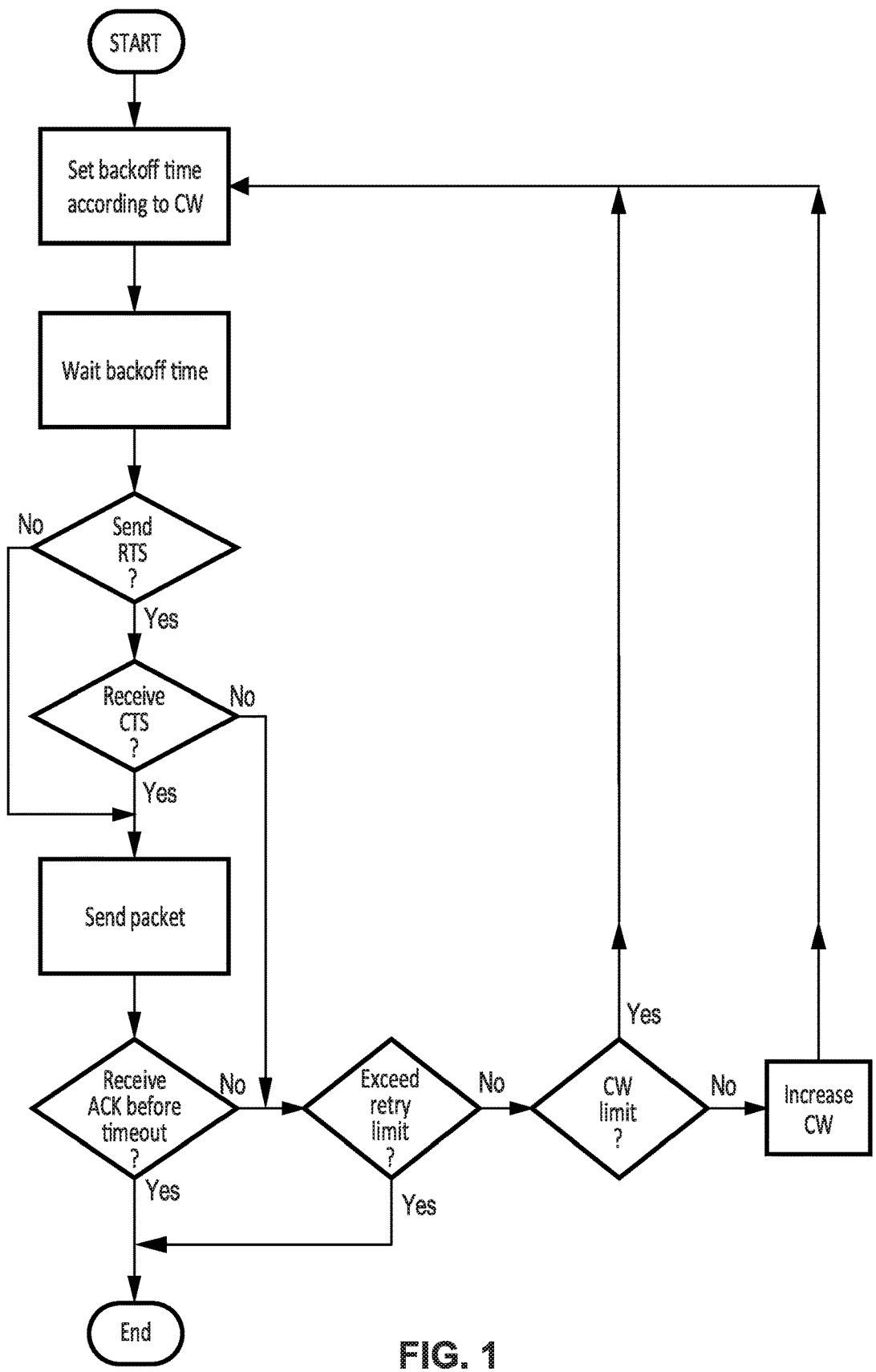
FIG. 1 is a flow diagram of conventional contention-based channel access in Carrier Sense Multiple Access (CSMA)/Collision Avoidance (CA).

DETAILED DESCRIPTION 1. 802.11 WLAN System Introduction 1.1. CSMA/CA Operation FIG. 1 depicts the details of a WLAN system under IEEE 802.11 using Carrier Sense Multiple Access/Collision Avoidance (CSMA/CA) to allow stations (STAs) to have random access to the channel for packet transmission and retransmission. In a CSMA/CA system, the STA senses the channel for transmission when there is data to be transmitted. Before each transmission and retransmission, the STA must sense the channel and set (wait) a backoff time to contend for channel access.

The backoff time is decided by a uniform random variable between zero and the size (duration) of the contention window. After the STA waits for the backoff time and senses that the channel is idle, it decides whether to send an RTS frame to ensure channel occupancy or not. If the STA sends an RTS frame, the channel occupancy is ensured when it receives a CTS frame, at which time the STA sends the packet. If the STA does not send an RTS frame, it may in some cases send the packet directly. A retransmission is required if the CTS frame is not received after sending the RTS frame, or if the STA does not receive the ACK before timeout. Otherwise, if the CTS frame is received the transmission has succeeded. When retransmission is required, the STA checks the number of retransmissions of the packet, and if the number of retransmissions exceeds the retry limit, then the packet is dropped, and no retransmission is scheduled; otherwise, retransmission is scheduled. If the retransmission is scheduled, then another backoff time is needed to contend for channel access for retransmission. If the size of the contention window has not reached the upper limit, the STA increases it. The STA sets another backoff time, depending on the new size of the contention window, and waits the backoff time for retransmission and this process continues.

Figure 2:
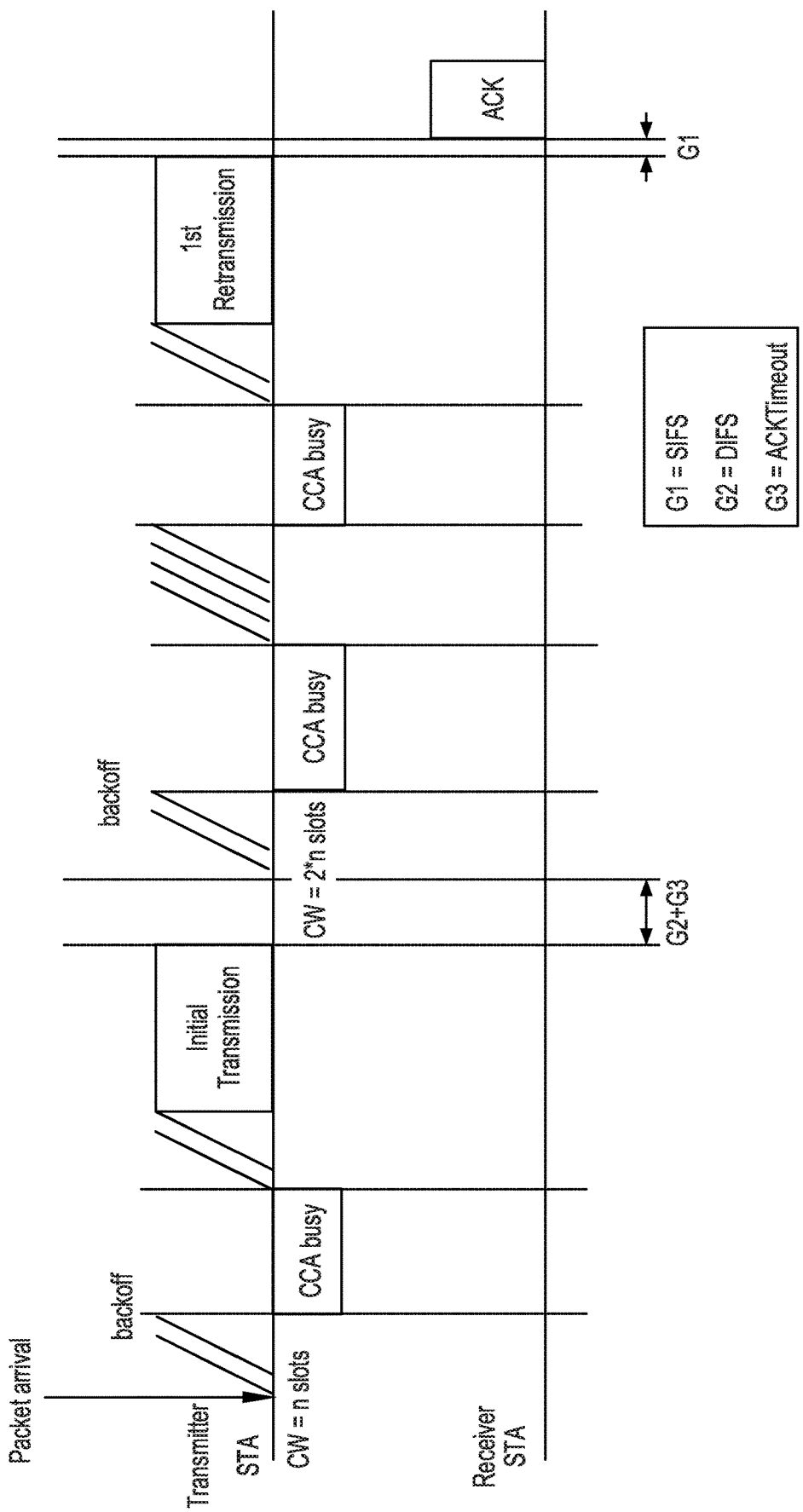
FIG. 2 is a signaling diagram showing packet transmission in CSMA/CA when ReadyToSend/ClearToSend (RTS/CTS) is disabled.

FIG. 2 illustrates an example of random channel access between a transmitting station and a receiving station under CSMA/CA in which RTS/CTS is disabled. When the MAC layer of the transmitter STA receives the data from its upper layers, it contends to gain channel access. When the transmitter STA contends for the channel, it has to wait until a backoff time, whereby the size of the contention window is "n" slots (CW=n slots), which it counts down to zero during backoff. The count-down process is interrupted (i.e., the Clear Channel Assessment (CCA) indicates busy) when another packet transmission occurs over the channel. After the transmitter STA gains channel access for transmitting data, it packetizes the data into a packet and transmits the packet over the channel. As shown in the figure, if the initial transmission of the packet fails, a retransmission of the packet is required. The transmitter STA sets another backoff time to contend for channel access. This time, the size of the contention window is doubled, which is 2*n slots (CW=2*n slots), due to this being a retransmission. The expected backoff time is also doubled by the contention window size. When the backoff time is longer, there is an increased probability that the count-down process will be interrupted (i.e., CCA busy) by another packet transmission. The figure shows that after an initially failed transmission and then contending for the channel three times that it finally performs a $1^{st}$ retransmission which succeeds when it receives an ACK.

The figure also depicts the timing with SIFS, DIFS and ACK Timeout. G1 in the figure represents a Short Interframe Spacing (SIFS), which is the time interval required by a wireless device in between receiving a frame and responding to the frame. The Distributed Coordination Function (DCF) protocol controls access to the physical medium in which a station must sense the status of the wireless medium before transmitting. If it finds that the medium is continuously idle for a DCF Interframe Space (DIFS) duration, it is then permitted to transmit a frame. If the channel is found busy during the DIFS interval, the station should defer its transmission. The figure represents DIFS as G2. It will be noted that conventional DIFS is calculated as DIFS=SIFS+ (2*Slot time). G3 represents the ACK Timeout interval which is the time allowed for the acknowledgement of transmission to be received before it is assumed a transmission error has occurred.

1.2. EDCA Queue System

Figure 3:
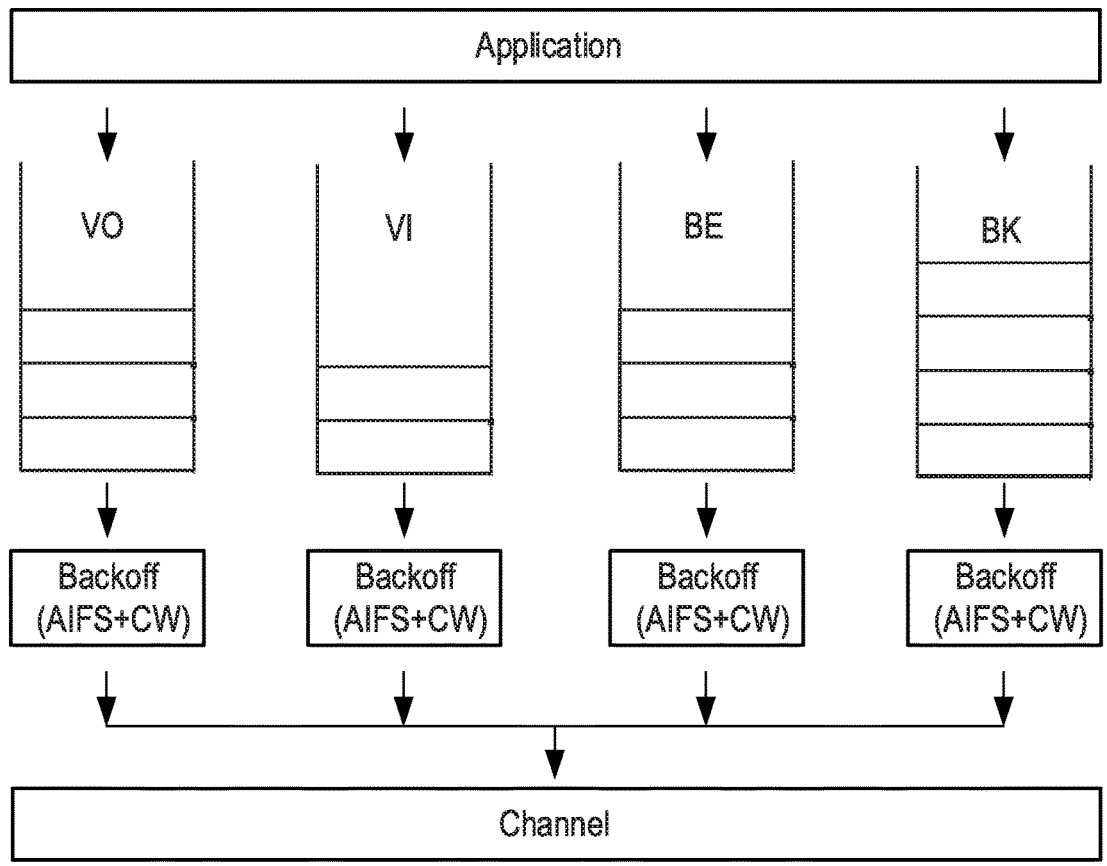
FIG. 3 is a data flow diagram of an Enhanced Distributed Channel Access (EDCA) queue system.

FIG. 3 depicts a WLAN Enhanced Distributed Channel Access (EDCA) queue system. In WLAN systems, IEEE 802.11 uses an EDCA protocol to classify packets into different Access Categories (AC), with each AC representing a different priority of the traffic. A STA maps all the packets into different ACs and pushes them into independent queues with respect to the ACs.

The reference implementation model of the queue system using the EDCA protocol is shown in the figure, in which are seen four ACs, such as voice (VO), video (VI), best-effort (BE), and background (BK), with the priority reducing from the left to the right. Each AC has an independent queue to manage the order of packet transmission. Each queue relies on the random channel access mechanism based on CSMA/CA to gain channel access. Depending on traffic priority of the AC, the backoff time differs for each queue to gain channel access. When traffic priority of the AC is higher, the average backoff time for the queue of that AC is shorter. Therefore, the packet in the queue of the higher priority AC has a higher probability to gain channel access earlier than the packet in the queue of a lower priority AC.

2. Problem Statement

The current wireless communication systems of IEEE 802.11 does not identify and distinguish between RTA packets and non-RTA packets, with all the packets being handled according to the same traditional OSI model, that did not specifically address latency issues of RTA packets. At this time the current OSI model of IEEE 802.11 does not characterize or standardize the functions of low latency communication for RTA packets. The lack of those functions means that the current IEEE 802.11 protocols cannot satisfy the low latency requirements of RTA packets.

3. Inventive Contributions

Toward supporting low latency communication several functions are described herein for being characterized and standardized at the MAC or PHY layer. In order to enable those functions in the OSI model of IEEE 802.11, a change to the interworking communication model between the network layer of OSI model is needed.

In RTA traffic a very important factor is end-to-end latency, which is the time between the time traffic is generated at the APP layer of the transmitter and the time that traffic is received at the APP layer of the receiver. Therefore, it is beneficial to allow the APP layer to have some capability to control and monitor the MAC layer functions for the RTA traffic.

The present disclosure describes an RTA interface between the MAC and APP layers as part of interworking communications in the OSI model for RTA packets, while non-RTA packets can still rely on the elements of a traditional (regular) OSI model.

The RTA interface between the MAC and APP layers allows the APP layer to manage the RTA session at the MAC layer. Often, RTAs generate traffic periodically, as a form of connection-oriented communication. RTA connection-oriented communications established by an application between STAs is called an RTA session. It is possible that a STA can have multiple RTA sessions in the network. The APP is able to manage those RTA sessions properly by using the disclosed interface between MAC and APP layers.

The RTA interface between MAC and APP layers allows the APP layer to manage the RTA queues at the MAC layer. The APP layer is able to send commands to set the parameters of the RTA queue through the RTA interface. The interface also allows the MAC layer to report RTA queue status to the APP layer.

The RTA interface between the MAC and APP layers allows the APP layer to measure the RTA Key Performance Indicators (KPIs) at the MAC and PHY layers. The APP layer sends an RTA KPI measurement request to the MAC layer and the MAC layer reports the KPI measurement results to the APP layer through the RTA interface.

4. Hardware Embodiment 4.1. Station (STA) Hardware Configuration

Figure 4:
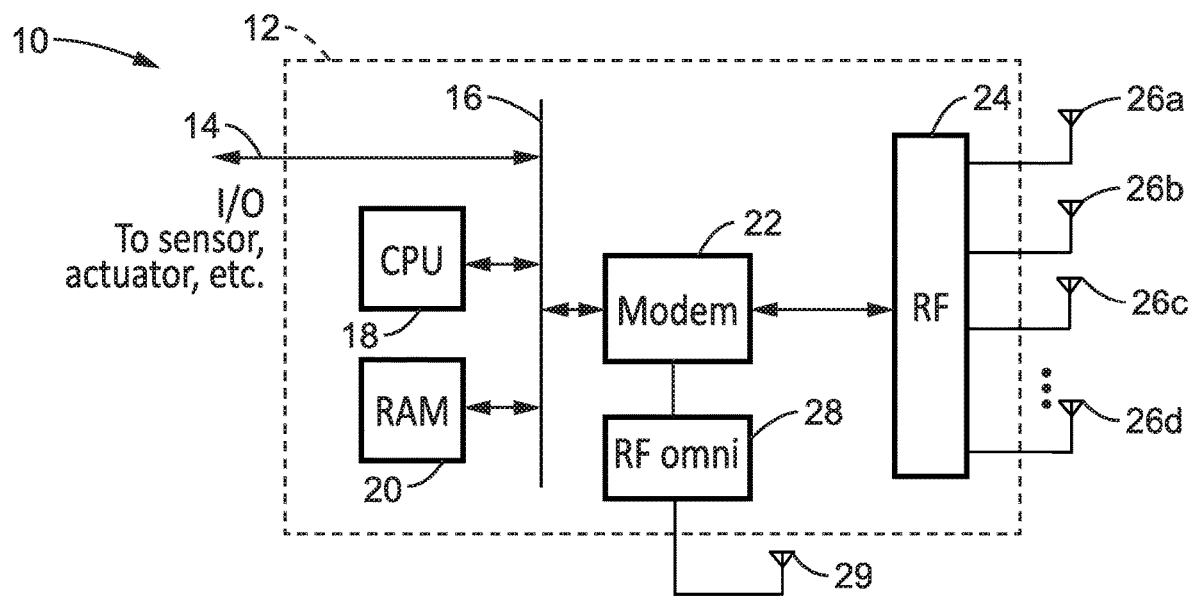
FIG. 4 is a block diagram of wireless mmW communication station hardware as utilized according to at least one embodiment of the present disclosure.

FIG. 4 illustrates an example embodiment 10 of a WLAN station according to the present disclosure. An I/O path 14 is shown into circuit block 12 which has a bus 16 connected to at least one computer processor (CPU) 18, memory (RAM) 20, and at least one modem 22. Bus 14 allows connecting various devices to the CPU, such as to sensors, actuators and so forth. Instructions from memory 20 are executed on processor 18 to execute a program which implements the communication protocol, which are executed to allow the STA to perform the functions of an access point (AP) station or a regular station (STA). It should also be appreciated that the programming is configured to operate in different modes (source, intermediate, destination, first AP, other AP, stations associated with first AP, stations associated with other AP, coordinator, coordinatee and so forth), depending on what role it is playing in the current communication context.

This host machine is shown configured with at least one modem and RF circuit. By way of example and not limitation, a mmW modem 22 is coupled to at least one radio-frequency (RF) circuit 24 which connects to a plurality of antennas 26a, 26b, 26c through 26n (e.g., antenna array) to transmit and receive frames with neighboring STAs. The combination of processor, modem and RF circuits, allow beamformed (directional) communications to be supported, as well as for supporting quasi-omni (referred to herein simply as omni) mode transmissions from the antenna array. In addition, in at least one preferred embodiment nulls can be generated in directional patterns created by the antenna array to shield select directions (sectors) and thus reduce interference between stations. The example also depicts modem 22 coupled to an omni-directional RF circuit 28 and antenna 29.

Thus, the STA HW is shown configured with at least one modem, and associated RF circuitry for providing communication on at least one band. By way of example and not limitation the intended directional communication band is implemented with a mmW band modem and its associated RF circuitries for transmitting and receiving data in the mmW band. In some implementations another band can be supported in hardware, generally referred to as a discovery band, which by way of example and not limitation may comprise a sub-6 GHz modem and its associated RF circuitry for transmitting and receiving data in the sub-6 GHz band.

It should be appreciated that the present disclosure can be configured with multiple modems 22, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

4.2. Illustrative Topology

Figure 5:
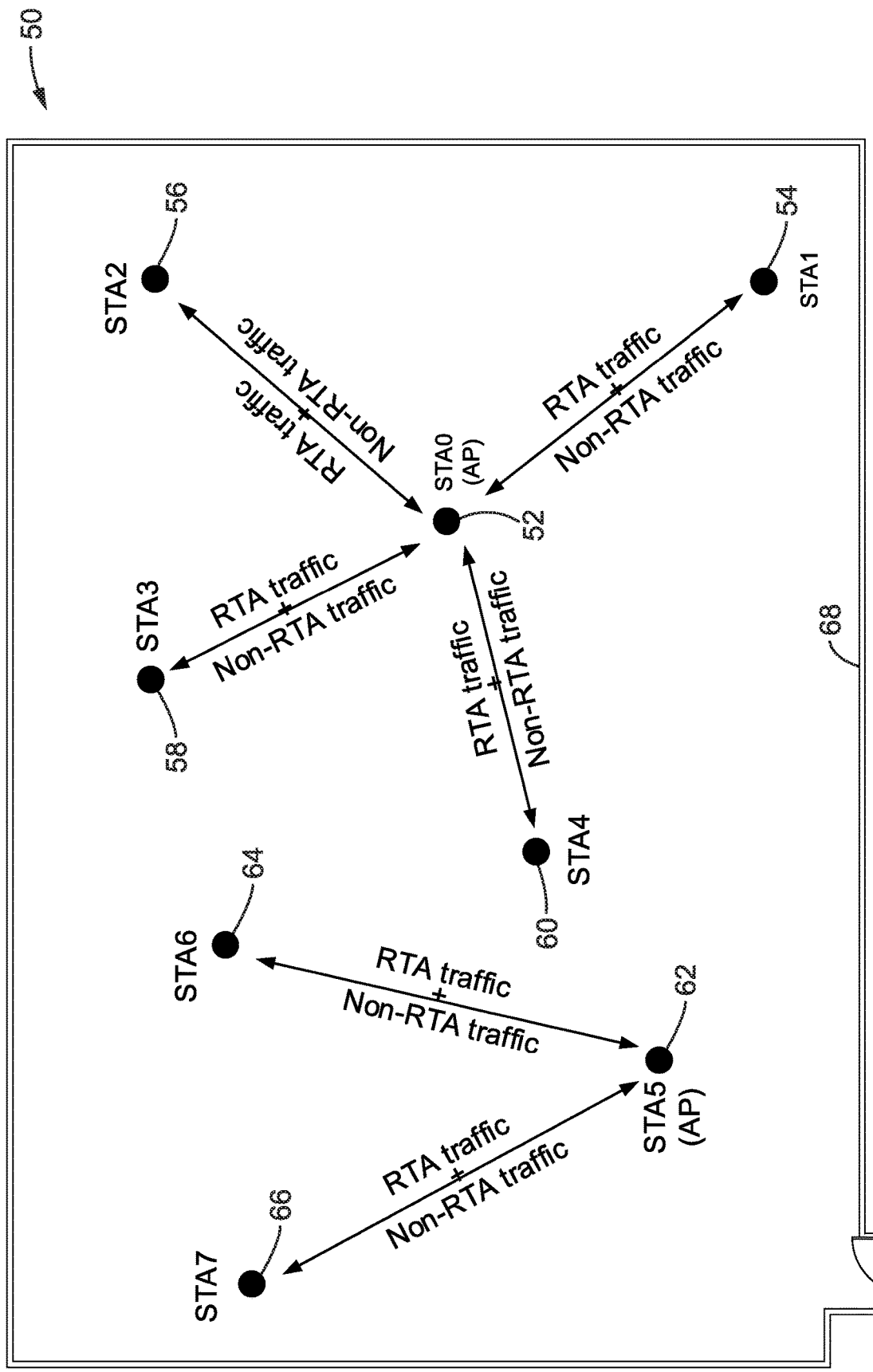
FIG. 5 is a network topology diagram of a small WLAN network having two APs, used as an example topology in the present disclosure.

FIG. 5 illustrates an example network scenario embodiment 50 for explaining the operation of the proposed technology. It should be appreciated that the present disclosure is not limited to this specific scenario, as the disclosure may be utilized in scenarios of larger networks containing more than two APs, any desired number of STAs, any relative orientations of STAs and APs, and having any arbitrary or fixed boundaries of the broadcast area. In this example scenario there is seen STA0 (AP) 52, STA5 (AP) 62 and six other STAs (STA1 54, STA2 56, STA3 58, STA4 60, STA6 64 and STA7 66) within two Basic Service Sets (BSSs) in a room, or local area 68. It will be noted that a Basic Service Set consists of a set of stations (STAs) that have successfully synchronized with an AP in the network. Each STA can communicate with the other STAs in the same BSS. All STAs use CSMA/CA for random channel access for non-RTA packets. The location of the STAs and their transmission links are as shown in the figure.

4.3. Station (STA) Layer Model

The present disclosure classifies packets in the wireless communication system as either RTA or non-RTA packets. RTA packets use the present disclosure for packet transmission, while non-RTA packets may use the regular IEEE 802.11 CSMA/CA scheme. To that end, the STA identifies the RTA packet and non-RTA packet at the MAC layer.

Figure 6:
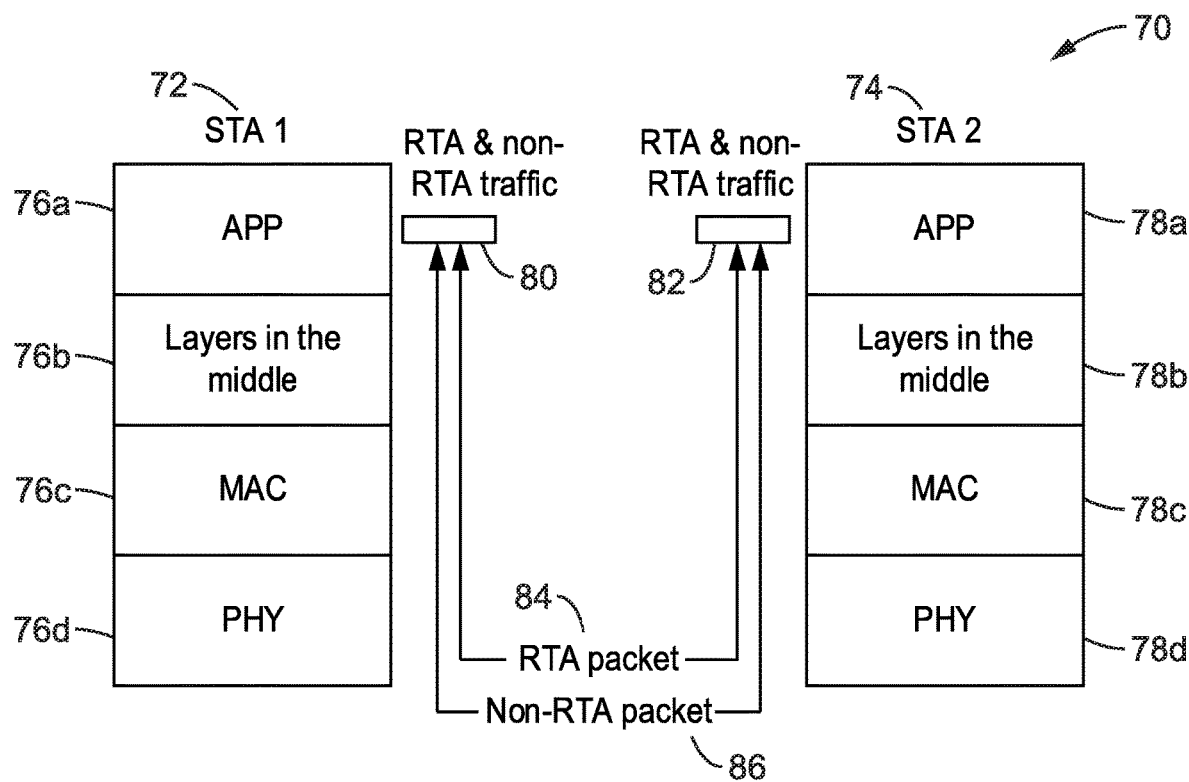
FIG. 6 is a layered communication diagram for RTA and non-RTA traffic communication in an open systems interconnection (OSI) model according to at least one embodiment of the present disclosure.

FIG. 6 illustrates an example embodiment 70 of RTA and non-RTA traffic communication in the OSI model. In this section, the STA layer model for traffic communication is explained. As shown in this example two STAs, STA1 72 and STA2 74 generate RTA traffic and non-RTA traffic 80, 82 and communicate with each other with RTA packets 84 and non-RTA packets 86. The overall process is explained below.

Both RTA traffic and non-RTA traffic are generated by the APP layer 76*a*, 78*a* of the transmitter STA. The APP layer of the transmitter STA passes the RTA traffic and non-RTA traffic to the MAC layer 76*c*, 78*c* via (through) layers in the middle 76*b*, 78*b*. The MAC layer 76*c*, 78*c* and the PHY layer 76*d*, 78*d* append additional signal fields in the MAC header and PLCP header to the packet, and the packets are transmitted over the PHY layer of the network.

The receiver STA receives the packets at the PHY layer, decodes and sends them to its MAC layer if the packets are decoded correctly, after which the data is fed to its APP layer through (via) layers in the middle.

4.4. Mechanism for Identifying RTA and non-RTA Packets

The disclosed technology classifies the packets in the wireless communication system as being either RTA or non-RTA. RTA packets use an immediate retransmission scheme for packet retransmissions while non-RTA packets may use the regular CSMA/CA scheme. To that end, the STA identifies the RTA packet and non-RTA packet at the MAC layer.

According to the STA layer model shown in FIG. 6, it is possible that the MAC layer of the transmitter STA identifies the RTA traffic and non-RTA traffic from the upper layers and packetizes them into RTA packets and non-RTA packets, respectively. This section provides the details of how the transmitter STA identifies the RTA traffic using prior negotiation.

According to the STA layer model shown in FIG. 6, the transmitter STA transmits the packets to the receiver STA over the PHY layer of the network. When the receiver STA receives the packet at the MAC layer, it is able to identify the RTA packet and non-RTA packet based on the information embedded in the MAC header or PLCP header. This section provides the details on how the receiver STA identifies the RTA packet based on the PLCP or MAC header information.

The RTA traffic has to be communicated within a given lifetime to assure the validity of the data. In other words, if the RTA traffic is not received by the receiver before this lifetime expires, the RTA traffic is invalid and can be discarded. The STA packetizes the RTA traffic into RTA packets for transmitting through the PHY layer. Hence, the RTA packet also has a lifetime for the transmission. This section provides the details of how the STA copes with the lifetime expiration of the RTA packet.

4.4.1. Prior Negotiation

Often, RTAs generate traffic periodically, in the manner of connection-oriented communications. RTA connection-oriented communications established by an application between STAs is called an RTA session. It is possible that STAs can have multiple RTA sessions in the network. Each STA according to the present disclosure is able to manage those RTA sessions properly.

Before an RTA session starts transmitting RTA traffic, a prior negotiation occurs between the transmitter STA and the receiver STA to establish the connection. During this prior negotiation, the transmitter STA and the receiver STA record the RTA session with the RTA session identifying information that can be used for identifying the RTA traffic at the MAC layer of the transmitter side and the RTA packet at the MAC layer of the receiver side.

As was shown in FIG. 6, when the APP layer passes the traffic to the MAC layer on the transmitter side, the layers in the middle add header information to the traffic. When the MAC layer of the transmitter STA receives traffic from the upper layers, it extracts the header information from the upper layers and looks up (searches) the RTA session records created by the prior negotiation. If the header information matches one RTA session in the records, the traffic is RTA; otherwise, the traffic is considered non-RTA. The header information that can be used for identifying RTA traffic is listed in Table 1. In this section, the details of the prior negotiation are described.

According to the prior negotiation results, receiver STA can also classify the RTA and non-RTA packet by the channel resource for packet transmission, such as time, frequency, and other metrics. When a packet is received using the channel resource that is granted for an RTA packet, then the STA identifies it as an RTA packet. Otherwise, that packet is a non-RTA packet. This scenario will be used when the packet is transmitted in multi-user uplink mode as explained in Section 4.6.2.2.

Figure 7:
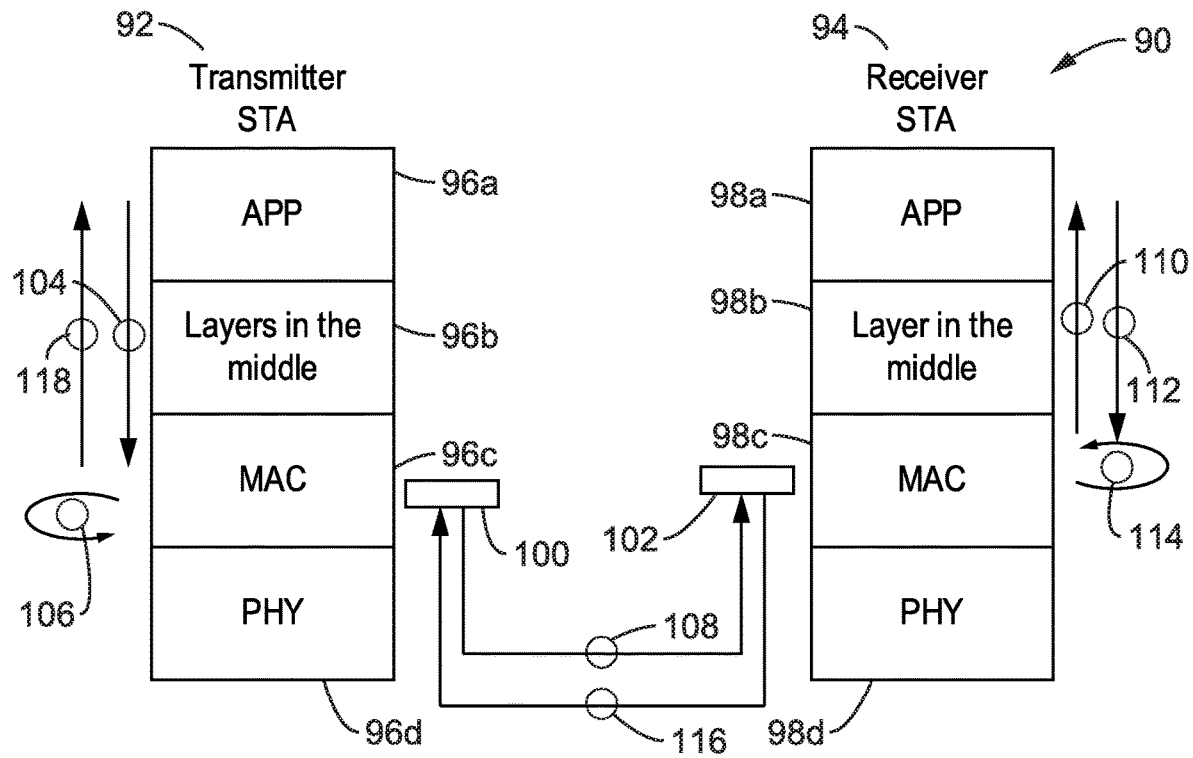
FIG. 7 is a layered communication diagram showing prior negotiation for RTA traffic communications according to at least one embodiment of the present disclosure.

FIG. 7 illustrates an example embodiment 90 of prior negotiation for an RTA traffic packet at a transmitter side 92 and a receiver side 94. It should be appreciated that one prior negotiation establishes one RTA session and can be used for all the RTA packets generated by that RTA session. The figure shows prior negotiation for establishing an RTA session between two STAs in a STA layer model as was seen in FIG. 6. A transmitter STA 92 is shown having layers APP 96a, layers in the middle 96b, MAC layer 96c and PHY layer 96d with a receiver STA 94 having the same layers APP 98a, layers in the middle 98b, MAC layer 98c and PHY layer 98d. The process of the prior negotiation is explained below.

Referring to FIG. 7, the following steps are seen. The APP layer 96a of transmitter 92 requests 104 a resource (e.g., time, channel) negotiation. Thus, on the transmitter STA side, the APP layer starts an RTA session and requests a negotiation on channel resources, such as time and bandwidth, for its RTA traffic transmission. This negotiation request is transmitted from the management entity in the APP layer to the management entity residing in the MAC layer.

The MAC layer of the transmitter STA receives the negotiation request from the upper layer and checks 106 resource availability on its side. Also, it records the RTA session identifying information provided by the upper layers for identifying RTA traffic in the session. The record of identifying information can be picked from the information listed in Table 1, such as TCP/UDP port number, the type of service, and so forth. It may deny the request from the upper layer if the resource is unavailable, or re-negotiate with the upper layer.

If the MAC layer of the transmitter STA finds the resource available, it sends 108 a negotiation request frame to the MAC layer of the receiver STA. The negotiation frame contains the identifying information of the RTA session so that the receiver can record it and use it afterwards.

After the MAC layer of the receiver STA receives the negotiation request frame, it first informs 110 its APP layer to get ready for receiving RTA packets by sending a negotiation request from the management entity in the MAC layer to the management entity in the APP layer. The negotiation may fail if the APP layer is not available for RTA transmission.

The APP layer of the receiver grants the availability of resources at its layer and sends 112 this information from the management entity in the APP layer to the management entity which resides in the MAC layer.

Then, the MAC layer of the receiver STA checks 114 the resource availability on its side. The MAC layer can deny or re-negotiate if the resource is unavailable. The MAC layer of the receiver STA collects all the negotiation information on its side and reports it 116 to the MAC layer of the transmitter.

The MAC layer of the transmitter receives the negotiation result and forwards it 118 to its APP layer. If the negotiation succeeds, the APP layer can start to transmit RTA traffic using the resource granted by both STAs.

According to the RTA session records created by the prior negotiation, the MAC layer of the transmitter STA identifies the RTA traffic and non-RTA traffic by the header information from the upper layers. When the APP layer generates RTA traffic, the RTA traffic is passed to its MAC layer with the header information provided by the layers in the middle. By looking up the RTA session records created by the prior negotiation, the transmitter STA is able to use that header information to identify the RTA traffic and packetize the RTA traffic into an RTA packet at the MAC layer.

Figure 8:
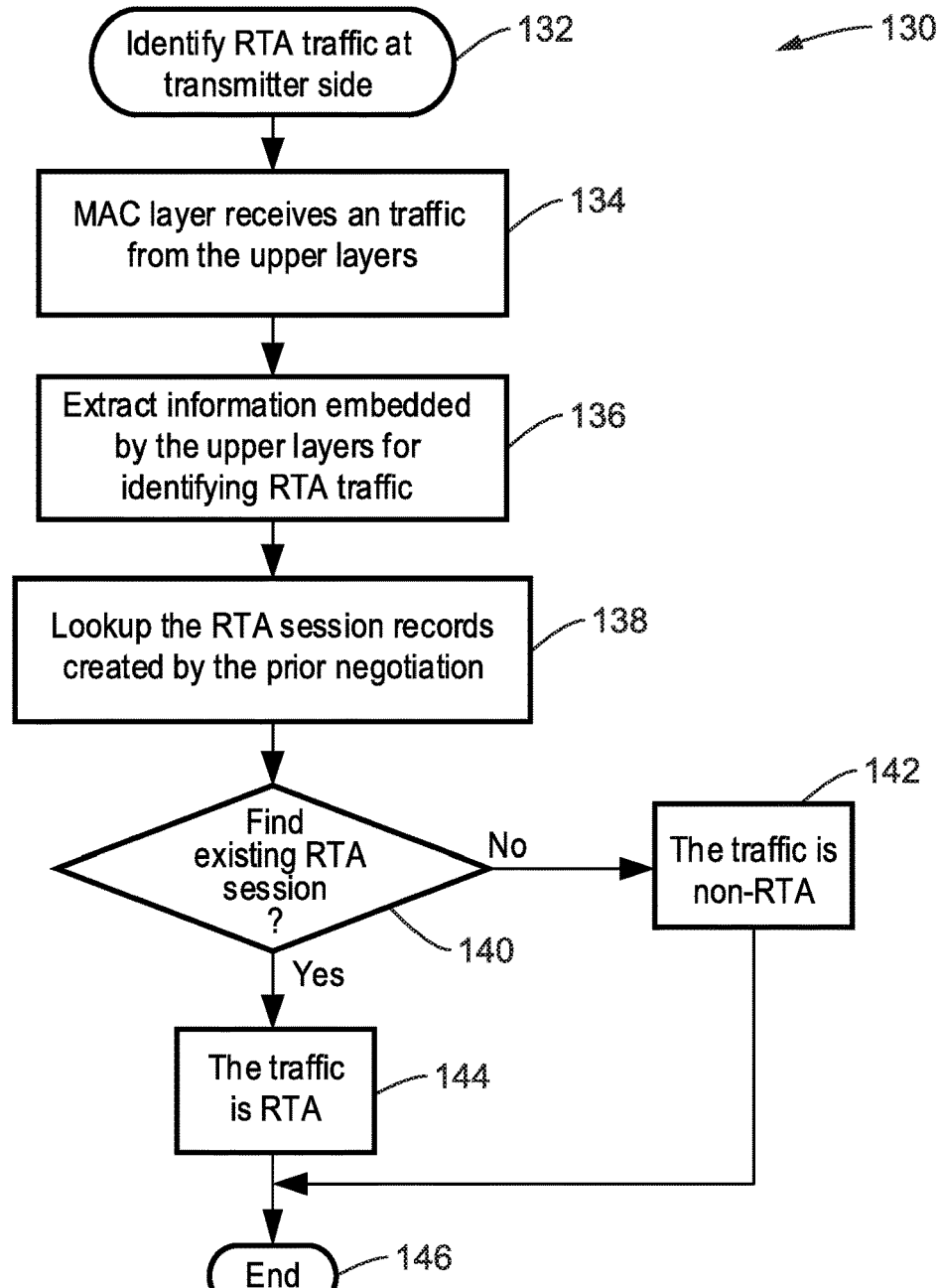
FIG. 8 is a flow diagram of identifying an RTA packet on the transmitter side according to at least one embodiment of the present disclosure.

FIG. 8 illustrates an example embodiment 130 of identifying RTA packet traffic on the transmitter side. The routine starts 132 and the MAC layer of the transmitter STA receives traffic 134 from the upper layer. The MAC layer extracts 136 information embedded by the upper layer for identifying RTA traffic, and is checking the header information of the upper layers, such as the type of service and the TCP/UDP port number.

The MAC layer of the transmitter STA compares 138 the header information from the upper layers with the RTA session records created by the prior negotiation. A check 140 is made on the header information. If the header information from the upper layers matches one RTA session in the record, then block 144 is reached with the traffic determined to be RTA traffic, otherwise block 142 is reached with the traffic being non-RTA traffic. After identifying the packet processing ends 146.

4.4.2. Packet Header Information

Figure 9:
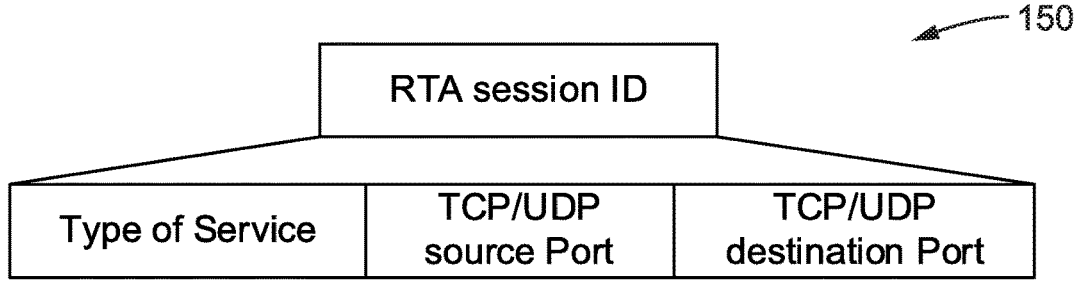
FIG. 9 is a data field diagram for fields within RTA session identification according to at least one embodiment of the present disclosure.

FIG. 9 illustrates an example embodiment 150 of an RTA session identifying information format. When the transmitter STA generates RTA packets, it adds additional signal fields in the PLCP or MAC header. When the additional signal field contains the RTA session identifying information, the receiver STA can use the RTA session identifying information in the PLCP or the MAC header to distinguish at the MAC layer between an RTA packet and a non-RTA packet. One example of the RTA session identifying information is shown in the figure.

Figure 10:
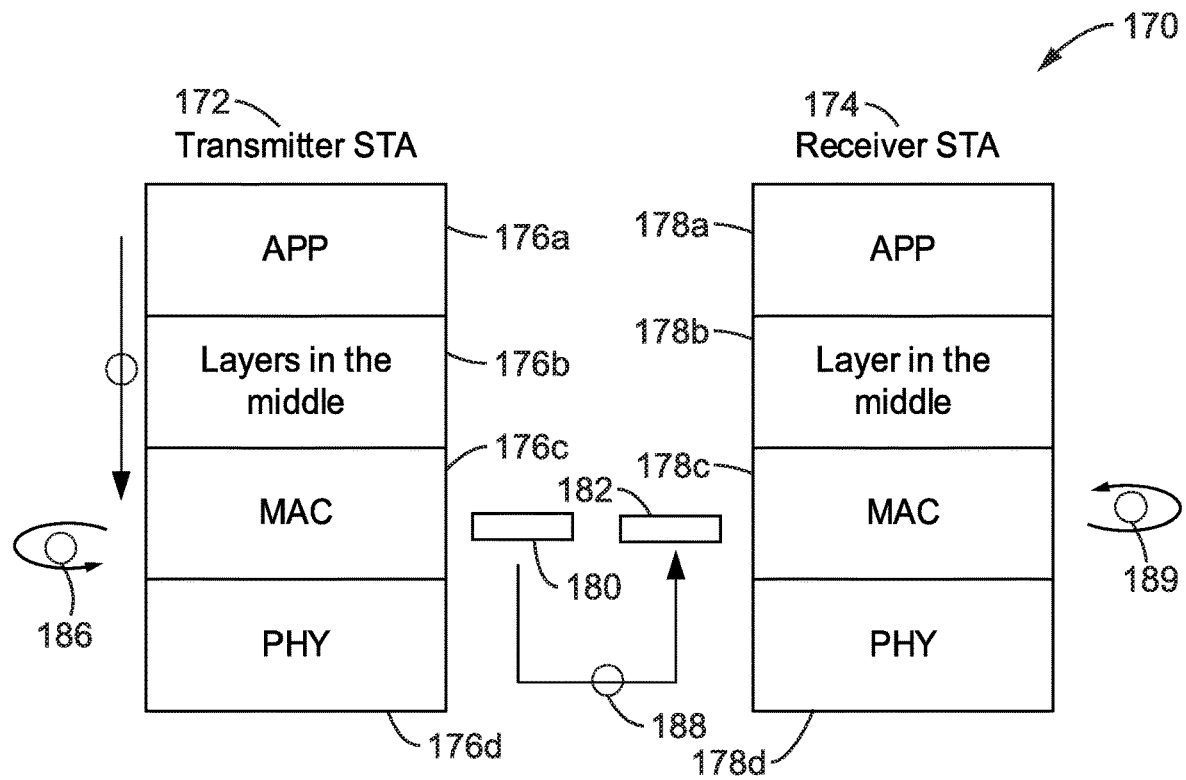
FIG. 10 is a layered communication diagram showing header information exchange between the APP layer and MAC layer according to at least one embodiment of the present disclosure.

FIG. 10 illustrates an example embodiment 170 of header information exchange 180, 182 between APP layer and MAC layer. A transmitter STA 172 is seen with APP layer 176a, layers in the middle 176b, MAC layer 176c, and PHY layer 176d. A receiver STA 174 is seen with the same layers APP layer 178a, layers in the middle 178b, MAC layer 178c, and PHY layer 178d.

The figure depicts details of how this process works between two STAs in the STA layer model. The APP layer of the transmitter STA generates 184 RTA traffic and passes it to the MAC layer. When the traffic is passed through the layers in the middle, the header information, such as the type of service field and the TCP/UDP port numbers is added to the traffic.

When the MAC layer of the transmitter STA receives the RTA traffic from the upper layer, it extracts the header information, such as the type of service and the TCP/UDP port numbers from the traffic. By looking up the RTA session records created by the prior art, the MAC layer identifies 186 that the traffic is RTA traffic.

Then the MAC layer of the transmitter STA packetizes the traffic into an RTA packet 180 and embeds the type of service and the TCP/UDP port numbers in the MAC header or the PLCP header as the RTA session identifying information. One example of the RTA session identifying information was shown in FIG. 9. Next, the transmitter STA sends 188 the RTA packet to the receiver STA which receives packet 182.

When the receiver STA receives the RTA packet at its MAC layer, it can identify 189 the RTA packet based on the RTA session identifying information in the PLCP or the MAC header.

Figure 11:
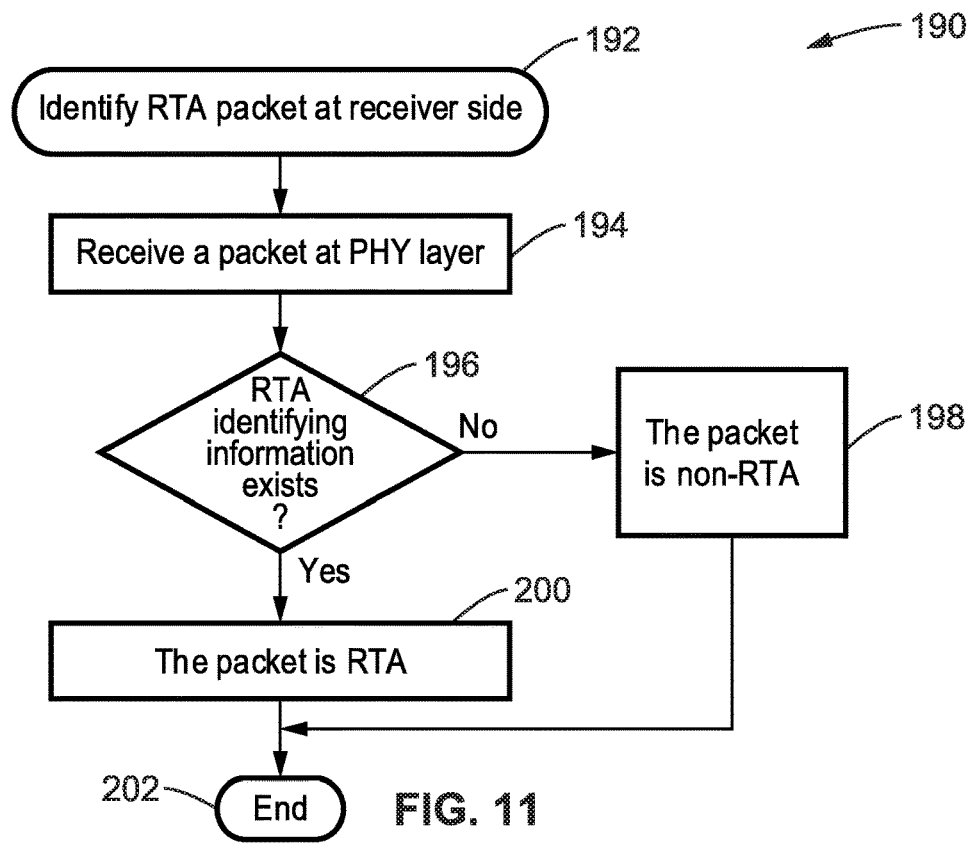
FIG. 11 is a flow diagram of identifying an RTA packet on the receiver side according to at least one embodiment of the present disclosure.

FIG. 11 illustrates an example embodiment 190 of a process for identifying an RTA packet on the receiver side at the MAC layer. The process starts 192 and the receiver receives a packet at the PHY layer 194. As explained in FIG. 10, the MAC header or the PLCP header of RTA packets includes the identifying information of a RTA session. Referring again to FIG. 11 a check is made 196 to determine if the identifying information exists. If the identifying information exists, then execution moves to block 200 as the receiver STA has determined that the packet is an RTA packet. Otherwise, if the information does not exist, then execution moves from block 196 to 198, as it has been determined that the packet is a non-RTA packet. After which the process ends 202.

4.5. RTA Interface
4.5.1. Reference Model

When the RTA user initiates an RTA session, the initiation procedure is launched by the application layer and executed at the MAC layer as explained in FIG. 7. There are two types of communication. One type of communication occurs between the different network layers in one STA. The other type of communication occurs between two STAs.

Figure 12:
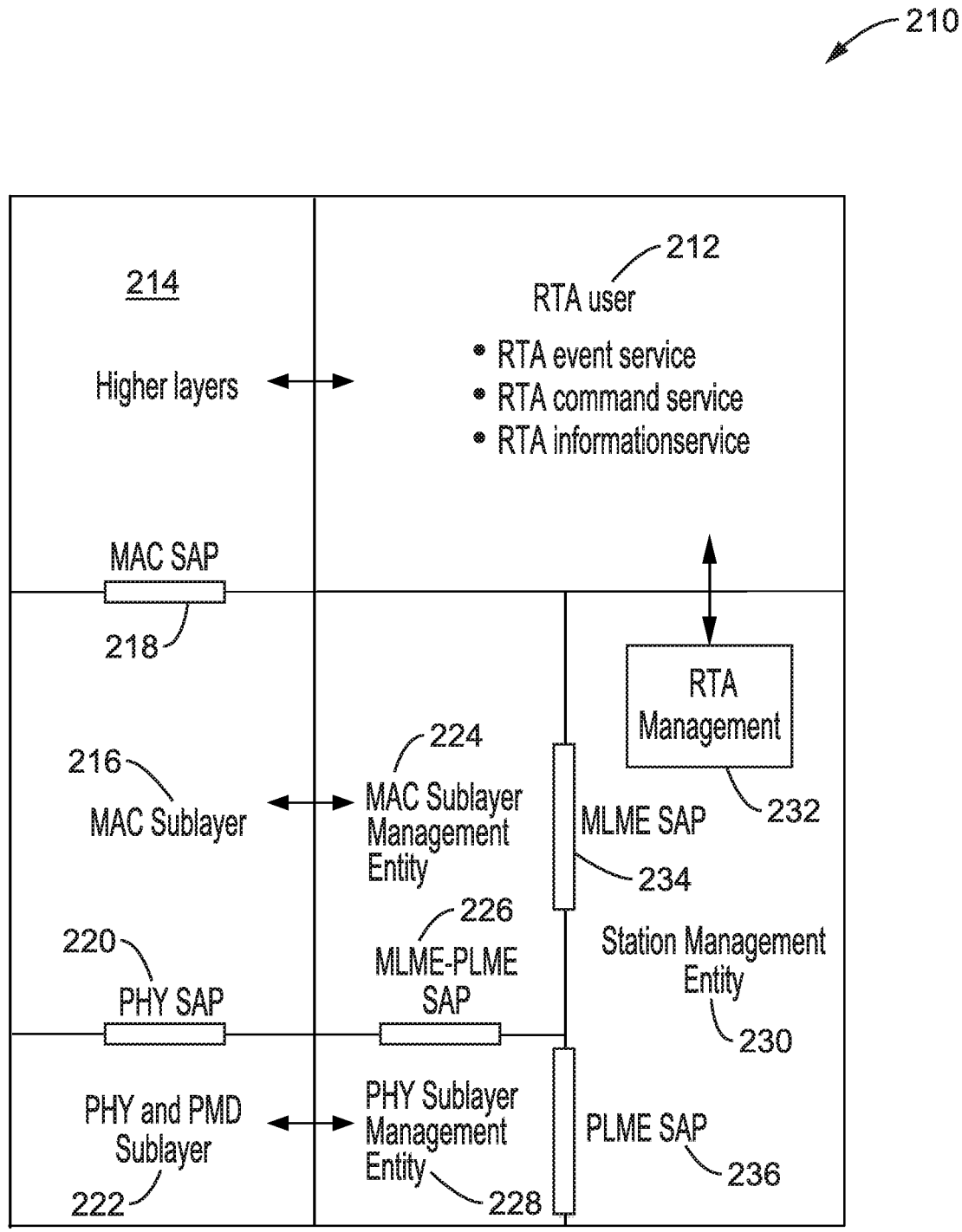
FIG. 12 is an interworking model of RTA management according to at least one embodiment of the present disclosure.

FIG. 12 illustrates an example embodiment 210 of an interworking model for the disclosed RTA management. The figure illustrates an RTA User 214 and other higher layers 214. A MAC sublayer 216 is shown with a MAC Service Access Point (SAP) 218 between it and the higher layers 214. A similar SAP for the PHY layer is seen 220 connecting to the PHYsical (PHY) and Physical Medium Dependent (PMD) sublayers 222. A MAC Layer Management Entity (MLME) 224 is shown for communicating in MAC sublayer 216, and through a MLME to PHY layer Management Entity (PLME) SAP 226 to a PLME 228. At the lower right in the figure is seen a Station Management Entity (SME) 230 having RTA management functions 232 for communicating with RTA user 212. In addition the SME is seen having an MLME SAP 234 for communicating with the MLME, and a PLME SAP 236 for communicating with the PLME 228.

In operation, when the communication between the different network layers of one STA occurs, the RTA user can manage RTA activities through the cross-layer interfaces. The RTA user can communicate and exchange information with the MAC layer and the higher layers, such as the APP layer.

The RTA user at the APP layer can provide multiple RTA services to the MAC layer. For example, the STA can provide: (a) RTA event service, such as RTA session management; (b) RTA command service, such as RTA queue settings; and (c) RTA information service, such as RTA KPI measurement.

An RTA user can pass those service requests through the RTA management 232 of the Station Management Entity (SME) 230 at the MAC layer. Then, according to the request information, the SME is able to take action at the MAC layer through the MAC Sublayer Management Entity Service Access Point (MLME SAP) interface 234.

When the communication occurs between two STAs, the RTA user can pass a message through the cross-layer interfaces and let the MAC transmit and receive frames between two STAs.

Besides the direct message exchange between RTA user and SME, it is also possible that the RTA user at the APP layer exchanges the message with the SME through a MAC State Generic Convergence Function (MSGCF), thus the message can be forwarded via MSGCF SAP and MSGCF-SME SAP defined in IEEE 802.11.

Figure 13:
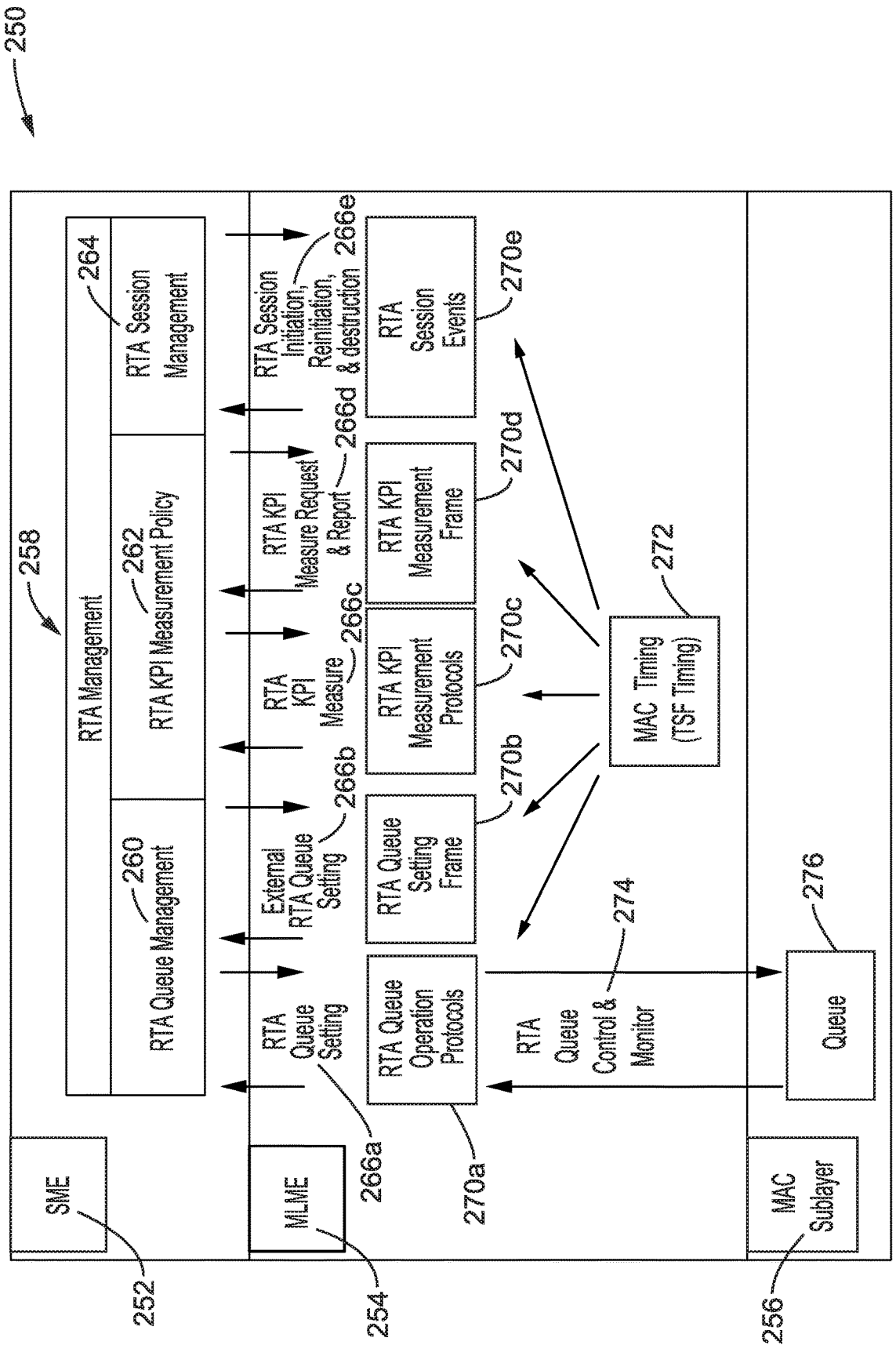
FIG. 13 is a layer management model of RTA management according to at least one embodiment of the present disclosure.

FIG. 13 illustrates an example embodiment 250 of a layer management model for RTA management. The figure depicts SME 252, MLME 254 and MAC Sublayer 256. RTA Management 258 (was shown as block 232 in FIG. 12) is seen having modules for RTA Queue Management 260, RTA KPI Measurement Policy 262 and RTA Session Management 264. At the MLME level are seen a set of functions for RTA Queue Setting 266a, External RTA Queue Setting 266b, RTA KPI Measure 266c, RTA KPI Measure Request and Report 266d, and RTA Session Initiation and Destruction 266e. It should be appreciated that the above functions are given by way of example for a specific embodiment, while these functions may be truncated or expanded without departing from the teachings of the present disclosure. A series of modules are seen coupled to these functions as RTA Queue Operation Protocols 270a, RTA Queue Setting Frame 270b, RTA KPI Measurement Protocols 270c, RTA KPI Measurement Frame 270d, and RTA Session Events 270e. Below these are seen a function for RTA Queue Control and Monitoring 274 coupled to a Queue structure 276 at the MAC sublayer. In addition a MAC Timing (TSF Training) block 272 is seen for communicating with blocks 270a through 270e.

The layer management has a certain partition of functionality between the MLME and SME. As shown in the figure, the RTA management entity 258 residing in the SME 252 represents the management decisions, while the functions residing in the MLME take actions following the management decisions from the SME. The RTA management in SME is able to make decisions and receive feedback for RTA queue management, RTA KPI measurement policy, and RTA session management.

When the RTA management entity 258 makes decisions on RTA session management 264, it calls the RTA session events function 270e at MLME. According to the decision, the STA is able to initiate, re-initiate, or destruct 266e an RTA session with another STA. More details will be explained in Section 4.5.2.

When the RTA management entity 258 makes decisions on RTA queue management 260, it either calls the RTA Queue Operation Protocols 270a function at MLME to control the internal queue 266a at MAC sublayer, or calls the RTA Queue Setting Frame function 270b at MLME to send management frame to set the external queue 266b. The RTA Queue Operation Protocols function 270a is able to report the status of the queue to the RTA management entity 258. The RTA Queue Setting Frame function 270b is able to receive the frame from other STAs and pass the information in the frame to RTA management. More details are explained in Section 4.5.3.

When RTA management makes a decision on RTA KPI Measurement Policy 262, it either calls the RTA KPI Measurement Protocol function 270c at MLME to launch the RTA KPI measurements 266c at the MAC and PHY layers, or calls the RTA KPI Measure Frame function 270d at MLME to transmit a management frame to other STAs to schedule an RTA KPI measurement 266d at another STA. The RTA KPI Measurement Protocols function 270c is able to report the measurement results to RTA management 258. The RTA KPI Measurement Frame function 270d can receive a measurement report frame from other STAs and pass the report to RTA management. More details are explained in Section 4.5.4.

When the functions at MLME perform actions according to the decisions made by the RTA management at SME, it can use the timestamp at the MAC layer, such as the TSF timing, as the time reference.

4.5.2. RTA Session Management

This section explains the details of how a STA initiates, re-initiates, and destructs an RTA session by using the interface between the RTA session management at SME and the RTA Session Events function at MLME.

Figure 14:
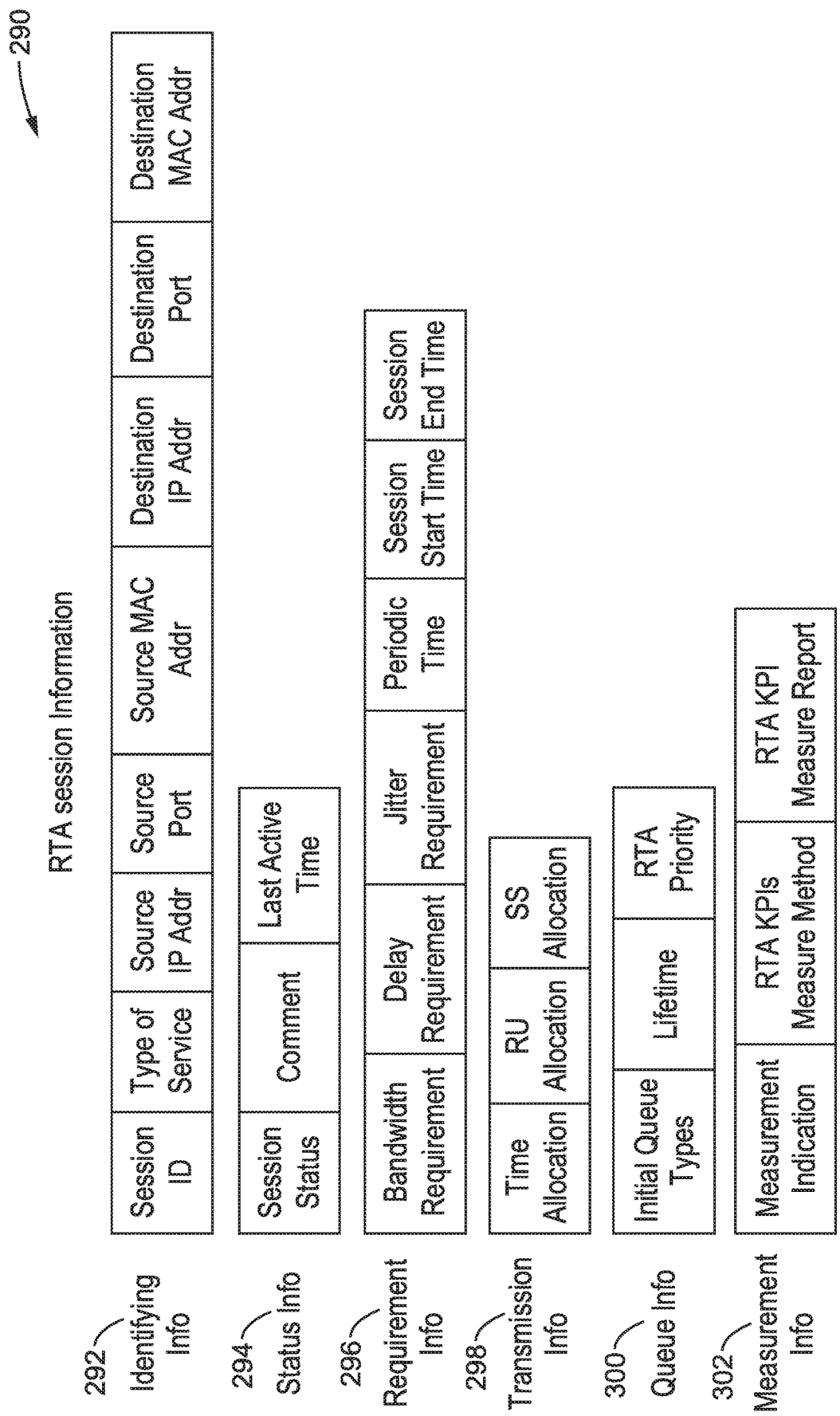
FIG. 14 is a data field diagram showing RTA session information fields according to at least one embodiment of the present disclosure.

FIG. 14 illustrates an example embodiment 290 of RTA session information comprising identifying information 292, status information 294, requirement information 296, transmission information 298, queue information 300 and measurement information 302.

When two STAs establish an RTA session, they need to exchange information for the RTA session. The figure shows an example of RTA session information. The content contains the following messages and fields.

Identifying Info 292 is the identifying information from the MAC header, such as Source MAC Address and Destination MAC Address, that is from the layers above the MAC layer as listed in Table 1, such as Session ID, Type of Service, Source IP Address, Source Port, Destination IP Address, and Destination Port.

Status Info 294 is the status information containing status such as Session Status, Comment, and Last Active Time. Session status shows whether the RTA session is set to generate traffic or not. Table 2 lists the possible RTA session status. When the RTA session status is active, the RTA session is enabled and generating RTA traffic. When the RTA session status is inactive, the RTA session is disabled and does not generate RTA traffic from the user. When the RTA session status is an error, the RTA session is not able to generate or transmit RTA traffic because of the error. The comment field can be utilized to show the details of the RTA session status. It can be used to carry warning or error messages. For example, the comment can show the transmission quality is poor when numerous RTA packets are corrupted in this session. It can also be used to carry information suggesting operating parameters for creating a new RTA session. The last active time field can be used to trigger some event to check the status of the RTA session. The last active time is updated every time when RTA packet transmission occurs for the RTA session. This information can be used to track whether the RTA traffic is generated or delivered regularly. If the last active time is not updated for a certain period of time, then the RTA session is not generating or delivering RTA traffic. The RTA session status should be checked to find whether some error has occurred.

Requirement Info 296 contains fields about requirements information comprising Bandwidth Requirement, Delay Requirement, Jitter Requirement, Periodic Time, Session Start Time, and Session End Time. The bandwidth requirement field indicates the amount of RTA traffic to transmit. When a STA measures the channel bandwidth, it can compare the measured bandwidth with the required bandwidth. The details of the bandwidth measurement are explained in Section 4.5.4.2.1. If the measurement results cannot satisfy the requirement, then the STA can reject the RTA session initiation.

The delay requirement field indicates the transmission delay of the RTA packets. When the STA measures packet transmission latency, it can compare measured latency with required delay. The details of the latency measurement are explained in Section 4.5.4.2.2. If the measurement results cannot satisfy the requirement, then the STA can reject the RTA session initiation.

The jitter requirement field indicates the maximum difference in the RTA packet delay during each periodic transmission time. When a STA measures the packet transmission latency, it can obtain the jitter information and compare it with jitter requirement. The details of the latency measurement are explained in Section 4.5.4.2.2. If the measurement results cannot satisfy the requirement, then the STA can reject the RTA session initiation.

The periodic time indicates the duration of time until the RTA session generates RTA traffic once; that is to say that the RTA session generates traffic every periodic time. The session start time field and end time field indicate the start time and the end time of the RTA session.

Transmission Info 298 is a transmission information message comprising fields for Time Allocation, RU Allocation and SS Allocation. The time allocation field indicates the amount of channel time that is distributed to the RTA session for transmission.

The RU allocation field indicates the Resource Unit (RU) of the channel that is distributed to the RTA session for transmission. The RU is a unit in OFDMA terminology used in IEEE 802.11ax. The RU determines which channel frequency to use for transmission.

The SS allocation field indicates the spatial stream allocation for the RTA session traffic transmission. The SS allocation can be a unit in MIMO terminology used in IEEE 802.11 or an index of directional antenna pattern in beamforming terminology.

Queue Info 300 provides queue information and contains fields comprising Initial Queue Types, Lifetime, RTA Priority. The initial queue types indicate which queue the traffic should be pushed to when it is generated by the RTA session. The lifetime represents the time that the RTA packets can be stored at the queue. When the lifetime expires, the packet is dropped. In one mode according to at least one embodiment of the present disclosure, an RTA packet closer to its expiration time is transmitted first. The RTA priority field indicates the priority of the RTA packet. In one mode according to at least one embodiment of the present disclosure, an RTA packet with higher priority should be transmitted first.

Measurement Info 302—measurement information has fields comprising Measurement Indication, RTA KPIs Measure Method, RTA KPI Measure Report. The measurement indication subfield can be implemented as a one-bit indication. When it is set to a first state (e.g., "1"), then the STA requests RTA KPIs measurements before initiating an RTA session; however, when it is set to a second state (e.g., "0"), then the RTA KPIs measurement is not requested by RTA session initiation.

The RTA KPIs measurement method field indicates which types of RTA KPIs measurements should be launched during the RTA session initiation procedure. Several examples of the measurements will be provided in Section 4.5.4.2. The RTA KPI Measurement Report field carries the RTA KPI measurement results.

4.5.2.1. RTA Session Initiation

Figure 15A:
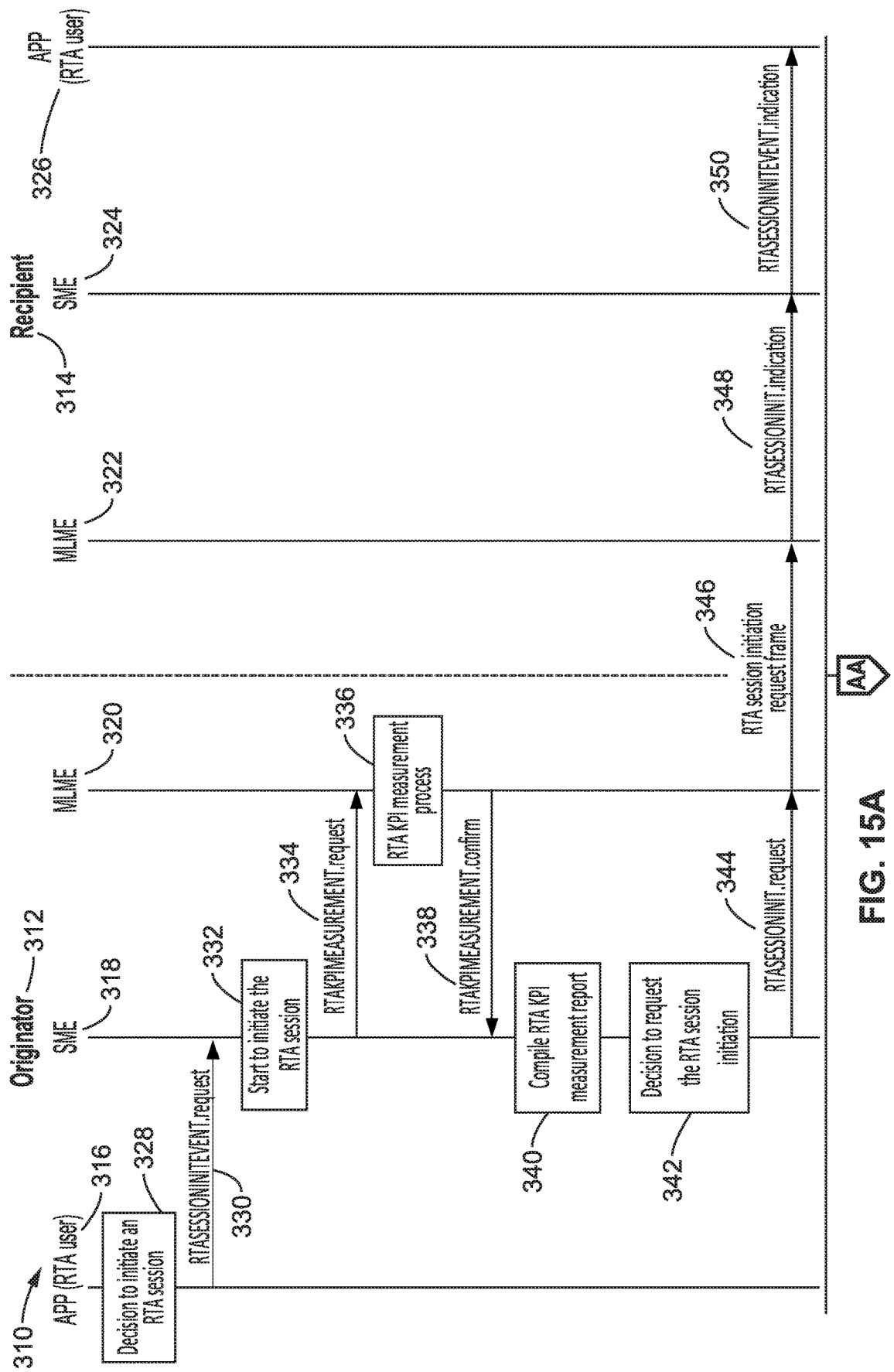
FIG. 15A through FIG. 15C is a communication sequence diagram of RTA session initiation being performed according to at least one embodiment of the present disclosure.
Figure 15B:
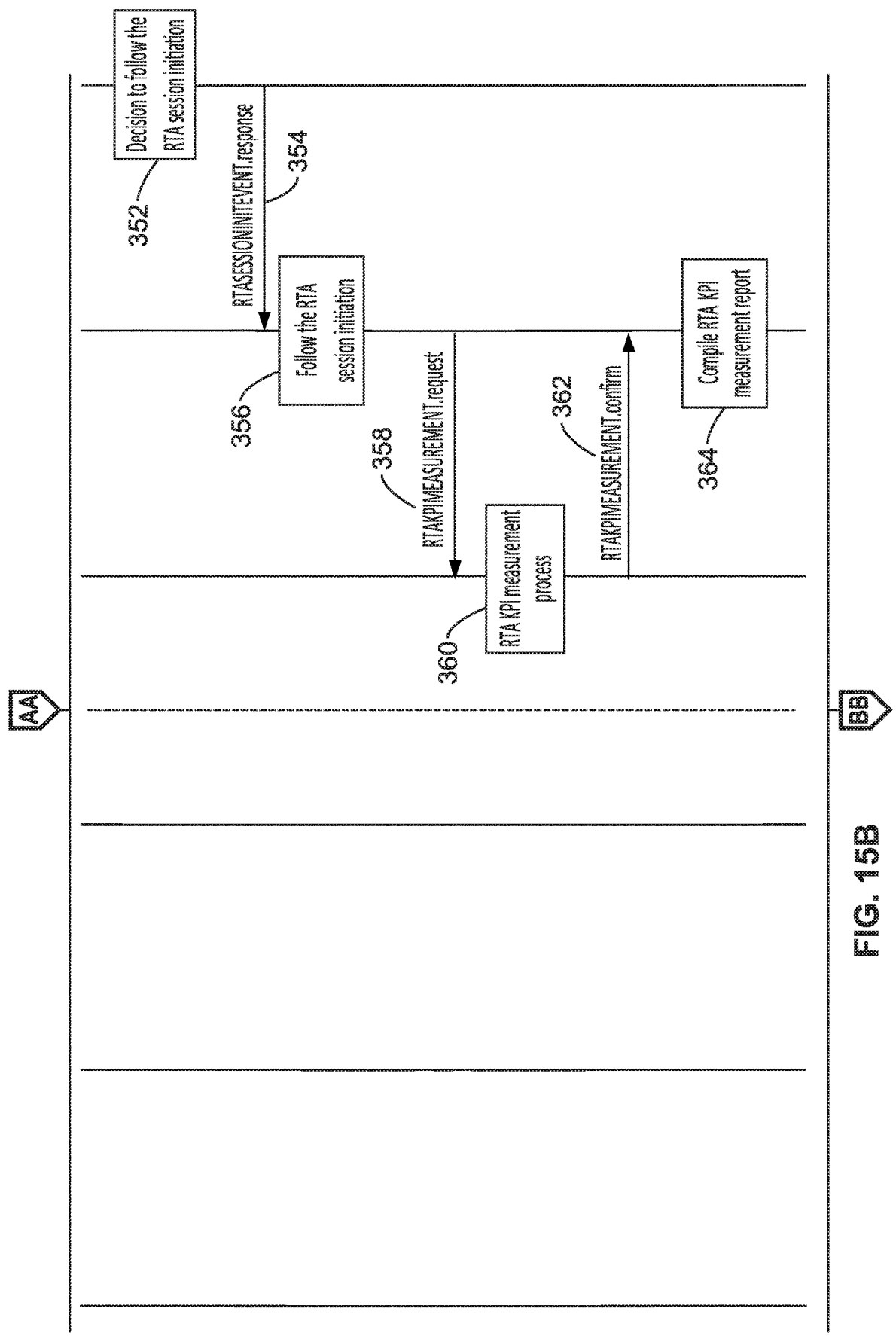
Figure 15C:
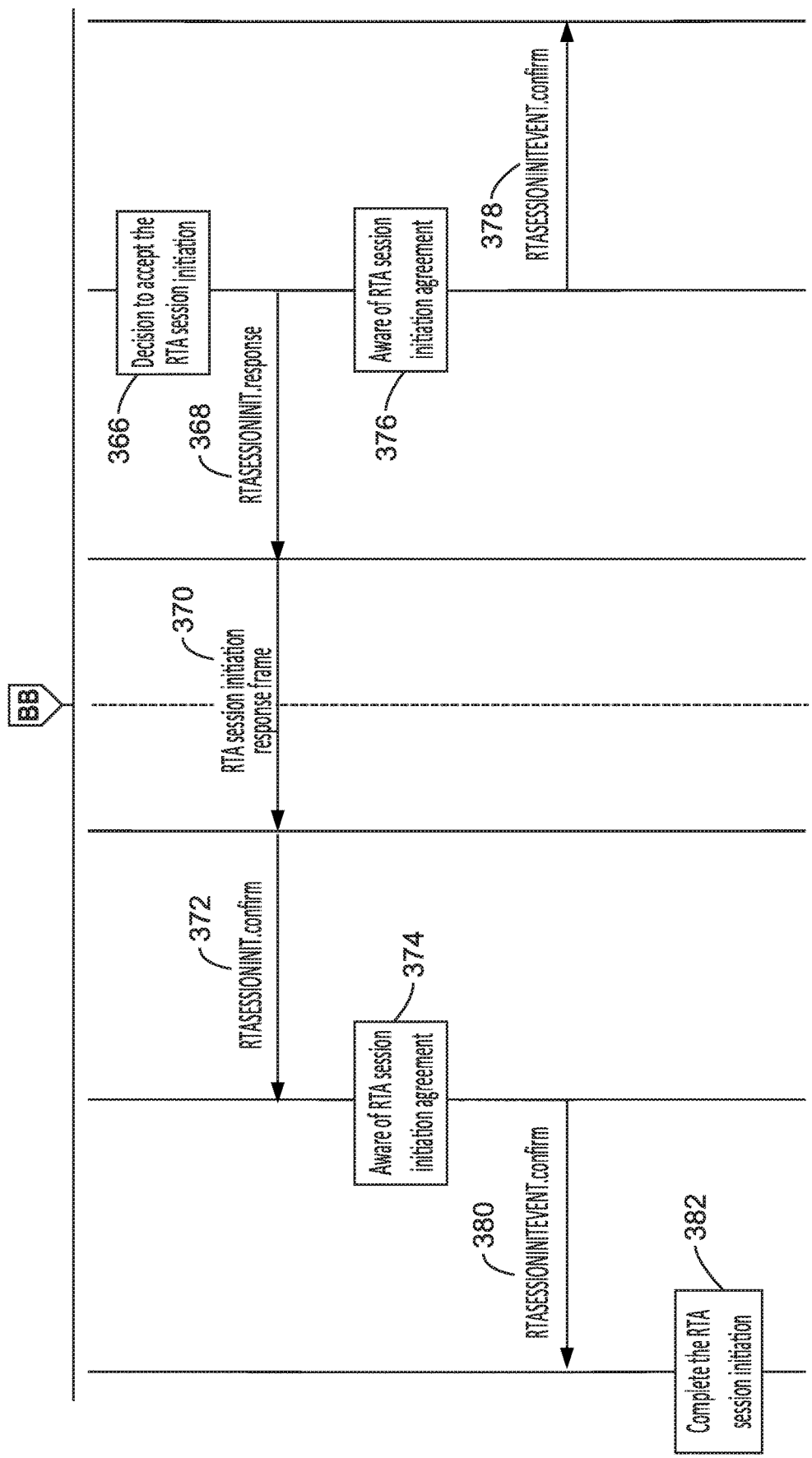

FIG. 15A through FIG. 15C illustrate an example embodiment 310 exemplifying a complete procedure of RTA session initiation and a message exchange between an originator 312 and a recipient, each having an APP Layer 316, 326, SME Layer 318, 324, MLME Layer 320, 322. It will be noted that the actual messages are exchanged between the MAC layers of these two STAs.

When the RTA user of the originator STA decides (determines) to initiate an RTA session 328, it passes an RTASESSIONEVENT.request message 330 as shown in Table 3 to its SME. Then SME needs to initiate the RTA session 332, such as by measuring the RTA KPI first to ensure the channel resource is available to establish the RTA session. The RTA session management at the SME of the originator STA makes decision and sends an RTAKPIMEASURE.request message 334 to the RTA KPI measurement protocols function at the MLME layer 320. The format of the RTAKPIMEASURE.request message is explained in Table 30.

Then, the MLME launches the RTA KPI measurement procedure 336 according to the request in the RTAKPIMEASURE.request message. For example, if the originator STA plans to transmit RTA packets, the channel bandwidth measurement as explained in Section 4.5.4.2.1 can be performed here. The RTA KPI measurement procedure is explained in Section 4.5.4. After the MLME finishes the measurement procedure, it sends an RTAKPIMEASURE.confirm message 338 as explained in Table 31 to report the measurement results.

When the SME of the originator STA receives the RTA KPI measurement results, it compiles the measurement report 340 and decides whether to continue initiating 342 the RTA session or not. For example, the STA can compare the RTA KPI measurement results, such as channel bandwidth, with the requirement information of the RTA session (as defined in FIG. 14). If the measurement results satisfy the requirement, it continues RTA session initiation.

If the STA decides to continue the RTA session initiation, the RTA session management at the SME of the originator STA sends an RTASESSIONINIT.request message 344 to the RTA session events function at the MLME via MLME SAP interface. The format of the RTASESSIONINIT.request message is explained in Table 7.

Figure 16:
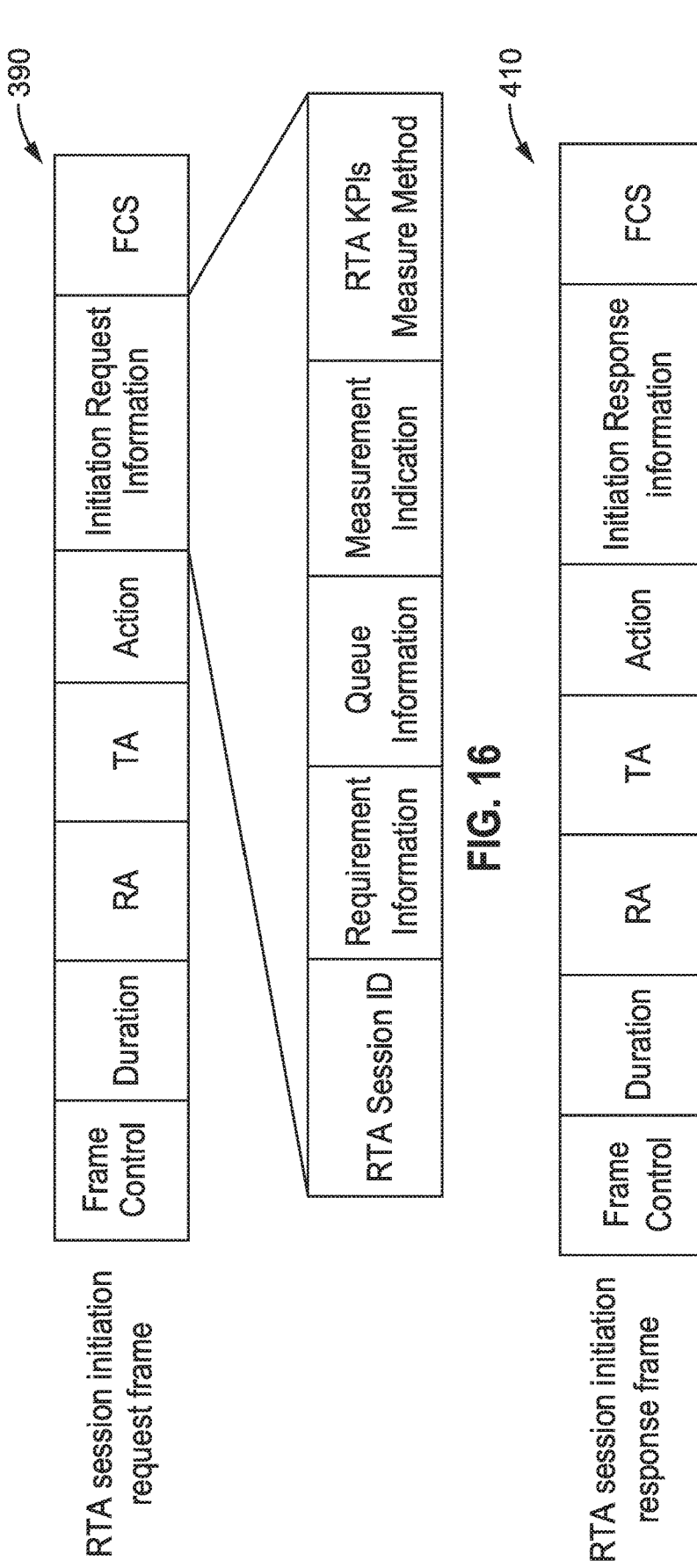
FIG. 16 is a data field diagram of an RTA session initiation request frame format according to at least one embodiment of the present disclosure.

When the MLME of the originator STA receives the RTASESSIONINIT.request message, it collects the RTA session information in the RTASESSIONINIT.request message and sends an RTA session initiation request frame 346 to the recipient STA. The format of the RTA session initiation request frame is shown in FIG. 16. The MLME of the recipient STA 314 receives the frame and generates an RTASESSIONINIT.indication message 348, as shown in Table 8, to its SME via the MLME SAP interface.

Then, SME layer 324 passes an RTASESSIONINITEVENT.indicate message 350, as shown in Table 4, to the RTA user at the APP layer of the recipient STA. If the RTA user at the APP layer of the recipient STA determines 352 in FIG. 15B to follow the initiation event, it passes an RTASESSIONINITEVENT.response message 354, as shown in Table 5, back to the SME layer. Within this response message, if the APP layer has decided to continue the initiation, it has set the FollowEvent field in RTASESSIONINITEVENT.response message to indicate following the initiation event, such as by setting it to "1" in the example.

Then SME continues following the RTA session initiation 356 procedure. As explained in FIG. 4.4 1, the recipient STA needs to check the channel resource availability and determine whether to grant the RTA session initiation request. To make this determination the recipient STA needs to measure the RTA KPIs on its side. The procedure of the RTA KPI measurement is the same as at the originator STA, with sending an RTAKPIMEASURE.request message 358, in response to which a KPI measurement process is performed 360, and a RTAKPIMEASURE.confirm message 362 is sent back to the SME. For example, if the recipient STA plans to receive the RTA packets, the packet transmission latency measurement as explained in Section 4.5.4.2.2 can be performed here. The measurement information is compiled 364 and a decision made 366 in FIG. 15C whether or not to grant RTA session initiation.

Then, the SME of the recipient STA sends an RTASESSIONINIT.response message 368 containing feedback information to its MLME. The format of RTASESSIONINIT.response message is explained in Table 9. Then, the MLME of the recipient STA sends an RTA session initiation response frame 370 to the MLME of the originator STA. The MLME of the originator STA receives the frame and sends an RTASESSIONINIT.confirm message 372, as shown in Table 10, to its SME, which is made aware 374 of the session initiation agreement. The SME of the originator then informs 380 the RTA users, through an RTASESSIONINITEVENT.confirm message, that the initiation of the RTA session is successful or not, which completes 382 RTA session initiation, with a similar RTASESSIONINITEVENT.confirm message 378 being sent from the recipient SME 324 to its users at the APP layer.

The SME of both the originator STA and recipient STA are aware of the RTA session initiation results. They forward the result via an RTASESSIONINITEVENT.confirm message as shown in Table 6 to the APP layer.

FIG. 16 illustrates an example embodiment 390 of an RTA session initiation request frame format having the following fields. A Frame Control field indicates the type of frame. A Duration field contains NAV information used for CSMA/CA channel access. An RA field contains an address for the recipient of the frame. A TA field contains the address of the STA that transmitted the frame. An Action field indicates the type of management frame; which in this case indicates that the management frame is an RTA session initiation request frame.

An Initiation Request Information field follows the Action field when the Action field indicates that the frame is an RTA session initiation request frame. The Initiation Request information field contains the following subfields. (a) An RTA Session ID subfield identifies the RTA session, with its content being shown in FIG. 9. (b) A Resource Requirement subfield contains requirement information of the RTA session as described in FIG. 14. (c) A Queue Information subfield provides queue information for the RTA session as described in FIG. 14. (d) A Measurement Indication subfield indicates whether the measurement is required for RTA initiation, and can be implemented as a one-bit indication. When this field is set to a first state (e.g., "1"), the measurement is required for RTA session initiation, and when this field is set to a second state (e.g., "0"), the measurement is not required. (e) An RTA KPIs Measure Method subfield carries the information on how to measure the RTA KPIs at the recipient STA. This field can use the formats shown in Section 4.5.4.2. For example, this field could be the packet transmission latency measurement as explained in FIG. 37 of Section 4.5.4.2.2.

Figure 17:
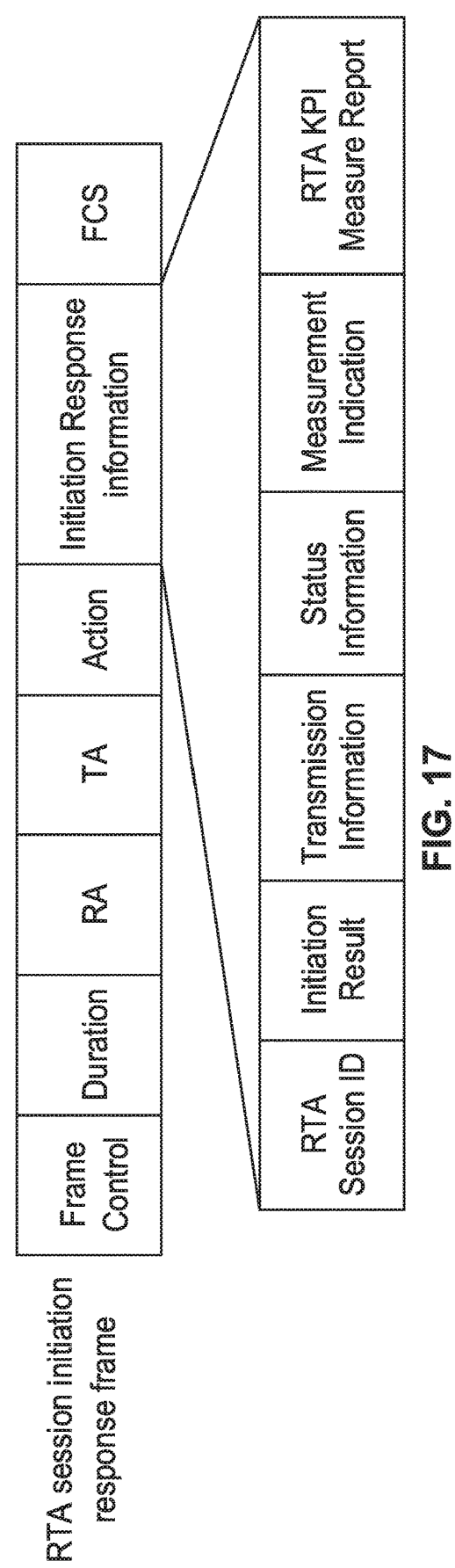
FIG. 17 is a data field diagram of an RTA session initiation response frame format according to at least one embodiment of the present disclosure.

FIG. 17 illustrates an example embodiment 410 of an RTA session initiation reply frame. A Frame Control field indicates the type of frame. A Duration field contains NAV information used for CSMA/CA channel access. An RA field contains an address for the recipient of the frame. A TA field contains the address of the STA that transmitted the frame. An Action field indicates the type of management frame, in this case it indicates that the management frame is an RTA session initiation reply frame.

An Initiation Response Information field follows the Action field when the Action field indicates that the frame is RTA session initiation reply frame, and contains the following subfields. An RTA Session ID subfield provides identifying information for the RTA session. The content of this field is shown in FIG. 9. An Initiation Result subfield provides an indication (e.g., one bit) to show whether the initiation is granted or not. When this field is set to a first state (e.g., "1"), then the initiation is granted by the other STA; otherwise this field is set to a second state (e.g., "0"). A Transmission Information subfield provides transmission information of the RTA session as described in FIG. 14. A Status Information subfield contains the status information for the RTA session as described in FIG. 14. A Measurement Indication subfield indicates whether the measurement results is included. By way of example, when this field is set to a first state (e.g., "1"), the measurement result is included, and when this field is set to a second state (e.g., "0"), the measurement is not included. A RTA KPI Measure Report subfield carries the RTA KPI measurement results.

Figure 18A:
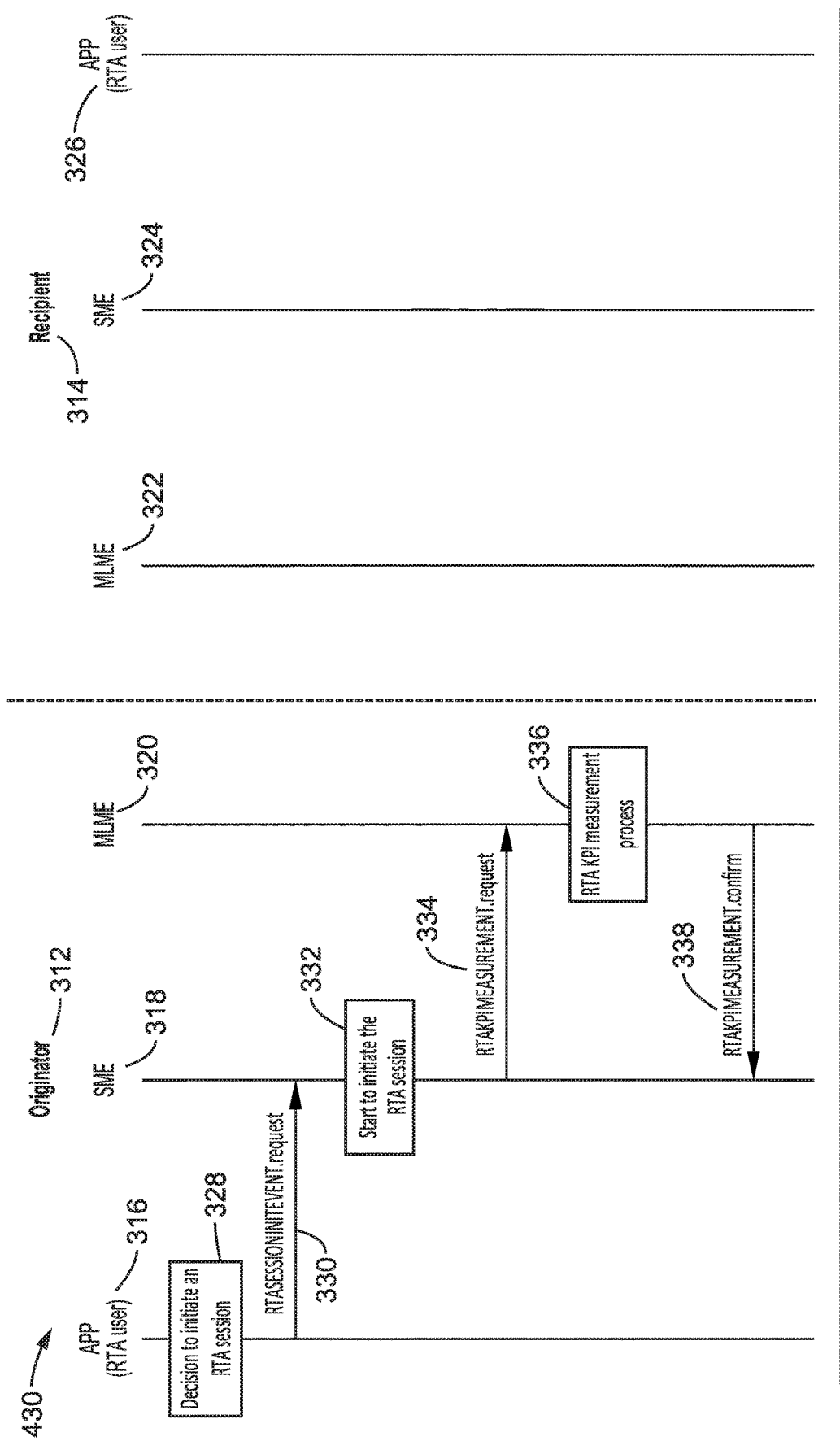
FIG. 18A and FIG. 18B is a communication sequence diagram of an alternative procedure for RTA session initiation being performed according to at least one embodiment of the present disclosure.
Figure 18B:
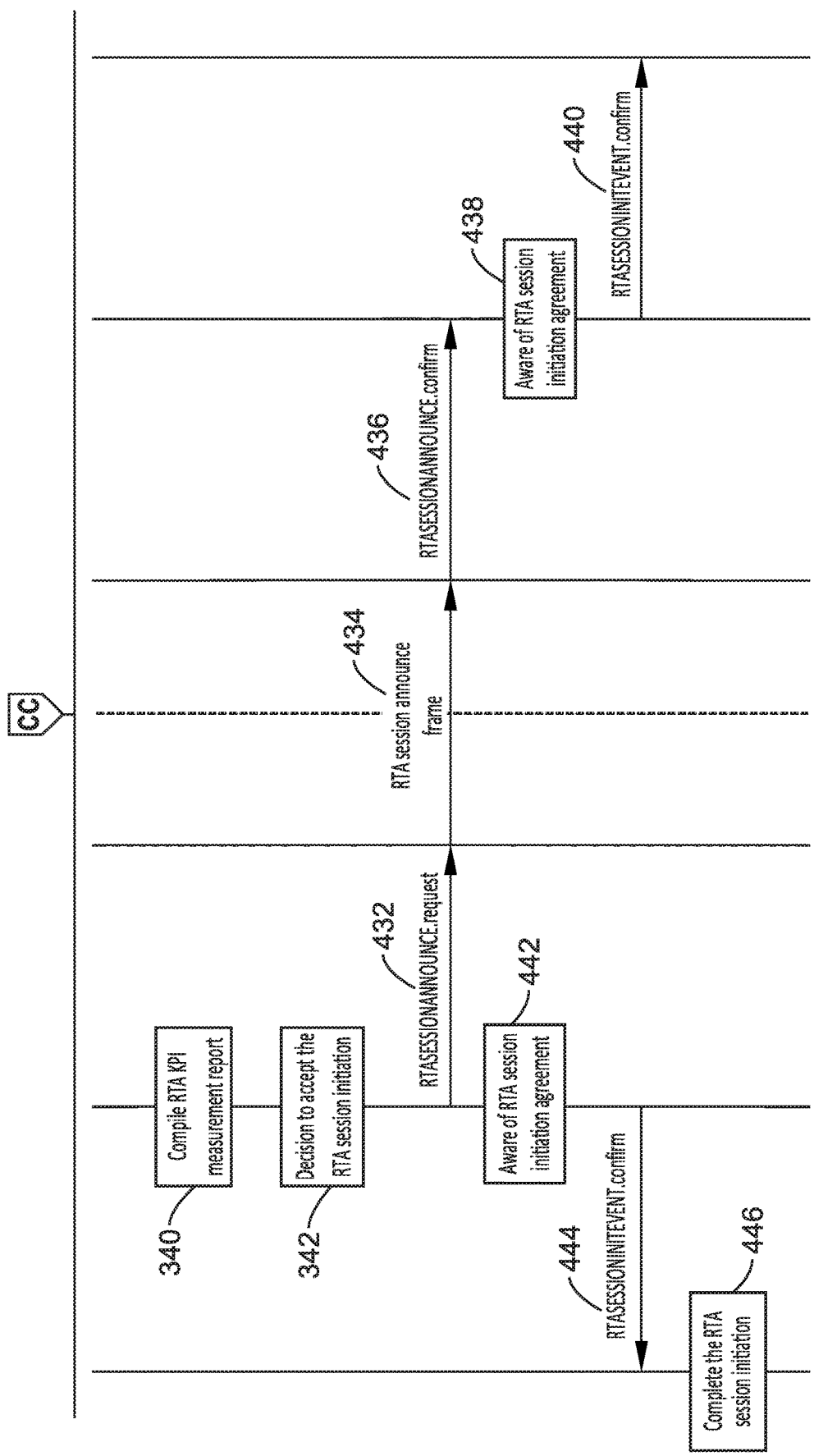

FIG. 18A and FIG. 18B illustrates an example embodiment 430 of an alternative procedure for performing RTA session initiation. In certain situations, the originator STA initiates an RTA session without negotiating with the recipient STA. The figure provides another example of a message exchange between two STAs to complete RTA session initiation. The figure depicts communications between an originator and recipient as in FIG. 15A through FIG. 15C.

The RTA user of the originator STA decides 328 to initiate an RTA session and passes an RTASESSIONEVENT.request message 330 to its SME. The RTASESSIONEVENT.request message 330 is shown in Table 3. Then the SME needs to determine 332 a few things before initiating the RTA session. First the SME measures the RTA KPI to ensure that sufficient channel resource is available to establish the RTA session. In this case the RTA session management at the SME of the originator STA makes a decision to initiate the RTA session and it sends a RTAKPIMEASURE.request message 334 to the RTA KPI measurement protocols function at the MLME layer. The format of the RTAKPIMEASURE.request message is explained in Table 30.

Then the MLME launches the RTA KPI measurement procedure 336 according to the request in the RTAKPIMEASURE.request message. For example, if the originator STA plans to transmit RTA packets, the channel bandwidth measurement as explained in Section 4.5.4.2.1 can be performed at this time. The RTA KPI measurement procedure is explained in Section 4.5.4. After the MLME finishes the measurement procedure, it sends RTAKPIMEASURE.confirm message 338 as explained in Table 31 to report the measurement results.

When the SME of the originator STA receives and compiles 340 in FIG. 18B the RTA KPI measurement results, it decides 342 whether to establish the RTA session or not. For example, the STA can compare the RTA KPI measurement results with the requirement information of the RTA session (as defined in FIG. 14). If the measurement results satisfy the requirement, it determines to establish the RTA session.

Figure 25:
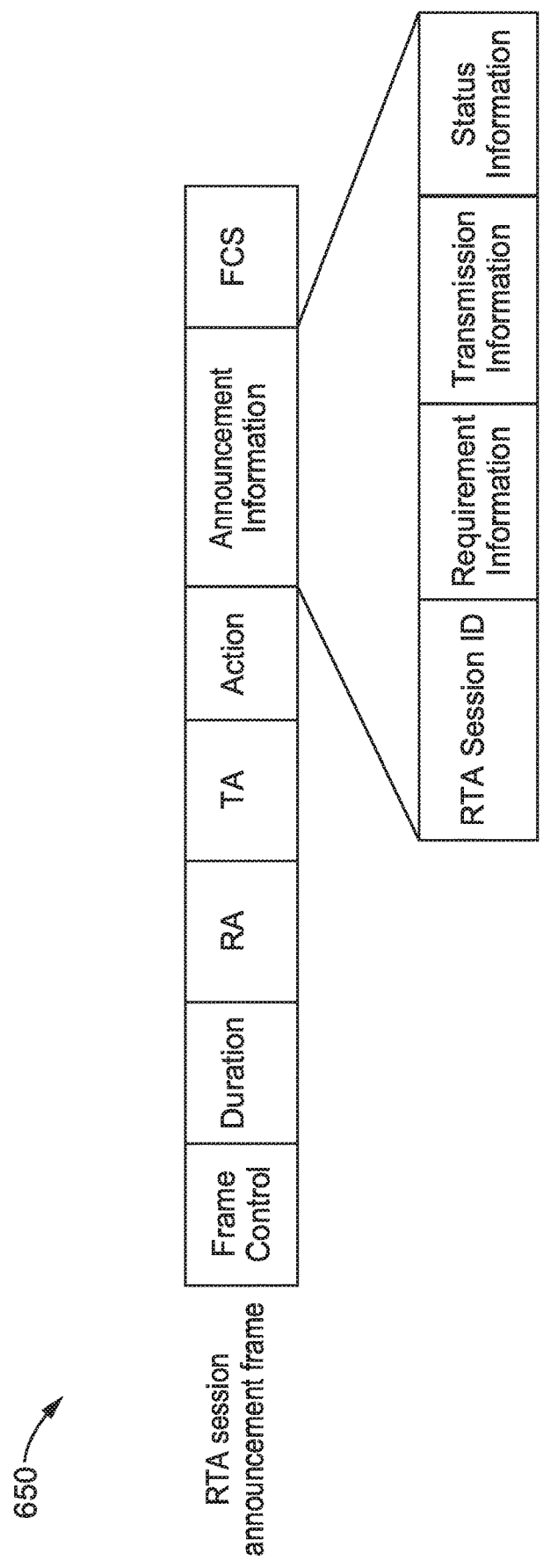
FIG. 25 is a data field diagram of an RTA session announcement frame format according to at least one embodiment of the present disclosure.

If the STA decides to establish the RTA session initiation, the RTA session management at the SME of the originator STA sends an RTASESSIONANNOUNCE.request message 432 as shown in Table 17 to the RTA session events function at the MLME via MLME SAP interface. When the MLME of the originator STA receives the RTASESSIONANNOUNCE.request message, it collects the RTA session information in the RTASESSIONANNOUNCE.request message and sends an RTA session announce request frame 434 to the recipient STA. The format of the RTA session announcement request frame is shown in FIG. 25. The MLME of the recipient STA receives the frame and generates an RTASESSIONANNOUNCE.confirm message 436 as shown in Table 18 to its SME via MLME SAP interface.

The SME of the both originator STA and recipient STA are aware 438, 442, of the RTA session initiation results. They forward the result via an RTASESSIONINITEVENT.confirm message 440, 444 to their respective APP layer, thus RTA session initiation is completed 446. The RTASESSIONINITEVENT.confirm message as shown in Table 6.

Table 11 shows an example of RTA session table created by the RTA session initiation procedure at STA 0 when considering the network topology in FIG. 5. The RTA session in the table can contain all the information listed in FIG. 14. In order to make the RTA session table easier to understand, the table only contains the part of the RTA session information listed in FIG. 14. The RTA session table at STA 0 (AP) as shown in Table 11 contains three RTA sessions. Each column in the table represents an RTA session. The session ID is simplified to an index number.

The first Session ID column represents RTA session 1 (simplified Session ID), which transmits RTA traffic from STA 0 to STA 2. RTA session 1 starts at 1 ms (Session Start Time) and ends at 900 ms (Session End Time). Every time the RTA session generates traffic, STA 0 has full flexibility to allocate channel time (Time Allocation Options), the RU (RU Allocation Options) and the spatial stream (SS Allocation Options). The periodic Time of RTA session 1 is 0 ms, which means RTA session 1 generates RTA traffic every 10 ms. The RTA priority is 5 and it will be transmitted through VI queue. The session status is active, which means the RTA session initiation is completed successfully and the session is generating RTA packets.

The second session ID column represents RTA session 2, which transmits RTA traffic from STA 3 to STA 0. RTA session 2 starts at 3 ms and ends at 800 ms. Every time the RTA session generates traffic, STA 0 has full flexibility to allocate channel time (Time Allocation Options), the RU (RU Allocation Options) but the spatial stream (SS Allocation Options) must be fixed. The periodic Time of RTA session 2 is 20 ms, which means RTA session 2 generates RTA traffic every 20 ms. The RTA priority is 5 and it will be transmitted through VI queue. The session status is active, which means the RTA session initiation is completed successfully and the session is generating RTA packets.

The third Session ID row represents RTA session 3, which transmits RTA traffic from STA 4 to STA 0. RTA session 3 starts at 3 ms and ends at 700 ms. Every time the RTA session generates traffic, STA 0 has full flexibility to allocate channel time (Time Allocation Options), the RU (RU Allocation Options) and the spatial stream (SS Allocation Options). The periodic Time of RTA session 3 is 0 ms, which means RTA session 3 does not generate RTA traffic periodically. The RTA priority is 6, which is higher than the other two RTA sessions. The packets generated by this RTA session will be transmitted through VO queue. The session status is active, which means that RTA session initiation has completed successfully and the session is generating RTA packets.

Figure 19:
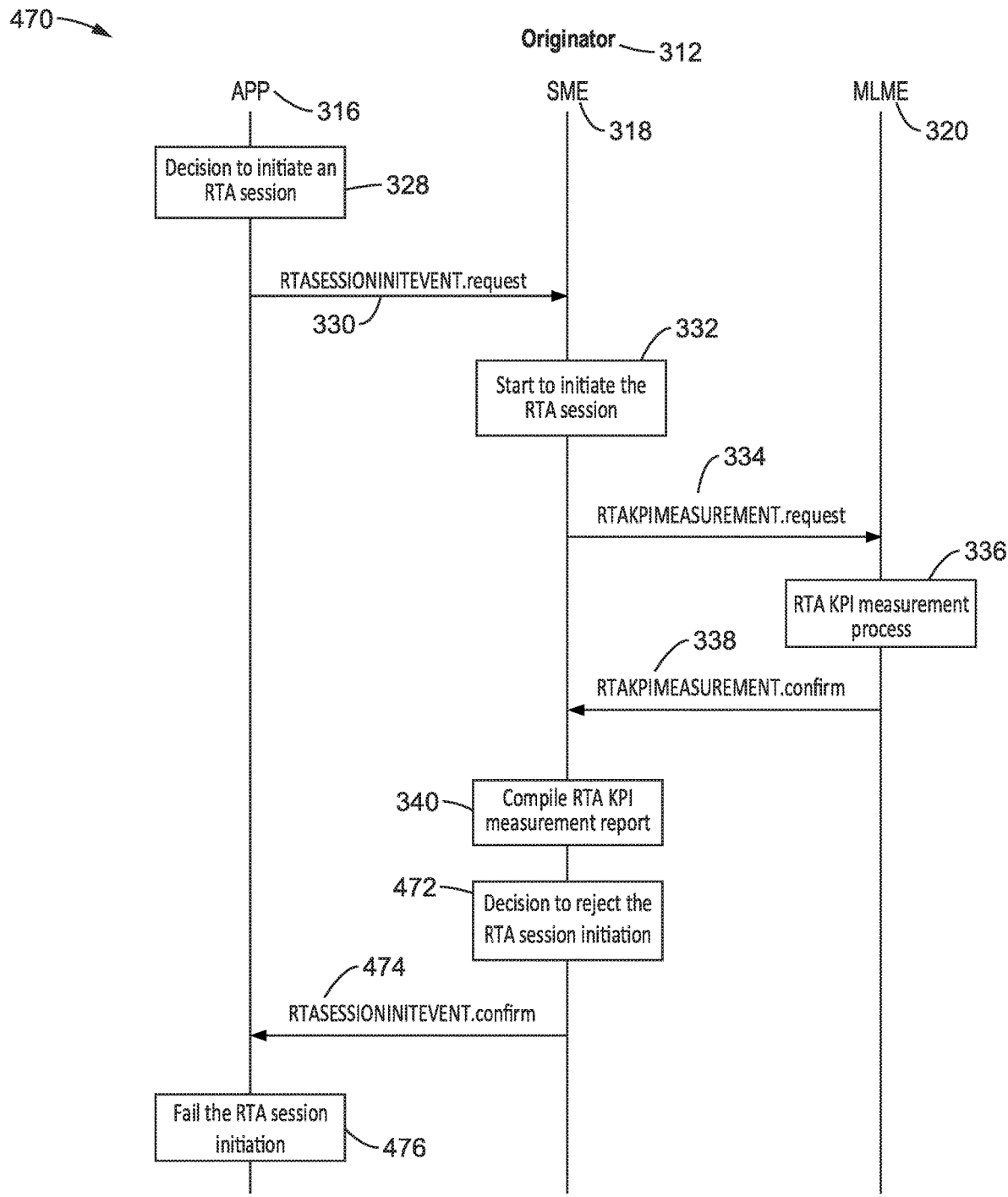
FIG. 19 is a communication sequence diagram of RTA session initiation being rejected by the originator station (STA) being performed according to at least one embodiment of the present disclosure.

FIG. 19 illustrates an example embodiment 470 of an RTA session initiation being rejected by the originator STA. As in FIG. 18A and FIG. 18B, the communication between APP, SME and MLME take place on the originator side with communication from the APP layer to the SME and MLME down to the point where the SME compiles the measurements 340 and then instead of deciding to accept initiation as in FIG. 18A and FIG. 18B, in this example it decides to reject initiation 472. The SME passes an RTASESSIONIN-ITEVENT.confirm message 474 to the APP with the InitiationSuccess field setting to "0", so that when the RTA user at the APP layer receives this message, it knows the RTA session initiation failed 476.

Figure 20A:
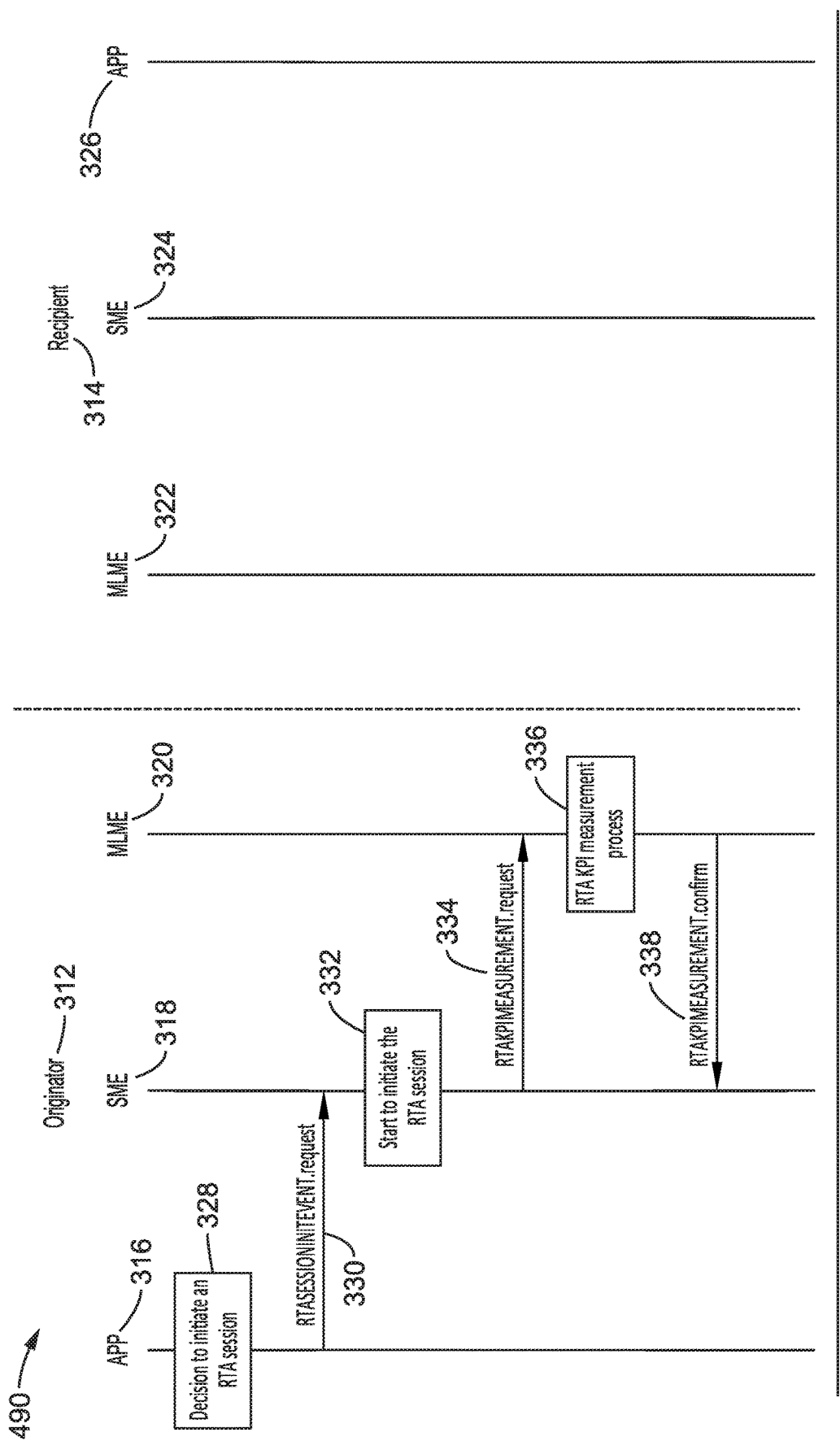
FIG. 20A and FIG. 20B is a communication sequence diagram of an RTA session initiation rejected by the APP layer of a recipient station (STA) being performed according to at least one embodiment of the present disclosure.
Figure 20B:
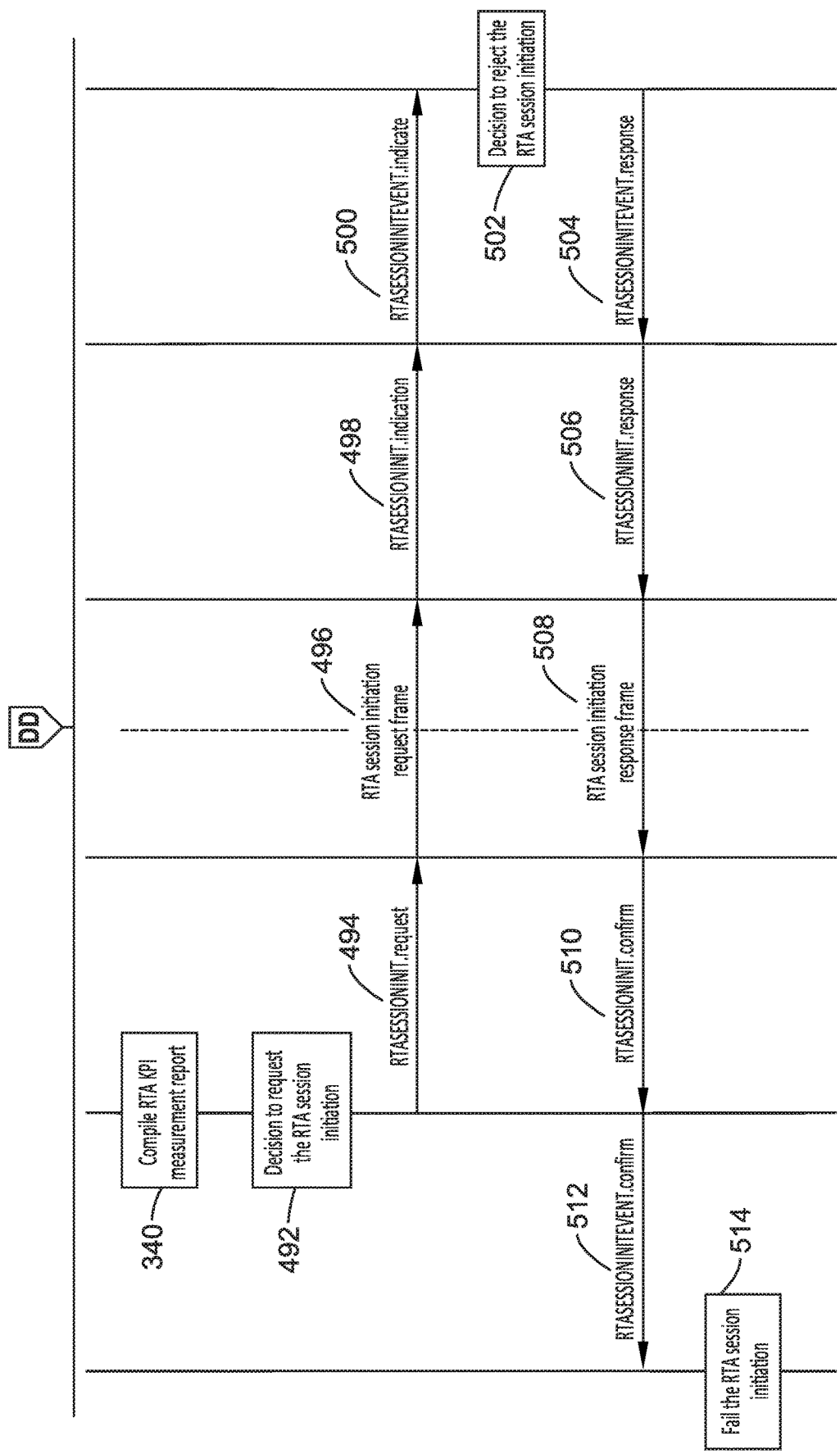

FIG. 20A and FIG. 20B illustrates an example embodiment 490 of an RTA session initiation being rejected by the recipient STA. As in FIG. 18A and FIG. 18B, the communication between APP, SME and MLME take place on the originator side with communication from the APP layer to the SME and MLME down to the point where the SME compiles the measurements 340 in FIG. 20B and here it decides to request session initiation 492 from the recipient APP. An RTASESSIONINIT.request message 494 is sent to the MLME which generates an RTA session initiation request frame 496 to the MLME of the recipient. The recipient MLME receives this input and generates an RTASESSIONINIT.indication message 498 to its SME which in turn generates an RTASESSIONINITEVENT.indicate message 500 to the APP layer. The APP layer decides to reject the initiation 502, and sends an RTASESSIONIN-ITEVENT.response message 504, indicating that the initiation is rejected, to its SME which sends and RTASES-SIONINIT.response message 506 to its MLME which sends a RTA session initiation response frame 508 to the MLME of the originating station. The originator MLME sends an RTA SESSIONINIT.confirm message 510 to its SME which sends an RTASESSIONINITEVENT.confirm message 512 containing an indication of the initiation rejection to the APP layer which fails 514 the RTA session initiation.

Table 12 shows an example of the RTA session table at STA 0 after a new RTA session is initiated between STA 0 and STA 1. The RTA session table before the initiation procedure is shown in Table 11. Here, a new RTA session 4 is inserted into the RTA session table. The session ID represents the simplified RTA session identifying information. In the new RTA session, the session status is error since the session initiation is rejected by STA 0.

4.5.2.2. RTA Session Re-initiation

Figure 21A:
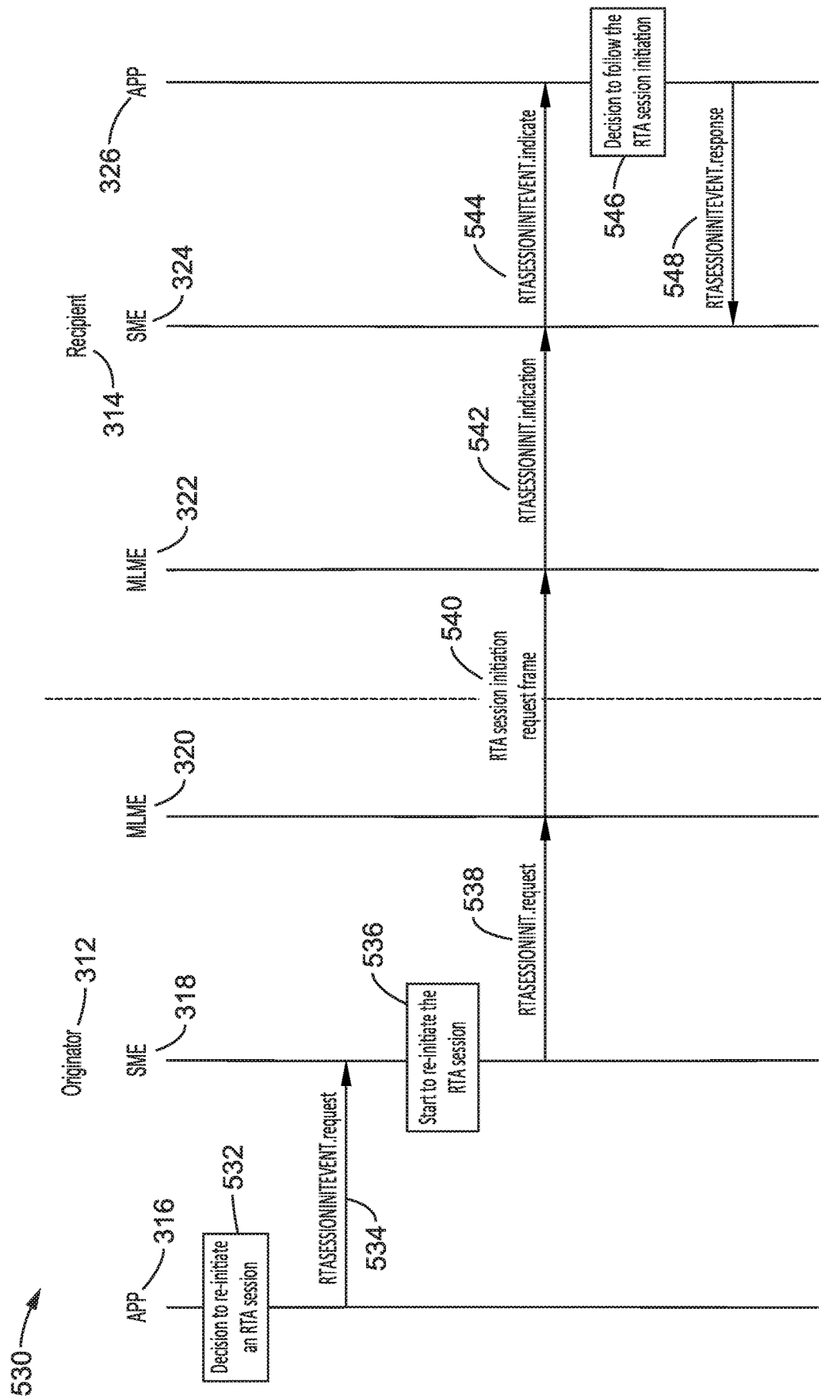
FIG. 21A and FIG. 21B is a communication sequence diagram of a procedure exemplifying RTA session re-initiation being performed according to at least one embodiment of the present disclosure.
Figure 21B:
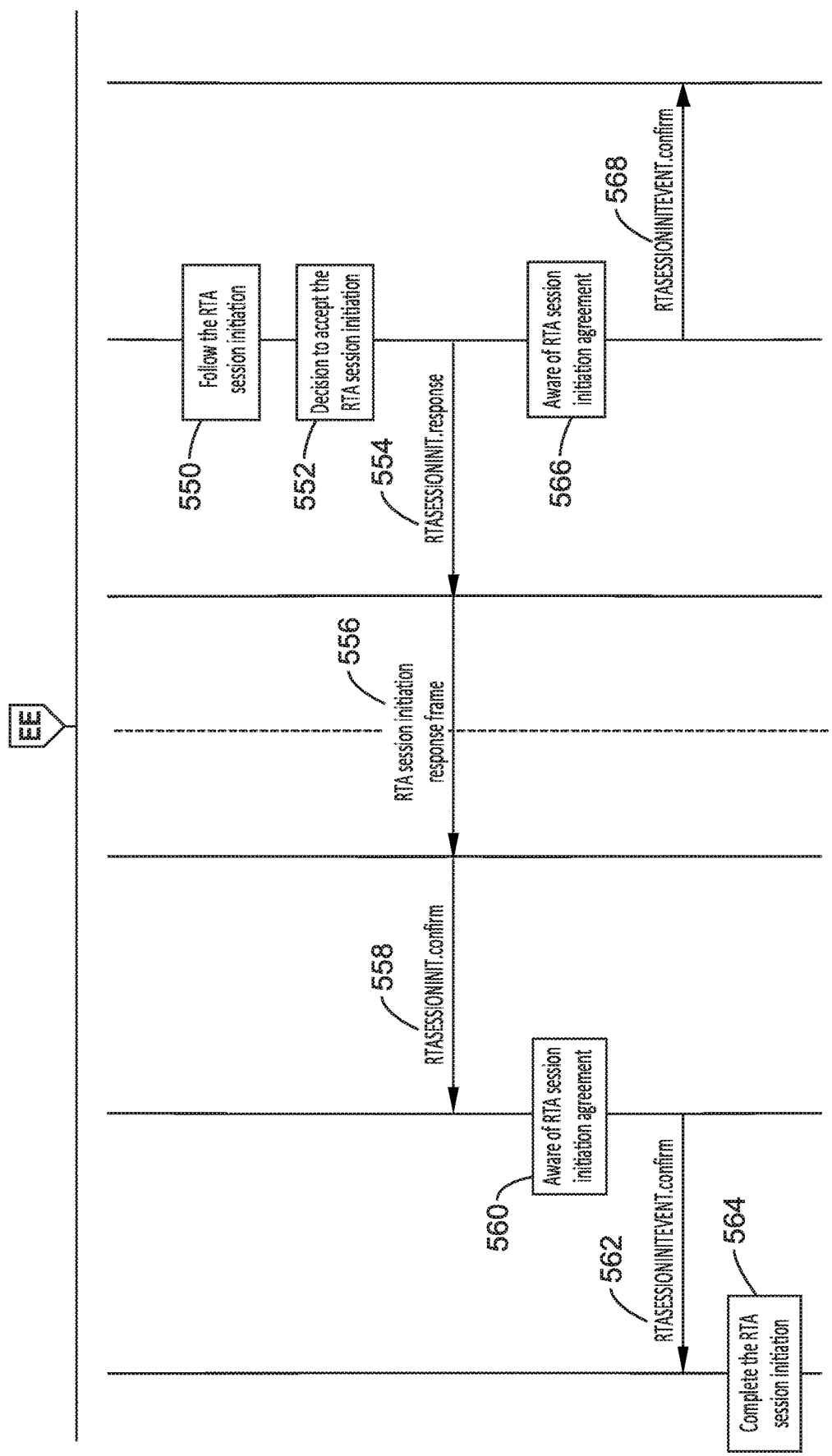

FIG. 21A and FIG. 21B illustrates an example embodiment 530 of a procedure for RTA session re-initiation. The originator STA is able to re-initiate the RTA session when the initiation request is rejected by the recipient STA. The figure shows the message exchange between two STAs for an RTA session re-initiation. The procedure of RTA session re-initiation is the same as the complete procedure of the RTA session initiation as shown in FIG. 15A through FIG. 15C except that the RTA KPI measurement procedures are skipped on both sides. The STA is able to indicate that the measurement is not needed by setting the MeasurementIndication parameter to "0" in the messages.

When the RTA user of the originator STA decides (determines) to initiate an RTA session 532, it passes an RTASES-SIONEVENT.request message 534 to its SME. Then since the message contains information that the measurement is not needed, the SME immediately starts to initiate 536 the RTA session and sends an RTASESSIONINIT.request message 538 to the RTA session events function at the MLME via MLME SAP interface. The format of the RTASES-SIONINIT.request message is explained in Table 7.

When the MLME of the originator STA receives the RTASESSIONINIT.request message, it collects the RTA session information in the RTASESSIONINIT.request message and sends an RTA session initiation request frame 540 to the recipient STA MLME. The MLME of the recipient STA receives the frame and generates an RTASESSIONIN-IT.indication message 542, as shown in Table 8, to its SME via the MLME SAP interface.

Then, the recipient SME passes an RTASESSIONINITE-VENT.indicate message 544, as shown in Table 4, to the RTA user at the APP layer of the recipient STA. If the RTA user at the APP layer of the recipient STA determines 546 to allow the initiation event, it generates an RTASESSIONIN-ITEVENT.response message 548, as shown in Table 5, back to the SME layer. Within this response message it has set the FollowEvent field in RTASESSIONINITEVENT.response message 548 to "1", since the APP layer has decided to continue the initiation.

Then SME continues following 550, as seen in FIG. 21B, the RTA session initiation procedure, and it can proceed without a measurement as indicated from the originator side. A decision is made 552 to grant RTA session initiation. The SME of the recipient STA sends an RTASESSIONINIT.response message 554 containing feedback information to its MLME. The format of RTASESSIONINIT.response message is explained in Table 9. Then, the MLME of the recipient STA sends an RTA session initiation response frame 556 to the originator STA. The MLME of the originator STA receives the frame and sends an RTASES-SIONINIT.confirm message 558, as shown in Table 10, to its SME, which is made aware 560 of the session initiation agreement. The SME of the originator then informs the RTA users, through sending an RTASESSIONINITEVENT.confirm message 562, that the initiation of the RTA session is successful or not, which completes 564 RTA session initiation. It will be noted that the SME of the recipient was similarly made aware 566 of the session initiation agreement and sends an RTASESSIONINITEVENT.confirm message 568 to its users at the APP layer.

Table 13 shows an example of the RTA session table at STA 0 after RTA session 4 is re-initiated between STA 0 and STA 1. The RTA session table before the initiation procedure is shown in Table 12. The initiation of RTA session 4 suggested to defer the session start time in the comment field of RTA session information as shown in FIG. 14. So in this case, RTA session 4 is re-initiated by STA1 and STA0 with new session start time. STA0 grants the re-initiation of RTA session 4.

4.5.2.3. RTA Session Destruction

Figures 22, 23:
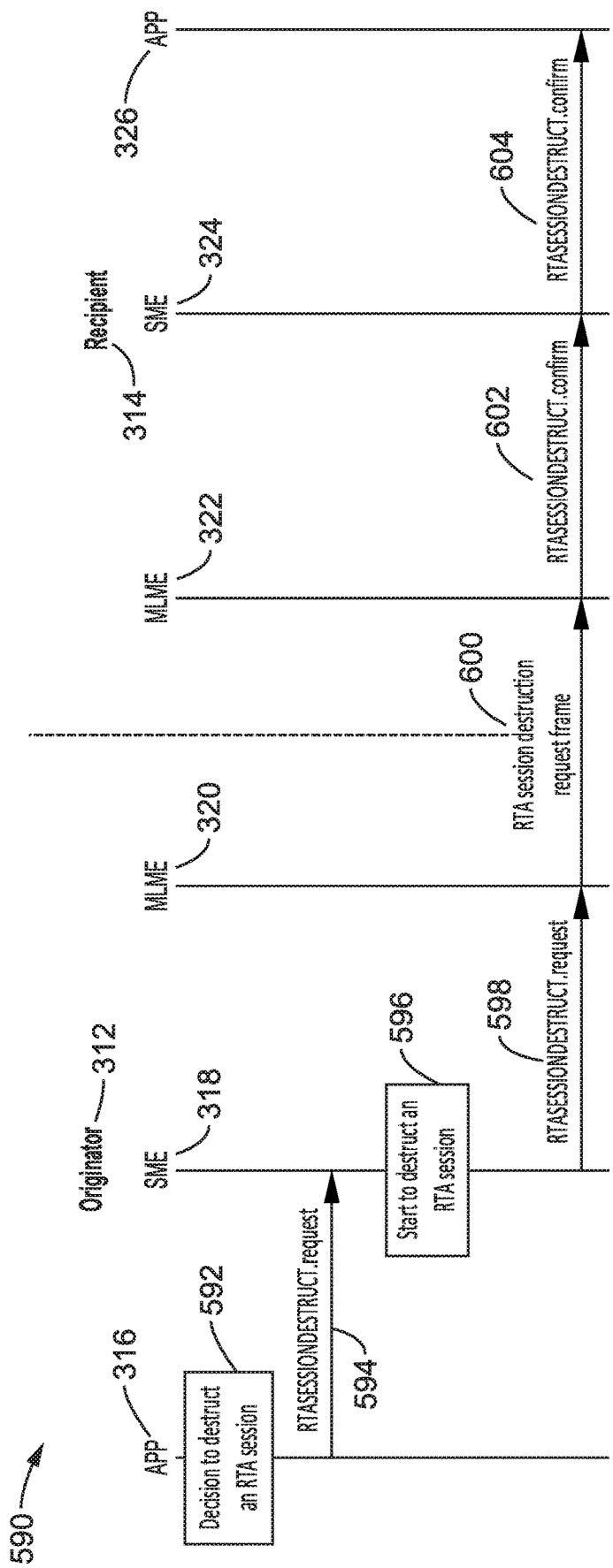
FIG. 22 is a communication sequence diagram of a procedure exemplifying RTA session destruction being performed according to at least one embodiment of the present disclosure.
FIG. 23 is a data field diagram of an RTA session destruction request frame format according to at least one embodiment of the present disclosure.

FIG. 22 illustrates an example embodiment 590 of a procedure for performing RTA session destruction between originator and recipient STAs. When the RTA user of the originator STA decides 592 to destruct (end/close) an RTA session, it passes an RTASESSIONDESTRUCT.request message 594 to its SME. Then, the RTA session management at the SME of the originator STA starts to destruct 596 the session and sends an RTASESSIONDESTRUCT.request message 598 to the RTA session events function at the MLME via the MLME SAP interface. The format of the RTASESSIONDESTRUCT.request message is explained in Table 14. When the MLME of the originator STA receives the RTASESSIONDESTRUCT.request message, it collects the RTA session information in the RTASESSIONDE-STRUCT.request message and sends an RTA session destruction request frame 600 to the recipient STA. The format of the RTA session destruction request frame is shown in FIG. 23. The MLME of the recipient STA receives the frame and generates an RTASESSIONDESTRUCT.confirm message 602 as shown in Table 15 to its SME via MLME SAP interface and forwards it 604 to the RTA user at the APP layer of the recipient.

FIG. 23 illustrates an example embodiment 610 of an RTA session initiation request frame. A Frame Control field indicates the type of frame. A Duration field contains NAV information used for CSMA/CA channel access. An RA field contains an address for the recipient of the frame. A TA field contains the address of the STA that transmitted the frame. An Action field indicates the type of management frame; which in this example indicates that the management frame is an RTA session destruction request frame. An RTA Session ID field indicates the identifying information of RTA session, which is shown in FIG. 9.

Table 16 shows an example of the RTA session table at STA 0 after RTA session 3 is destructed. The RTA session table before the initiation procedure is shown in Table 13.

4.5.2.4. RTA Session Announcement

Figure 24:
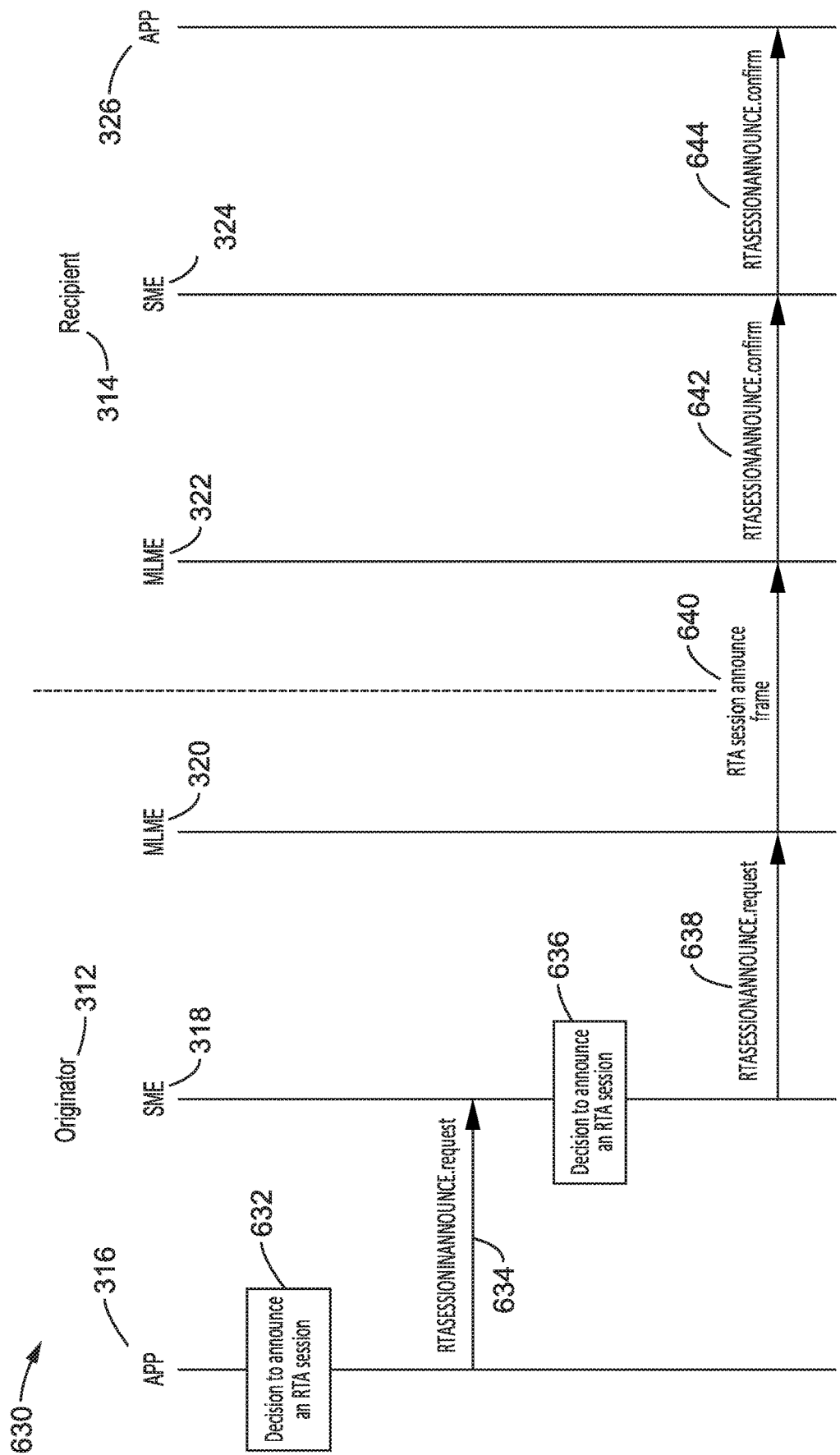
FIG. 24 is a communication sequence diagram of a procedure exemplifying an RTA session announcement according to at least one embodiment of the present disclosure.

FIG. 24 illustrates an example embodiment 630 of a procedure for performing an RTA session announcement in which a STA is able to inform its neighboring STAs of its RTA session information. In the figure the message exchange is seen between two STAs which share RTA session information. The details of how one STA shares an RTA session with another STA is described as follows.

When the RTA user at the APP layer of the originator STA decides 632 to share or announce an RTA session, it passes an RTASESSIONANNOUNCE.request message 634 to the RTA session management at the SME of this originator STA which decides to announce an RTA session 636 and forwards the message 638 to the RTA session events function at the MLME via MLME SAP interface. The format of the RTASESSIONANNOUNCE.request message is explained in Table 17.

When the MLME of the originator STA receives the RTASESSIONANNOUNCE.request message 638, it collects the RTA session information in the RTASESSIONAN-NOUNCE.request message and sends an RTA session announce request frame 640 to the recipient STA. The format of the RTA session announcement request frame is shown in FIG. 25. The MLME of the recipient STA receives the frame and generates an RTASESSIONAN-NOUNCE.confirm message 642 as shown in Table 18 to its SME via MLME SAP interface. The SME then forwards this message 644 to the RTA user of the APP layer.

FIG. 25 illustrates an example embodiment 650 of the RTA session announcement frame format having the following fields. A Frame Control field indicates the type of frame. A Duration field contains NAV information used for CSMA/CA channel access. An RA field contains an address for the recipient of the frame. A TA field contains the address of the STA that transmitted the frame. An Action field indicates the type of management frame, which in this case indicates that the management frame is an RTA session announcement frame.

An Announcement Information field follows the Action field when the Action field indicates that the frame is RTA session announcement frame. The Announcement Information field contains the following subfields. An RTA Session ID subfield provides identifying information for the RTA session. The content of this RTA Session ID subfield is shown in FIG. 9. A Requirement Information subfield contains requirement information of the RTA session as described in FIG. 14. A Transmission Information subfield provides transmission information for the RTA session as described in FIG. 14. A Status Information subfield contains status information for the RTA session as described in FIG. 14.

Table 19 shows an example of the RTA session table at STA 0 after STA5 announces that it established RTA session 5. The RTA session table before the initiation procedure is shown in Table 11.

4.5.3. RTA Queue Management

Figure 26A:
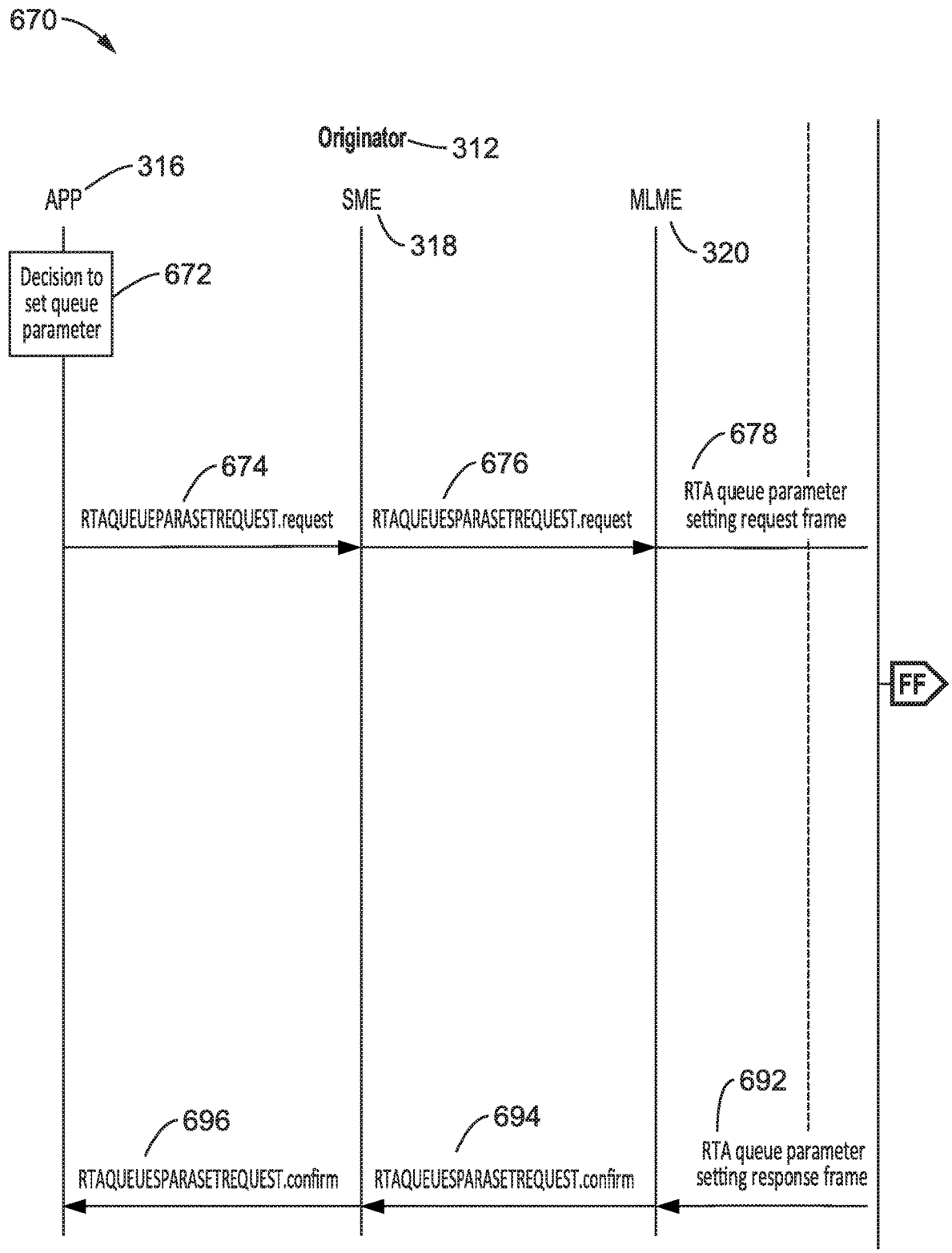
FIG. 26A and FIG. 26B is a communication sequence diagram exemplifying RTA queue parameter setting according to at least one embodiment of the present disclosure.
Figure 26B:
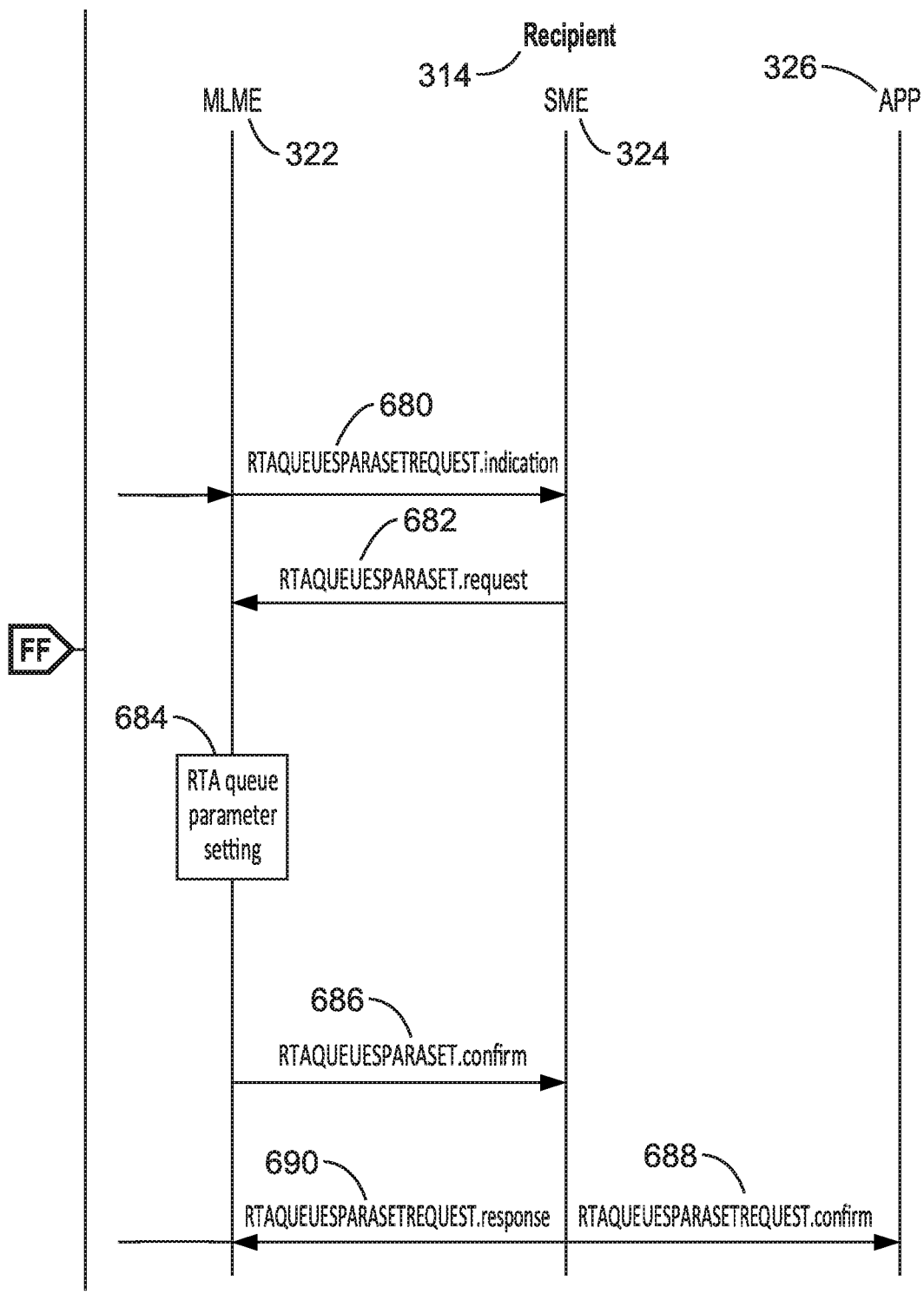

FIG. 26A and FIG. 26B illustrates an example embodiment 670 of RTA queue parameter setting. This section explains the details of how a STA sets queue parameters by using the interface between the RTA queue management at SME and the RTA Queue Operation protocol function and the RTA queue setting frame function at MLME. The figure shows a message exchange between two STAs when the originator STA sets the parameters of the queue at the recipient STA.

When the originator STA decides 672 to set RTA queue parameters of the recipient STA, the RTA session management at the APP layer sends an RTAQUEUEPARASETRE-QUEST.request message 674, which is then forwarded 676 to the RTA session events function at the MLME via MLME SAP interface. The format of the RTAQUEUEPARASE-TREQUEST.request message is explained in Table 20.

Figure 27:
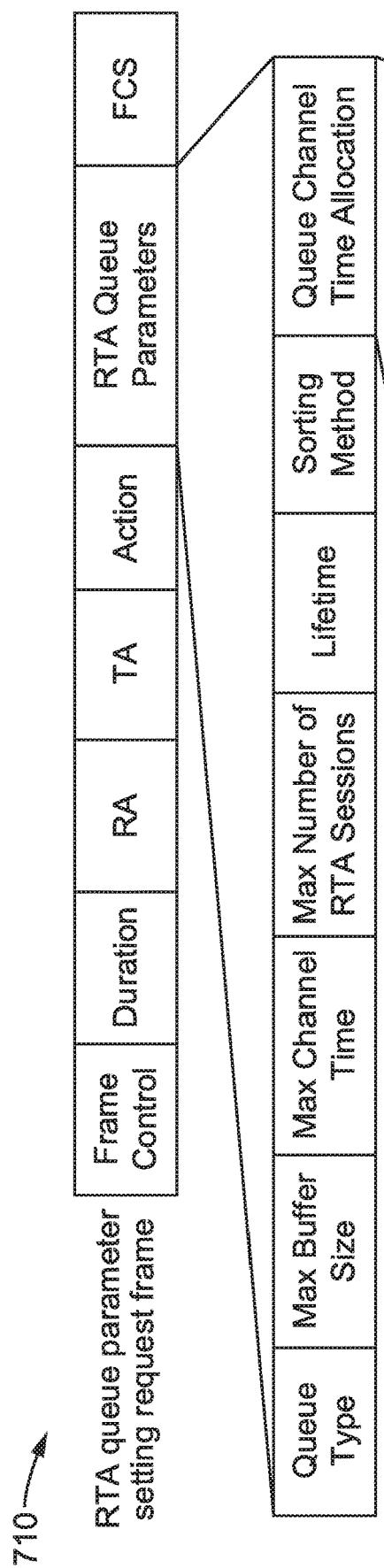
FIG. 27 is a data field diagram of an RTA queue parameter setting request frame according to at least one embodiment of the present disclosure.

When the MLME of the originator STA receives the RTAQUEUEPARASETREQUEST.request message, it collects the RTAQueuePara in the RTAQUEUEPARASETRE-QUEST.request message and sends an RTA queue parameter setting request frame 678 to the recipient STA. The format of the RTA queue parameter setting request frame is shown in FIG. 27. The MLME of the recipient STA receives the frame and in FIG. 26B generates an RTAQUEUEPARASE-TREQUEST.indication message 680 as shown in Table 21 to its SME via MLME SAP interface.

The RTA session management at the SME of the recipient STA then passes RTAQUEUEPARASET.request message 682 to the RTA Queue Operation protocol function at the MLME layer to perform RTA queue parameter setting 684. The format of the RTAQUEUEPARASET.request message is explained in Table 24. Then, the MLME sets the queue parameters according to the RTAQueuePara in the RTA-QUEUEPARASET.request message.

After the MLME finishes the queue parameter setting, it sends RTAQUEUEPARASET.confirm message 686, as explained in Table 25, to report the parameter setting result. Then, the SME of the recipient STA sends two messages. The SME sends an RTAQUEUEPARASETREQUEST.confirm message 688 to the recipient APP layer to inform it about the parameter update of the queue. The SME also sends an RTAQUEUEPARASETREQUEST.response message 690 containing parameter setting result to its MLME. The format of RTAQUEUEPARASETREQUEST.response message is explained in Table 22. Then, the MLME of the recipient STA sends an RTA queue parameter setting response frame 692 to the originator STA. The MLME of the originator STA receives the frame and sends an RTAQUE-UEPARASETREQUEST.confirm message 694, as shown in Table 23, to its SME. The SME of the originator then forwards the message 696 to inform the RTA users on whether the initiation of the RTA session has been successful or not.

FIG. 27 illustrates an example embodiment 710 of an RTA queue parameter setting request frame having the following fields. A Frame Control field indicates the type of frame. A Duration field contains NAV information used for CSMA/CA channel access. An RA field contains an address for the recipient of the frame. A TA field contains the address of the STA that transmitted the frame. An Action field indicates the type of management frame, which in this example indicates that the management frame is an RTA queue parameter setting request frame.

An RTA Queue Parameters field contains RTA queue parameter setting information having the following subfields. A Queue Type subfield indicates the type of queue, such as VO, VI, BE, BK, whose parameters are to be set. A Max Buffer Size subfield indicates the maximum buffer size of the queue. A Max Channel Time subfield indicates the maximum ratio of channel time that can be allocated to the queue. A Max Number of RTA Sessions subfield indicates the maximum number of RTA sessions whose packets can wait in the RTA queue. A Lifetime subfield indicates the lifetime of a packet in the queue; when the lifetime expires, the packet will be dropped. A Sorting Method subfield indicates the method to be used in sorting the packets in the queue. A Queue Channel Time Allocation subfield indicates the time during which the queue is allowed to transmit packets; which is shown with subfields for periodic time, start time, duration of each period, and end time.

Figure 28:
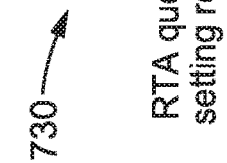
FIG. 28 is a data field diagram of an RTA queue parameter setting response frame according to at least one embodiment of the present disclosure.

FIG. 28 illustrates an example embodiment 730 of an RTA queue parameter setting response frame having the following fields. A Frame Control field indicates the type of frame. A Duration field contains NAV information used for CSMA/CA channel access. An RA field contains an address for the recipient of the frame. A TA field contains the address of the STA that transmitted the frame. An Action field indicates the type of management frame; which in this case indicates that the management frame is an RTA queue parameter setting response frame. An RTA Queue Parameter setting result field indicates whether the RTA queue parameter setting was successful or not.

Figure 29:
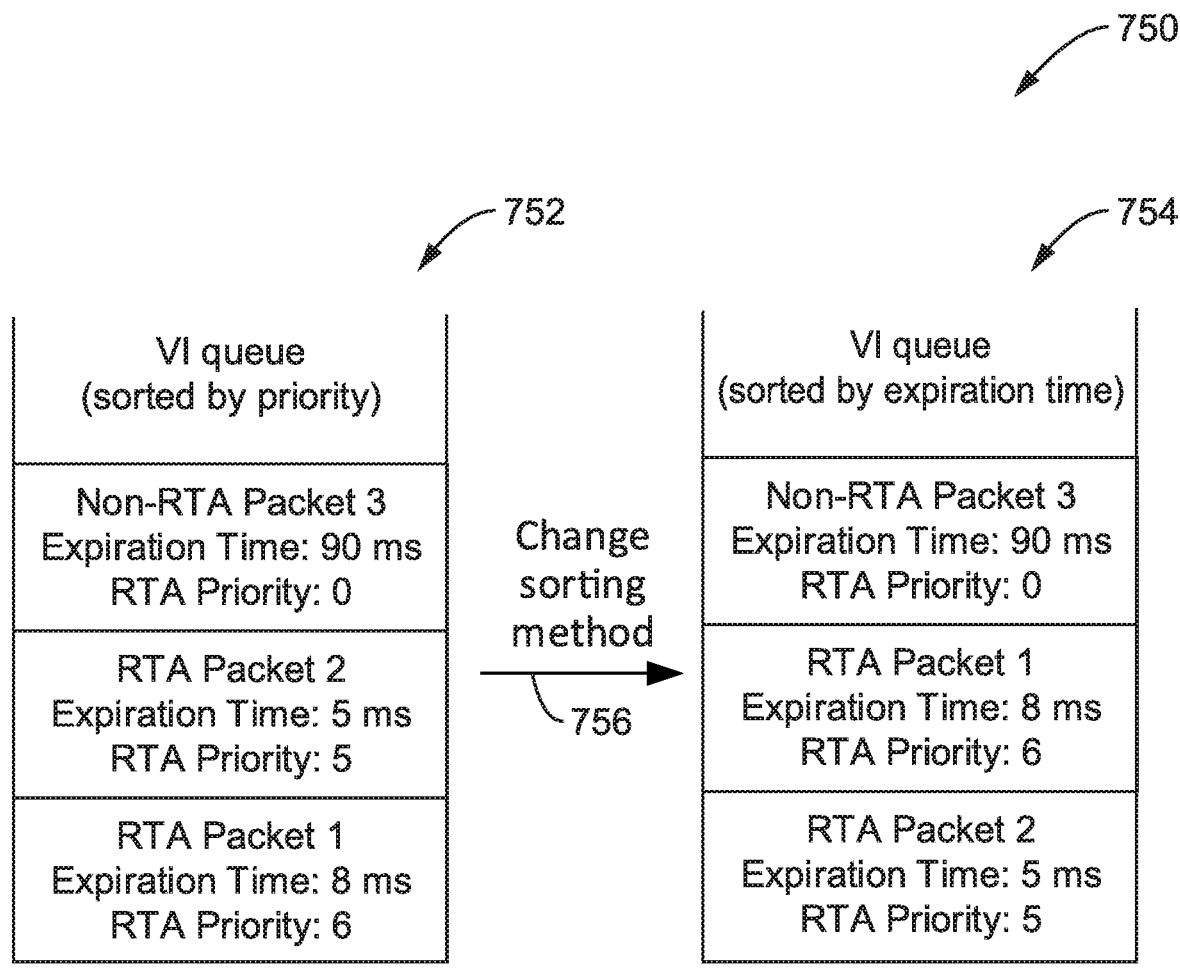
FIG. 29 is a queue diagram exemplifying sorting RTA packets in a queue by different importance indexes according to at least one embodiment of the present disclosure.
Figure 30:
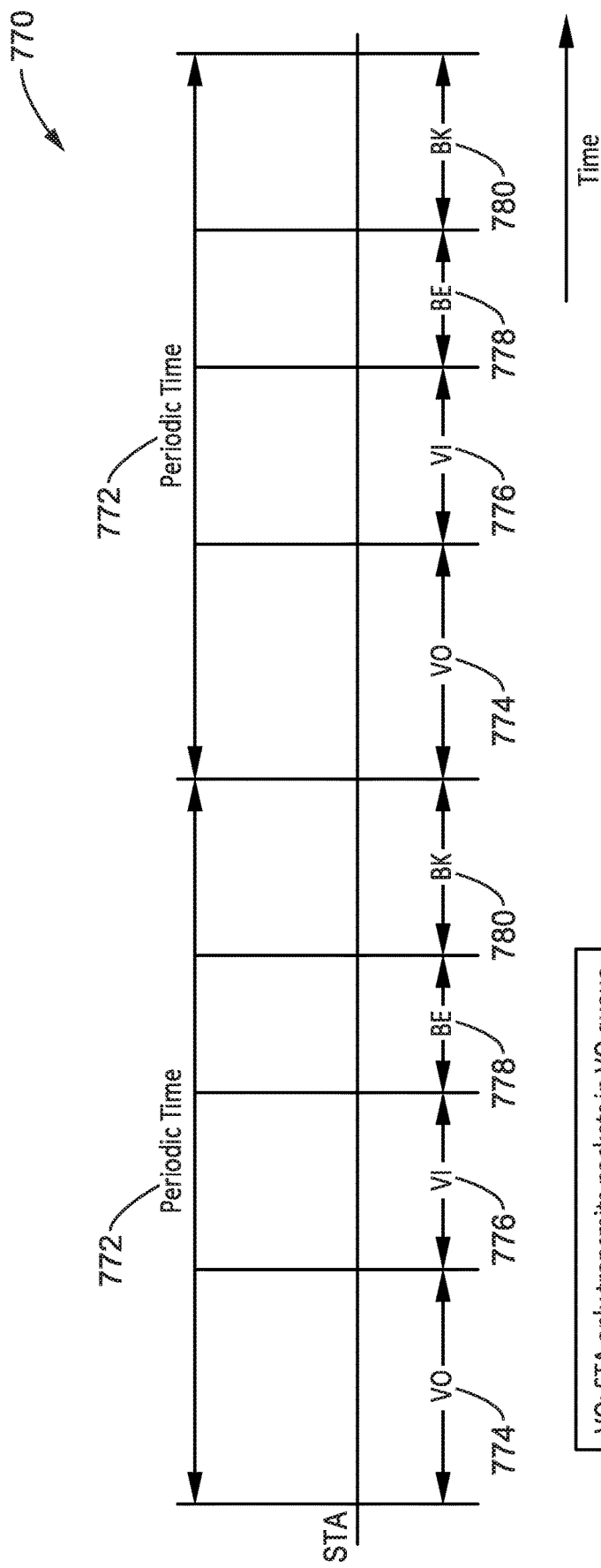
FIG. 30 is a transmission sequence diagram exemplifying allocating channel time to different queues according to at least one embodiment of the present disclosure.

FIG. 29 and FIG. 30 illustrates example embodiments 750, 770 of RTA queue operation in response to setting queue parameters.

In FIG. 29 is seen a case of sorting RTA packets by importance index. The figure explains the details of how an STA sets the sorting method to change the transmission order of the packets in its VI queue. It is seen that the VI queue sorts the packets by RTA priority 752, with the packet with the highest RTA priority in the queue to be transmitted first. The figure gives an example of the STA changing 756 the sorting method, in this example to sort the packets by expiration time 754, showing a different sort order of the packets depicted now with the shortest expiration time packets to be transmitted first.

In FIG. 30 is seen an example of how a station allocates channel time to different queues. Every periodic time 772, the STA allocates separate channel times to different queues, such as VO 774, VI 776, BE 778, BK queues 780 in EDCA. When the channel time is allocated to one queue, the STA only transmits the packets from that queue.

4.5.4. RTA KPI Measurement
4.5.4.1. General Scenario
This section explains the details of how a station measures RTA KPIs by using the interface between the RTA session management at SME and the RTA KPI Measurement Protocol function and RTA KPI Measure Frame function at MLME.

Figure 31:
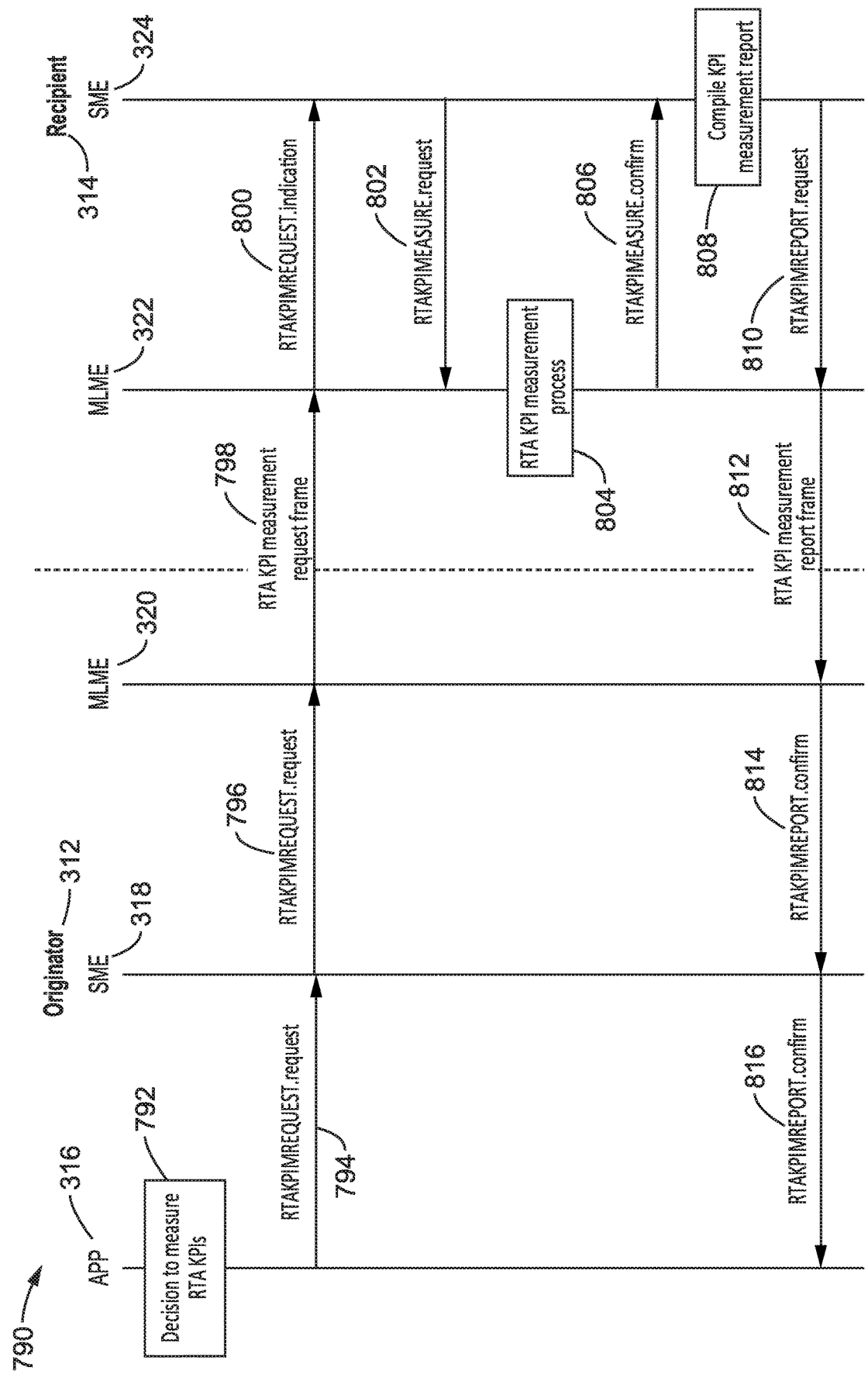
FIG. 31 is a communication sequence diagram exemplifying an RTA Key Performance Indicator (KPI) measurement process being performed according to at least one embodiment of the present disclosure.

FIG. 31 illustrates an example embodiment 790 depicting an example scenario of an RTA KPI measurement process between the MAC layers of an originator and recipient, showing message exchange when the originator STA requests RTA KPI measurement at the recipient STA.

When the RTA user at the APP of the originator STA determines 792 to request RTA KPIs measurement at the recipient STA, it sends an RTAKPIMREQUEST.request message 794 to the RTA session management at the SME of the originator STA which forwards it 796 to the RTA KPI measurement frame function at the MLME via MLME SAP interface. The format of the RTAKPIMREQUEST.request message is explained in Table 26. When the MLME of the originator STA receives the RTAKPIMREQUEST.request message, it collects the RTA KPI measure method and report method in the RTAKPIMREQUEST.request message 796 and the originator MLME sends an RTA KPI measure request frame 798 to the recipient STA MLME. The format of the RTA KPI measure request frame is shown in FIG. 32. The MLME of the recipient STA receives the frame and generates an RTAKPIMREQUEST.indication message 800 as shown in Table 27 to its SME via MLME SAP interface.

The RTA session management at the SME of the recipient STA then passes an RTAKPIMEASURE.request message 802 to the RTA KPI Measurement Protocol function at the MLME layer. The format of the RTAKPIMEASURE.request message is explained in Table 30. Then, the MLME starts to measure the RTA KPIs in an RTA KPI measurement process 804. After the MLME finishes the RTA KPI measurement, it sends an RTAKPIMEASURE.confirm message 806, as explained in Table 31, to report the measurement result.

Then, the SME of the recipient STA compiles the KPI measurement report 808 and sends an RTAKPIMREPORT.request message 810 containing measurement results to its MLME. The format of RTAKPIMREPORT.response message is explained in Table 28. Then, the MLME of the recipient STA sends an RTA KPI measurement report frame 812 to the originator STA. The format of the RTA KPI measurement report frame is shown in FIG. 33. The MLME of the originator STA receives the frame and sends an RTAKPIMREPORT.confirm message 814, as shown in Table 29, to its SME. The SME of the originator then forwards this message 816 to provide RTA KPI measurement results to the RTA users.

FIG. 32 illustrates an example embodiment 830 of an RTA KPI measurement request frame format having the following fields. A Frame Control field indicates the type of frame. A Duration field contains NAV information used for CSMA/CA channel access. An RA field contains an address for a recipient of the frame. A TA field contains the address of the STA that transmitted the frame. An Action field indicates the type of management frame; in this instance it indicates that the management frame is an RTA KPI measurement request frame. An RTA KPIs Measure Method field specifies how to measure the RTA KPIs. Several examples of the format of this field is explained in Section 4.5.4.2. An RTA KPIs Report Method field specifies how to report the RTA KPIs. In at least one embodiment, this field can be implemented as a one-bit indication. When this field is set to a first state (e.g., "1"), then the report will be transmitted immediately after RTA KPI measurement finishes; otherwise, when this field is set to a second state (e.g., "0"), then the report will be transmitted later.

FIG. 33 illustrates an example embodiment 850 of an RTA KPI measurement report frame format having the following fields. A Frame Control field indicates the type of frame. A Duration field contains NAV information used for CSMA/CA channel access. An RA field contains an address for the recipient of the frame. A TA field contains the address of the STA that transmitted the frame. An Action field indicates the type of management frame, which in this case indicates the management frame is a RTA KPI measure report frame. An RTA KPIs Measurement Report field carries the RTA KPI measurement results. The format of this field depends on the RTA KPI measurement method. Several examples of the format of this field is provided in Section 4.5.4.2.

4.5.4.2. Example of RTA KPI Measurement 4.5.4.2.1. Channel Bandwidth Measurement This section shows an example of measuring channel bandwidth using the RTA KPI measurement procedure.

FIG. 34 illustrates an example embodiment 870 of an RTA KPIs Measure Method field format for channel bandwidth measurement. The figure illustrates the content of RTA KPIs Measure Method field shown in FIG. 32 when the STA requests to measure channel bandwidth during the RTA KPI measurement procedure. A Measure Code field indicates the type of RTA KPI measurement, which in this case indicates that the RTA KPI measurement is channel bandwidth measurement. A Start Time field indicates the start time of the measurement. An End Time field indicates the end time of the measurement. A Timeout field indicates the longest interval that the STA requires for transmitting a packet to measure the channel condition.

FIG. 35 illustrates an example embodiment 890 of the content for RTA KPIs Measure Report field shown in FIG. 33 when the STA reports the channel bandwidth measurement result during the RTA KPI measurement procedure. A Measure Code field indicates the type of RTA KPI measurement, in this case indicating that the RTA KPI measurement is channel bandwidth measurement. A Channel bandwidth measurement time field indicates the duration of the measurement. A Best throughput Modulation and Coding Scheme (MCS) field indicates the estimated MCS that the STA can use to achieve its highest throughput. A PER of the best throughput MCS field indicates the Packet Error Rate when using the best throughput MCS for transmission. A Second best throughput MCS field indicates the estimated MCS that the STA can use to achieve the second highest throughput. PER of the Second best throughput MCS field indicates the packet error rate when using the second best throughput MCS for transmission.

A Best probability MCS field indicates the estimated MCS that the STA can use to achieve the lowest packet loss. A PER of Best probability MCS field indicates the packet error rate when using best probability MCS for transmission. An Average channel access delay field indicates the average time that the STA spends on channel contention. A Deviation of channel access delay field indicates the deviation of the time that the STA spends on channel contention. A Transmission time field indicates the transmitting time of the STA during the measurement. An Estimated channel bandwidth field indicates estimated channel bandwidth. By way of example and not limitation, one algorithm for this is as follows: (Estimated channel bandwidth)=(Best throughput MCS)*(Transmission time)/(Channel bandwidth measurement time).

Figure 36A:
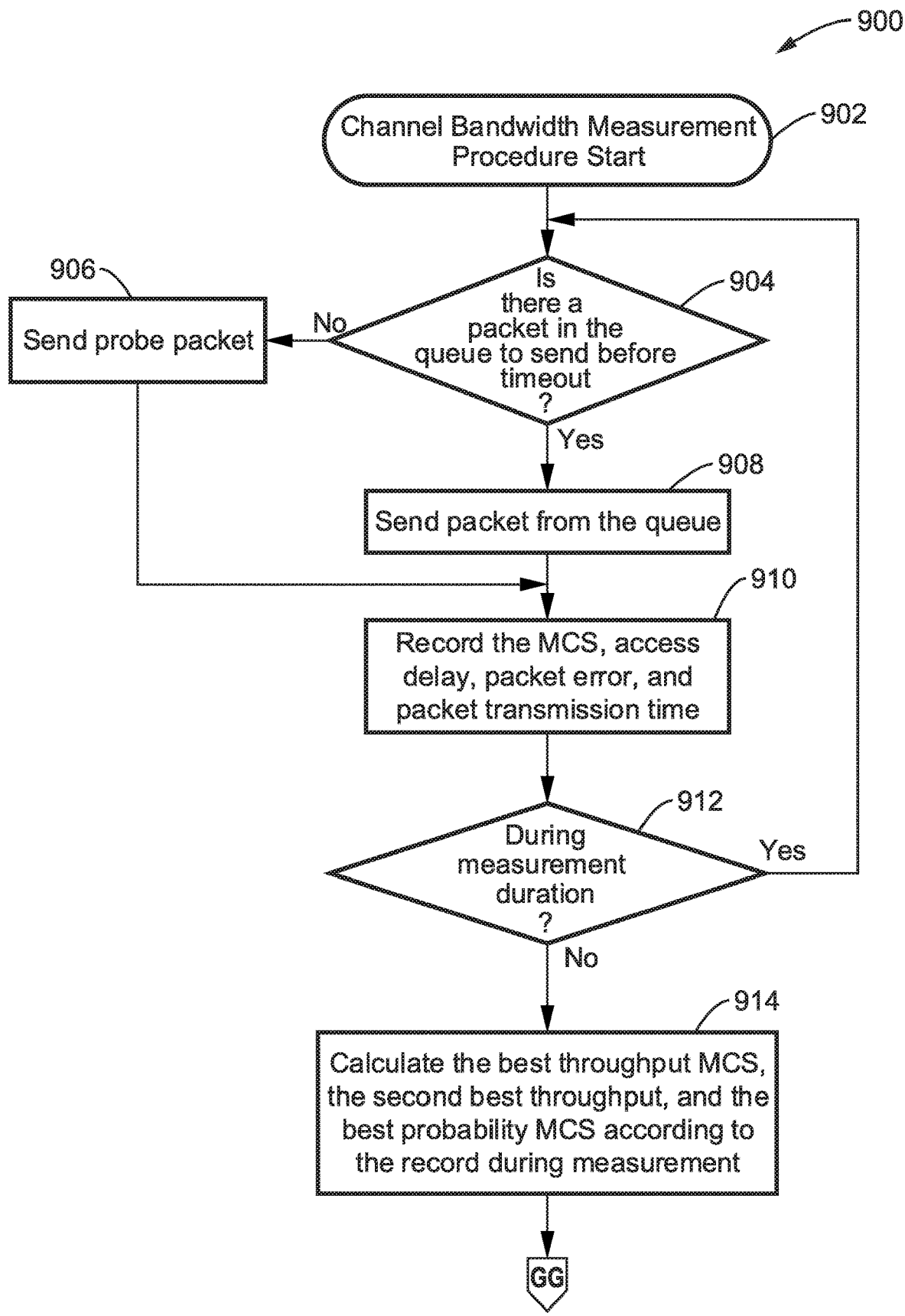
FIG. 36A and FIG. 36B is a flow diagram of channel bandwidth measurement according to at least one embodiment of the present disclosure.
Figures 36B, 37, 38:
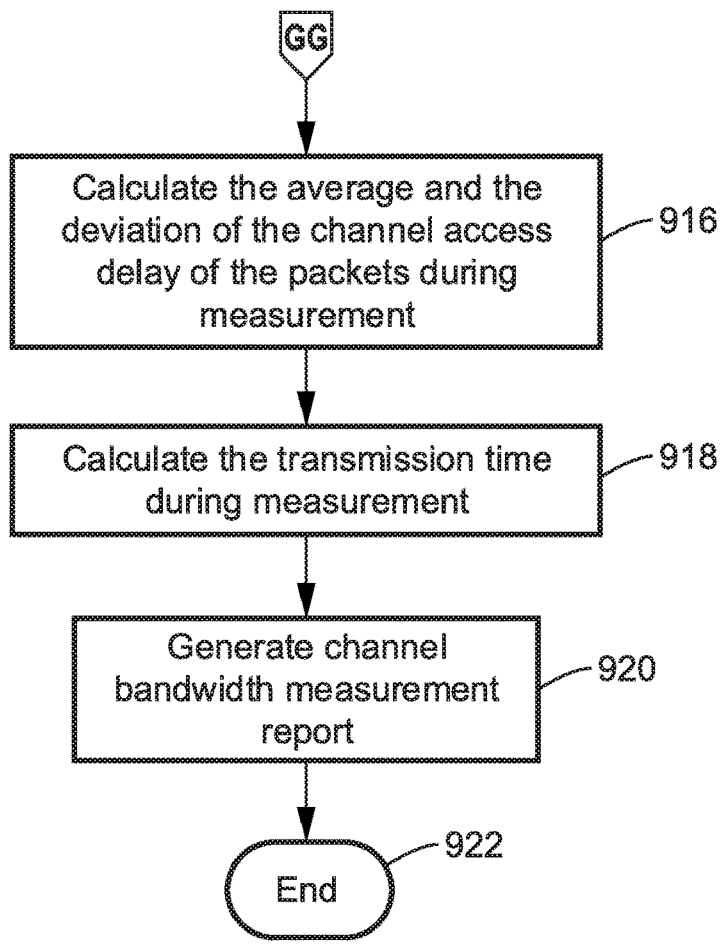
FIG. 37 is a data field diagram of an RTA KPI measurement method field format for packet latency according to at least one embodiment of the present disclosure.
FIG. 38 is a data field diagram of an RTA KPI measurement report field format for packet latency according to at least one embodiment of the present disclosure.

FIG. 36A and FIG. 36B illustrates an example embodiment 900 of a Channel bandwidth measurement procedure. A STA starts 902 the channel bandwidth measurement at the start time. A check is made 904 if the STA has a packet in the queue to send before timeout. If there is a packet, the STA sends 908 the packet from the queue; otherwise the station generates 906 a probe packet. In either case block 910 is reached where the STA records the MCS, channel access delay, packet error, and the transmission time of the packet. A check 912 determines if the measurement duration has not expired. If we are still in the measurement duration, then execution returns to block 904 and the STA continues to send packets for measurement purposes. Otherwise, the duration has expired and execution reaches block 914.

In block 914 the STA calculates the best throughput MCS, the second best throughput, and the best probability MCS according to the record during measurement. The best throughput MCS is the MCS having a maximum value of $MCS*(1-PER_{MCS})$ where $PER_{MCS}$ is denoted as the packet error rate at MCS. The second best throughput MCS is the MCS having a second maximum value of $MCS*(1-PER_{MCS})$. The best probability MCS is the MCS that has a lowest value of $PER_{MCS}$. The STA also calculates 916 in FIG. 36B the average and deviation of the channel access delay of the packets during measurement. Lastly the STA calculates 918 the total transmission time of STA during the measurement and generates 920 a channel bandwidth measurement report using the format shown in FIG. 35, before the process ends 922.

4.5.4.2.2. Packet Transmission Latency

This section shows an example of measuring packet transmission latency using the RTA KPI measurement procedure.

Figure 39A:
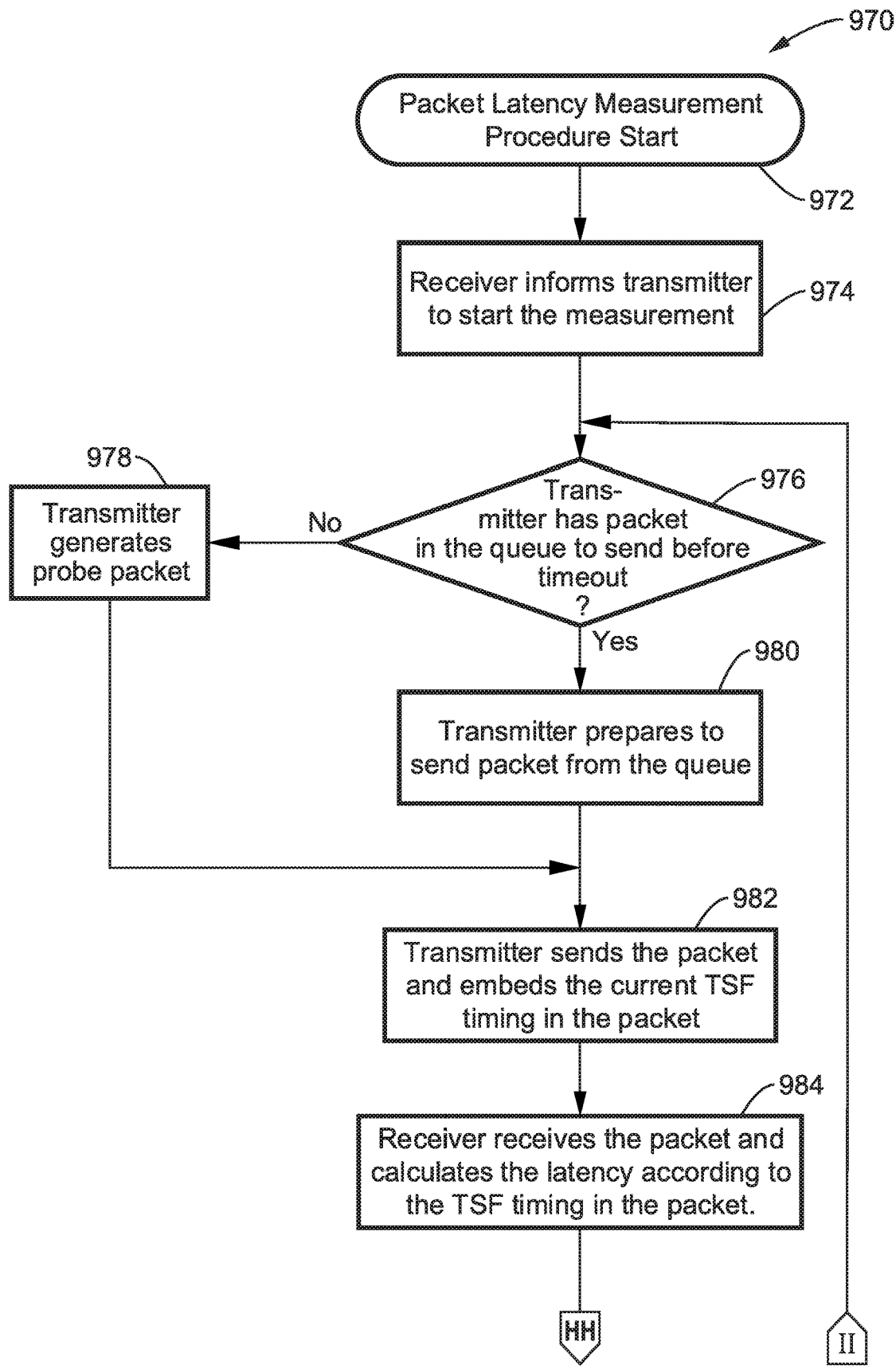
FIG. 39A and FIG. 39B is a flow diagram of a packet latency measurement procedure according to at least one embodiment of the present disclosure.

FIG. 37 illustrates an example embodiment 930 of an RTA KPIs Measure Method field format for packet latency measurement. In the figure is seen the content of RTA KPIs Measure Method field shown in FIG. 32 when the STA requests to measure the packet transmission latency during the RTA KPI measurement procedure. A Measure Code field indicates the type of RTA KPI measurement; which in this instance indicates that the RTA KPI measurement is a packet latency measurement. A Start Time field indicates the start time of the measurement. An End Time field indicates the end time of the measurement. A Timeout field indicates the longest interval that the STA needs to transmit a packet to measure the channel condition. If the STA does not have a packet to transmit before Timeout, it generates and transmits a probe packet for the purpose of latency measurement as shown in 976 of FIG. 39A, FIG. 38 illustrates an example embodiment 950 of an RTA KPI Measurement Report field format for packet latency measurement. In the figure is seen the content of RTA KPIs Measure Report field shown in FIG. 33 when the STA reports the packet transmission latency measurement result during the RTA KPI measurement procedure. A Measure Code field indicates the type of RTA KPI measurement; which in this case is a packet transmission latency measurement. An Avg transmission latency field indicates the average packet transmission latency during the measurement. A Jitter field indicates the standard deviation of the packet transmission latency during the measurement. A Max transmission latency field indicates the maximum packet transmission latency during the measurement.

Figures 39B, 40:
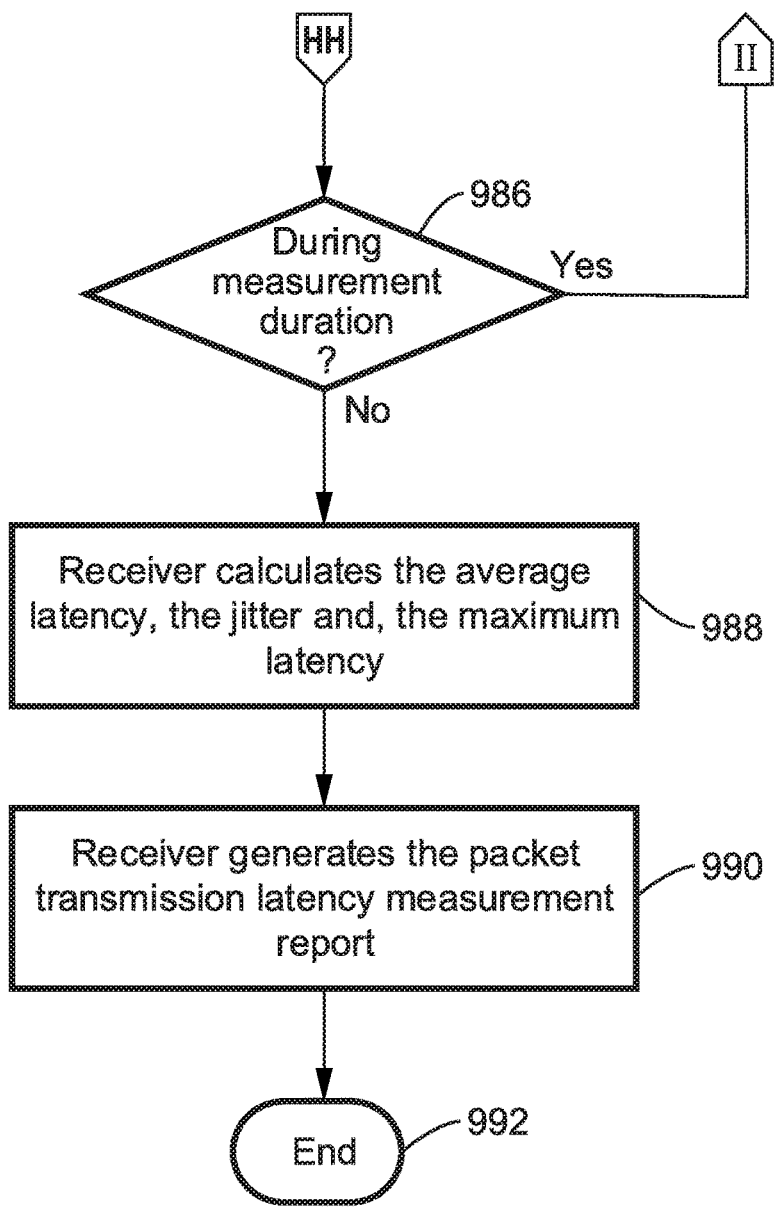
FIG. 40 is a data field diagram of RTA KPI measurement method field format for channel usage according to at least one embodiment of the present disclosure.

FIG. 39A and FIG. 39B illustrates an example embodiment 970 of a Packet latency measurement procedure. For the sake of simplicity of illustration, it is assumed in this example that the timing of the transmitter STA and the receiver STA are sufficiently well synchronized, such as can be achieved under IEEE 802.1AS, although the system can be configured to synchronize and/or overcome synchronization issues without departing from the teachings of the present disclosure.

The receiver STA starts 972 with the channel bandwidth measurement at the start time and informs 974 the transmitter STA to start the measurement by sending a frame similar to FIG. 32 with the RTA KPIs Measure Method field as shown in FIG. 37. A check 976 is made to determine if the transmitter STA has a packet in the queue to send before timeout. If there is a packet in the queue, then the transmitter STA prepares 980 to send the packet from the queue. Otherwise, if at block 976 it is determined that there are no packets in the queue, then the STA generates 978 a probe packet to send. Then in either case execution reaches block 980 with the transmitter STA sending 982 the packet with the current TSF timing stamp embedded in the packet. When the receiver STA receives the packet, it can determine packet transmission latency 984 by calculating the difference (delta) between the TSF timing in the packet and the current TSF timing.

A check 986 in FIG. 39B then determines if the measurement is still in progress. If the measurement hasn't yet ended, then execution returns to block 976 with the transmitter STA continuing to send packets for measurement purposes. Otherwise, if at block 986 it is determined that the measurement duration has expired, then the receiver STA calculates 988 the average latency, the jitter and, the maximum latency, after which the STA generates a packet transmission latency measurement report 990 using the format as shown in FIG. 38 before the process ends 992.

4.5.4.2.3. Channel Usage

This section depicts an example of measuring channel usage in response to performing an RTA KPI measurement procedure.

FIG. 40 illustrates an example embodiment 1010 of an RTA KPIs Measure Method field format, shown in FIG. 32, for making a channel usage measurement when the STA requests to measure the channel usage during the RTA KPI measurement procedure. A Measure Code field indicates the type of RTA KPI measurement. In this example instance the RTA KPI measurement is a channel usage measurement. A Start Time field indicates the start time of the measurement. An End Time field indicates the end time of the measurement.

Figure 41:
FIG. 41 is a data field diagram of an RTA KPI measurement report field format for channel usage measurement according to at least one embodiment of the present disclosure.

FIG. 41 illustrates an example embodiment 1030 of the content of RTA KPIs Measure Report field shown in FIG. 33 when the STA reports the packet transmission latency measurement result during the RTA KPI measurement procedure. A Measure Code field indicates the type of RTA KPI measurement; which here indicates that the RTA KPI measurement is a channel usage measurement. A Channel bandwidth measure time field indicates measurement duration. An Avg NAV time field indicates the average time of the NAV periods during the measurement. A Deviation of NAV time field indicates the deviation of the time of the NAV periods during the measurement. An Avg Clear Channel Assessment (CCA) busy time due to 802.11 packet field indicates the average time of CCA busy periods due to 802.11 packet transmission during the measurement. A Deviation of CCA busy time due to 802.11 packet field indicates the deviation of the time of CCA busy periods due to 802.11 packet transmission during the measurement. An Avg CCA busy time due to non 802.11 packet field indicates the average time of CCA busy periods due to non-802.11 packet transmission during the measurement. A Deviation of CCA busy time due to non 802.11 packet field indicates the deviation of the time of CCA busy periods due to non-802.11 packet transmission during the measurement. An Avg channel idle time field indicates the average time of channel idle period during the measurement. A Deviation of channel idle time field indicates the deviation of the time of channel idle period during the measurement.

Figure 42:
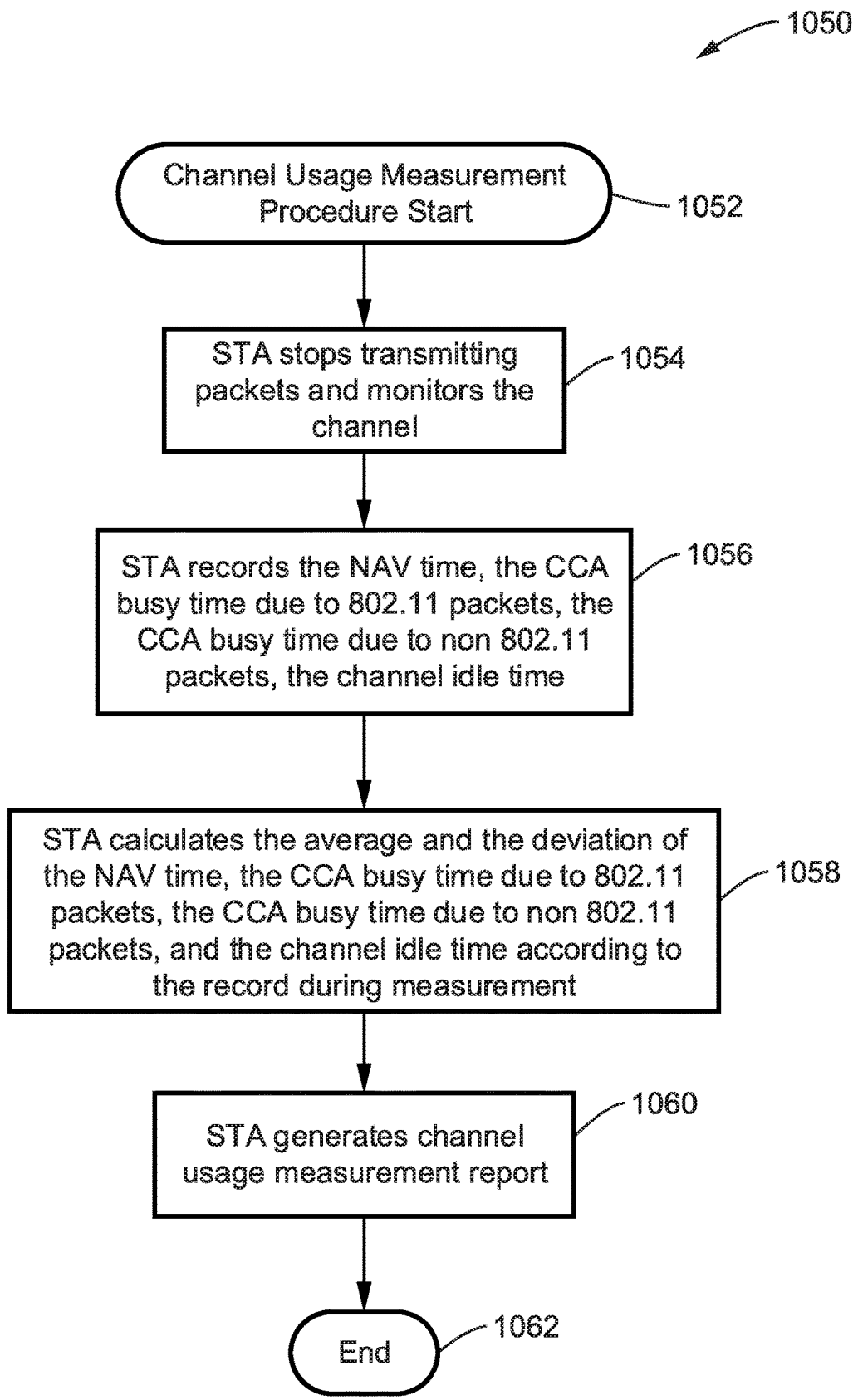
FIG. 42 is a flow diagram of a channel usage measurement procedure according to at least one embodiment of the present disclosure.

FIG. 42 illustrates an example embodiment 1050 of a Channel usage measurement procedure. The transmitter STA starts 1052 the channel usage measurement at the start time. The STA stops transmitting packets and monitors 1054 the channel. The STA records 1056 the NAV time, the CCA busy time due to 802.11 packets, the CCA busy time due to non 802.11 packets, and channel idle time. At the end time of the measurement, STA calculates 1058 the average and the deviation of the NAV time, the CCA busy time due to 802.11 packets, the CCA busy time due to non 802.11 packets, and the channel idle time according to the record during measurement. The STA then generates 1060 a channel usage measurement report using the format as shown in FIG. 41 and the process ends 1062.

4.5.4.2.4. Queue Status

This section shows an example of measuring queue status using the RTA KPI measurement procedure.

Figure 43:
FIG. 43 is a data field diagram of an RTA KPI measurement method field format for queue status measurement according to at least one embodiment of the present disclosure.

FIG. 43 illustrates an example embodiment 1070 of an RTA KPIs Measure Method field format for queue status measurement. The content of RTA KPIs Measure Method field is shown in FIG. 32 when the STA requests to measure the queue status during the RTA KPI measurement procedure. A Measure Code field indicates the type of RTA KPI measurement; which in this case indicates that the RTA KPI measurement is a queue status measurement. A Start Time field indicates the start time of the measurement, and an End Time field indicates the end time of the measurement.

Figure 44:
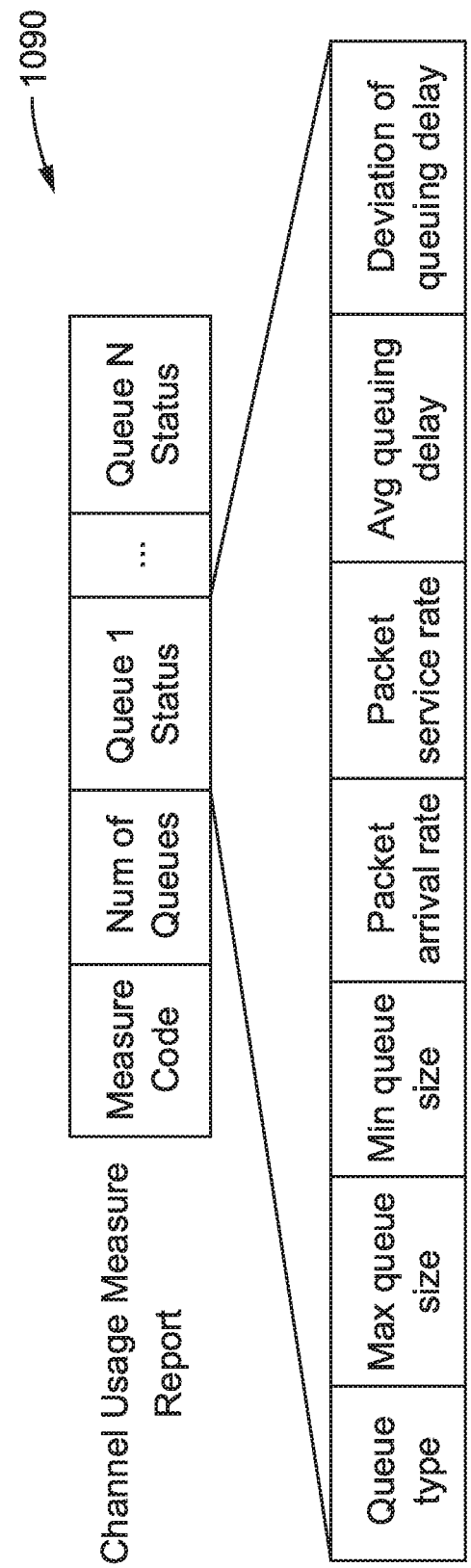
FIG. 44 is a data field diagram of a RTA KPI measurement report field format for queue status measurement according to at least one embodiment of the present disclosure.

FIG. 44 illustrates an example embodiment 1090 of an RTA KPI Measurement Report field format for queue status measurement. The content of the RTA KPIs Measure Report field is shown in FIG. 33 when the STA reports the queue status measurement result during the RTA KPI measurement procedure. A Measure Code field indicates the type of RTA KPI measurement; which in this case indicates that the RTA KPI measurement is a queue status measurement. A Num of Queues field indicates the number of queues whose status is included in this report. Queue status fields 1 through N indicate measurement results on queue status for queues 1 through N. The status field comprises the following subfields. A Queue type subfield indicates the identification of the queue. A Max queue size subfield indicates the maximum queue size during the measurement. A Min queue size subfield indicates the minimum queue size during the measurement. A Packet arrival rate subfield indicates the rate of the packets enqueued during the measurement. A Packet service rate subfield indicates the rate of the packets dequeued during the measurement. An Avg. queuing delay subfield indicates the average waiting time of the packets in the queue during the measurement. A Deviation of queuing delay subfield indicates the deviation of the waiting time of the packet in the queue during the measurement.

Figure 45:
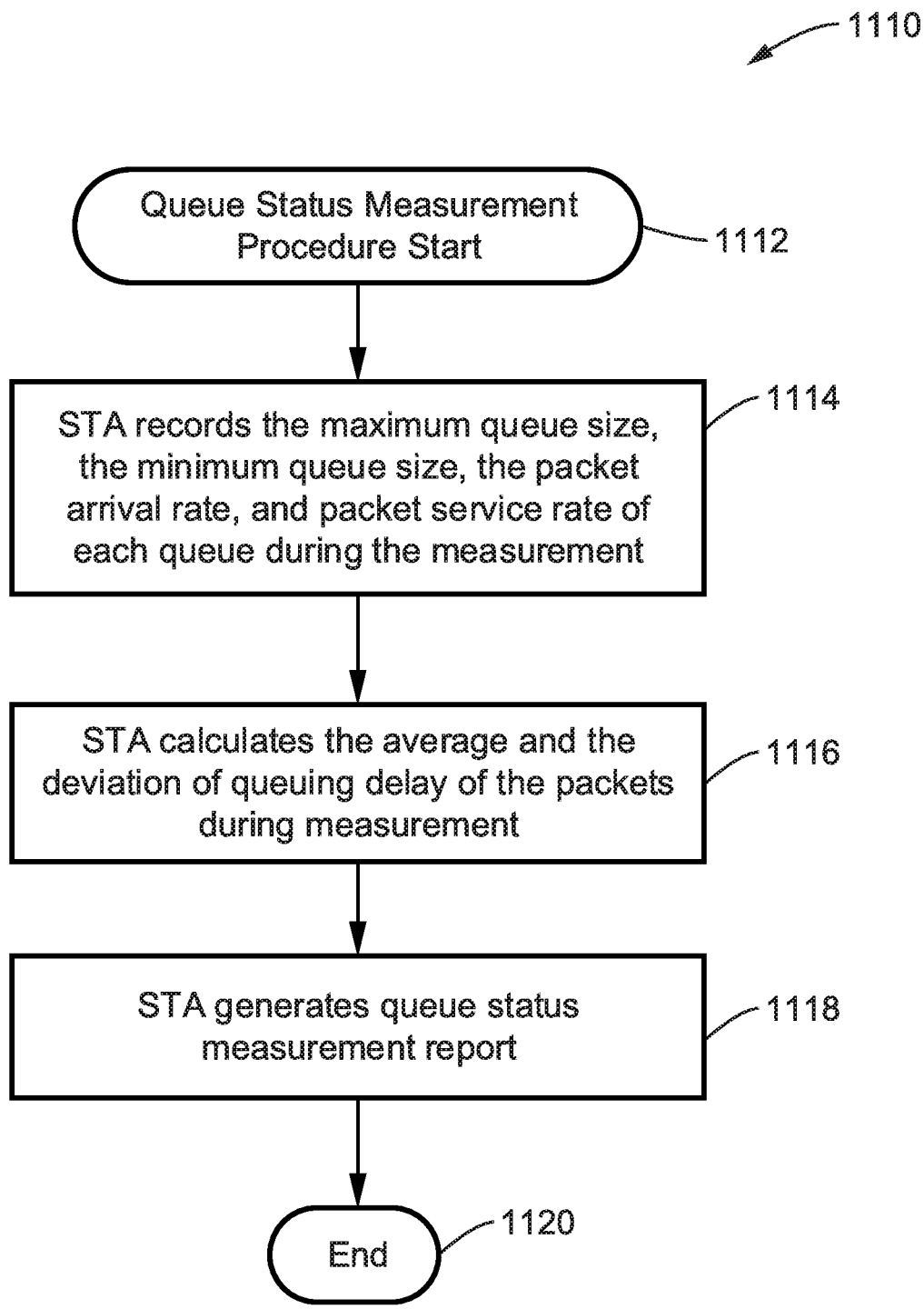
FIG. 45 is a flow diagram of a queue status measurement procedure according to at least one embodiment of the present disclosure.

FIG. 45 illustrates an example embodiment 1110 of a Queue status measurement procedure. The STA starts 1112 the queue status measurement at the start time. The STA records 1114 maximum queue size, minimum queue size, packet arrival rate, and packet service rate of each queue during the measurement. At the end time of the measurement the STA calculates 1116 the average and the deviation of queuing delay of the packets during measurement. The STA generates 1118 a queue status measurement report using the format as shown in FIG. 44 and the process ends 1120.

4.5.4.2.5. Traffic Analysis

This section describes an example of traffic analysis using the RTA KPI measurement procedure.

FIG. 46 illustrates an example embodiment 1130 of a RTA KPIs Measure Method field format for traffic analysis. The content of RTA KPIs Measure Method field is shown in FIG. 32 when the STA requests to measure the queue status during the RTA KPI measurement procedure. A Measure Code field indicates the type of RTA KPI measurement; which for instance in this case indicates that the RTA KPI measurement is a queue status measurement. A Start Time field indicates the start time of the measurement. An End Time field indicates the end time of the measurement. A Timeout field indicates the longest interval that the STA needs to transmit a packet to measure channel conditions.

FIG. 47 illustrates an example embodiment 1150 of a RTA KPI Measurement Report field format for traffic analysis. Content of the RTA KPIs Measure Report field is shown in FIG. 33 when the STA reports the traffic analysis result during the RTA KPI measurement procedure. A Measure Code field indicates the type of RTA KPI measurement; which in this example indicates that the RTA KPI measurement is a traffic analysis measurement. A Num of traffic types field indicates the number of traffic types that are analyzed in this report.

A Traffic Type Status field 1 through N indicates the analysis result of each traffic type, and has the following subfields. A Traffic type subfield indicates the access category of non-RTA traffic or RTA priority of RTA traffic. An Avg. retry count subfield indicates the average retry count of the packet during the measurement. A Deviation of retry count subfield indicates the deviation of retry counts of packets during the measurement. An Avg. contention time subfield indicates the average contention time of the packets during the measurement. A Deviation of contention time subfield indicates the deviation of the contention time of the packets during the measurement. An Avg. retransmission time subfield indicates the average time between the start of a first retransmission and the end of the last retransmission. A Deviation of retransmission time subfield indicates the deviation of the time between the start of the first retransmission and the end of the last retransmission. A Packet error rate (PER) subfield indicates the probability of packet transmission fails. A Total amount of traffic subfield indicates the total amount of traffic (bytes) during the measurement.

Figure 48:
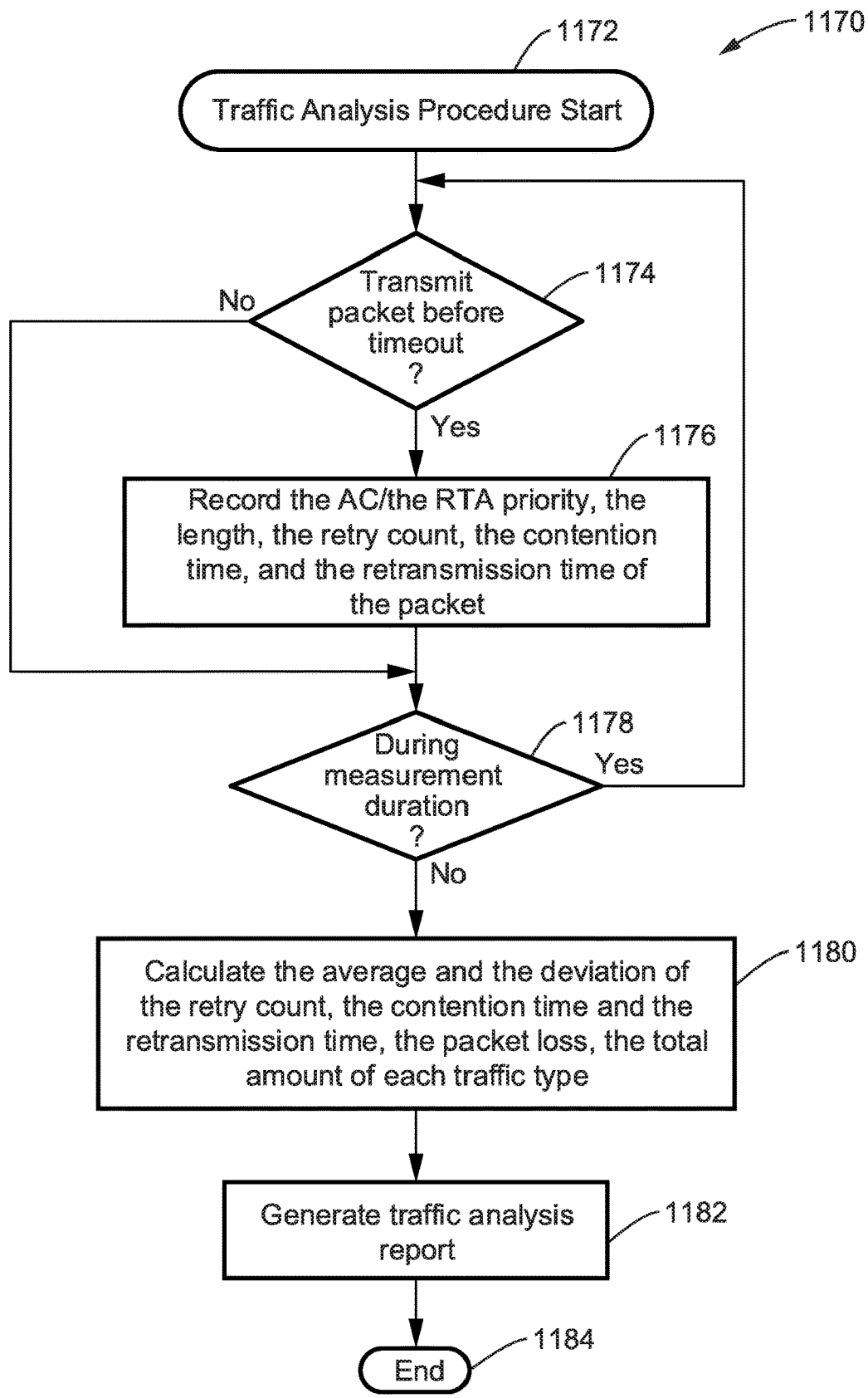
FIG. 48 is a flow diagram of a traffic analysis procedure according to at least one embodiment of the present disclosure.

FIG. 48 illustrates an example embodiment 1170 of a Traffic analysis procedure. The STA starts 1172 the traffic analysis at the start time. A check is made 1174 to determine if the STA has a packet to transmit before timeout. If there is a packet to transmit, then at block 1176 it transmits the packet and records the AC/the RTA priority, the length, the retry count, the contention time, and the retransmission time of the packet before reaching block 1178. If at block 1174 the STA does not have a packet to transmit before timeout or the STA finishes transmitting one packet, then execution moves from check 1174 to block 1178.

At block 1178 a check is made whether the measurement duration is still ongoing. If the measurement has not ended, then execution returns to block 1174 and the STA tries to transmit another packet for measurement purposes. Otherwise, if at block 1178 it is determined that the measurement period has ended, then at block 1180 the STA calculates the average and the deviation of the retry count, the contention time and the retransmission time, the packet loss and the total amount of each traffic type. The STA generates 1182 a traffic analysis report using the format as shown in FIG. 47, with the process ending 1184.

4.5.4.3. Applications of RTA KPI Measurements

Figure 49:
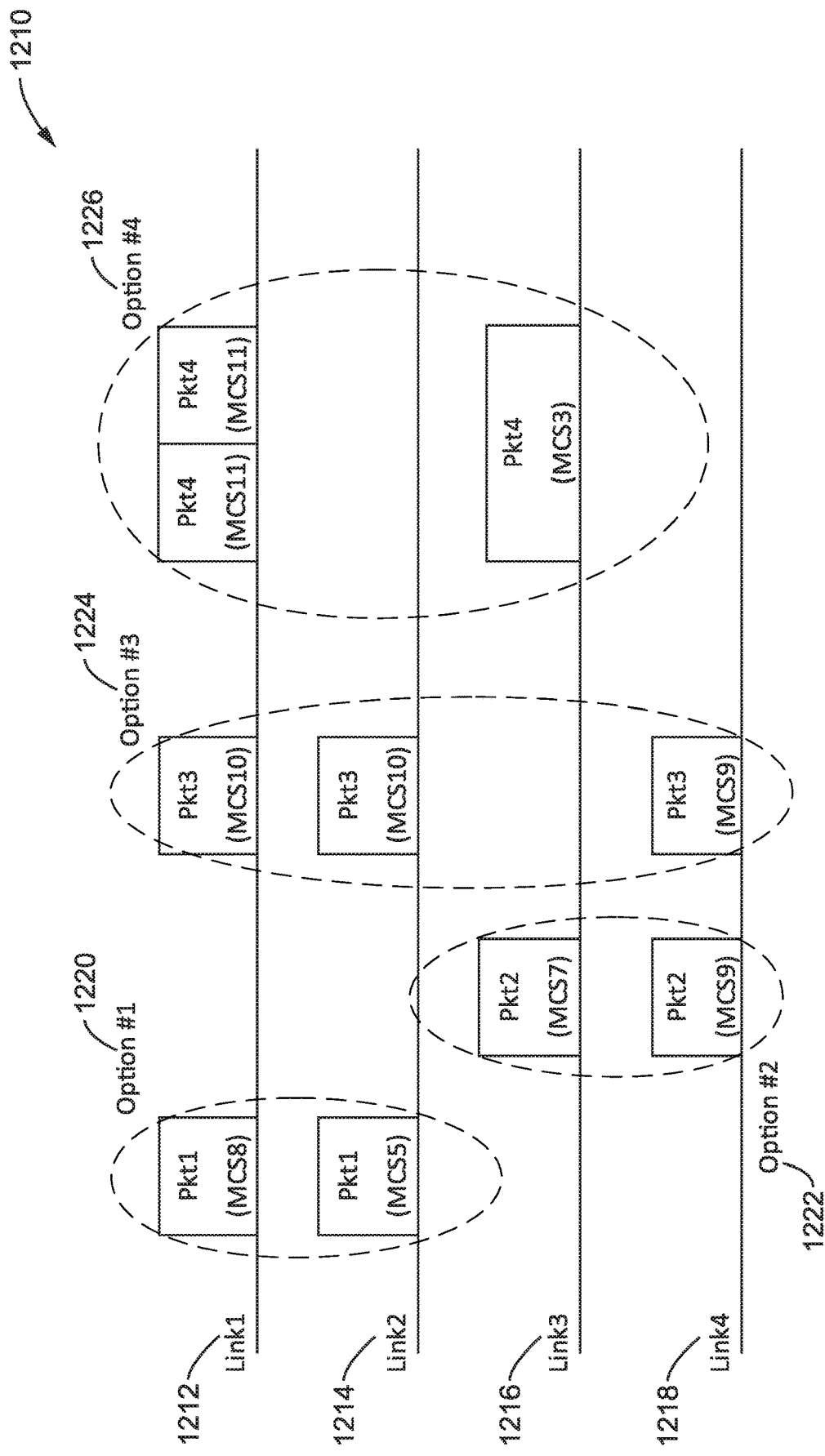
FIG. 49 is a communication link diagram showing an example of using measurement results for multi-link transmission according to at least one embodiment of the present disclosure.

FIG. 49 illustrates an example embodiment 1210 of using measurement results for multi-link transmission, in this case of using the RTA KPI measurement for RTA packet transmission. The figure shows how to use the RTA KPI measurement results to schedule RTA packet transmissions over multiple links (multi-links). In the figure multiple links are shown, here by way of example and not limitation are seen four links, Link1 1212, Link2 1214, Link3 1216 and Link4 1218. The figure depicts multiple options, here by way of example and not limitation are seen four options, Option #1 1220, Option #2 1222, Option #3 1224, and Option #4 1226. The purpose of this application is to find some multi-link transmission options as shown in the figure. When a STA uses one option to transmit RTA packets generated by an RTA session and the transmission failure rate is lower than the packet loss requirement of the RTA session, then the packet loss of the RTA packets satisfies the requirement and no retransmission is needed.

Each option represents a simultaneous transmission of a duplicated packet over a multi-link. The MCS of the packet transmission on each link is fixed. For example, Option #1 1220 in the figure represents a simultaneous multi-link transmission of packet 1 over Link1 1212 using MCS 8 and link2 1214 using MCS 5. Option #2 1222 depicts a simultaneous multi-link transmission of packet 2 over Link3 1216 using MCS7 and over Link4 1218 using MCS9. It is possible that the multi-link transmission in an option picks more than two links for transmission as shown in Option #3 1224 which depicts packet 3 in a simultaneous multi-link transmission over Link1 1212 using MCS10, over Link 2 1214 using MCS10 and over Link4 1218 using MCS9.

It is also possible that duplicated transmission occurs over the same link in an option. For example, Option #4 1226 in the figure represents a simultaneous multi-link transmission of packet 4 over Link1 1212 using MCS11, and over Link3 1216 using MCS3. It will be seen in the figure that the packet is transmitted multiple times over Link1.

STA is able to estimate the transmission failure rate of using one option by using RTA KPI measurement. The multi-link transmission failure rate of option i, denoted by $p_{fail}(Option_i)$ is:

$$p_{fail}(Option_i) = \prod_{link_j \in Option_i} p_{fail}(link_j).$$

where $Option_i$ represents the set of links that are used for transmission in Option i (i=1, 2, . . . ), $p_{fail}(link_j)$ represents the transmission failure rate at link j (j=1, 2, 3, . . . ). The transmission failure rate at link j can be calculated by:

$$p_{fail}(link_j) = (p_{fail}(MCS_k, link_j))^n$$

where $p_{fail}(MCS_k, link_j)$ represents the packet error rate when transmitting a packet using MCS k (k=0, 1, 2, . . . ) on link j, and n represents the number of duplicated packet transmissions. The packet error rate can be measured by channel bandwidth measurement as explained in Section 4.5.4.2.1.

When the packet arrival rate of RTA session, STA is able to schedule packet transmission or polling using the options. Also, the retry limit can be 0 since no retransmission is needed.

5. General Scope of Embodiments

The enhancements described in the presented technology can be readily implemented within various wireless communication stations and their associated protocols. It should also be appreciated that communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with wireless data communication. The presented technology is non-limiting with regard to memory and computer-readable media, insofar as these are non-transitory, and thus not constituting a transitory electronic signal.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in a computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit for wirelessly communicating over a channel with at least one other wireless local area network (WLAN) station in its reception area; (b) a processor coupled to said wireless communication circuit within a station (STA) configured for operating on the WLAN; and (c) a non-transitory memory storing instructions executable by the processor; (d) wherein said instructions, when executed by the processor, perform one or more steps comprising: (d)(i) operating said wireless communication circuit as a WLAN station configured to support communicating real-time application (RTA) packets that are sensitive to communication delays as well as non-real time packets and distinguishing real-time application (RTA) packets from non-real-time application (non-RTA) packets; (d)(ii) wherein said instructions are configured with an application (APP) layer that generates and receives application data, a network layer that determines a route to an end-to-end peer wireless communication circuit and a next hop peer wireless communication circuit device, a medium access control (MAC) layer for controlling wireless media access protocols, a physical (PHY) layer for transmitting and receiving physical signals to the next hop peer wireless communication circuit, and an application layer for generating a new real time application (RTA) session and having an interface to communicate with a MAC layer management entity (MLME), the application layer; (d)(iii) generating a request by the application (APP) layer of the STA requesting the MAC layer to start a new session with a given set of requirements; (iv) monitoring the channel by the MAC layer and obtaining key performance indicators (KPIs) to derive a response to the APP layer; (d)(v) either accepting or rejecting the request to start a new session by the APP layer by the MAC layer according to the RTA session requirements and measured KPIs; and (d)(vi) reissuing the new session accommodation request by the APP layer with adjusted parameters if the new session initiation gets rejected.

2. An apparatus for wireless communication in a network, the apparatus comprising: (a) a wireless communication circuit for wirelessly communicating over a channel with at least one other wireless local area network (WLAN) station in its reception area; (b) a processor coupled to said wireless communication circuit within a station (STA) configured for operating on the WLAN; and (c) a non-transitory memory storing instructions executable by the processor; (d) wherein said instructions, when executed by the processor, perform one or more steps comprising: (d)(i) operating said wireless communication circuit as a WLAN station configured to support communicating real-time application (RTA) packets that are sensitive to communication delays as well as non-real time packets and distinguishing real-time application (RTA) packets from non-real-time application (non-RTA) packets; (d)(ii) wherein said instructions are configured with an application (APP) layer that generates and receives application data, a network layer that determines a route to an end-to-end peer wireless communication circuit and a next hop peer wireless communication circuit device, a medium access control (MAC) layer for controlling wireless media access protocols, a physical (PHY) layer for transmitting and receiving physical signals to the next hop peer wireless communication circuit, and an application layer for generating a new real time application (RTA) session and having an interface to communicate with a MAC layer management entity (MLME), the application layer; (d)(iii) generating a request by the application (APP) layer of the STA requesting the MAC layer to start a new session with a given set of requirements; (d)(iv) monitoring the channel by the MAC layer and obtaining key performance indicators (KPIs) to derive a response to the APP layer; (d)(v) either accepting or rejecting the request to start a new session by the APP layer at the MAC layer according to the RTA session requirements and measured KPIs; (d)(vi) wherein if the request to start a new session by the APP layer at the MAC layer is accepted, then the APP layer starts a new RTA session at the MAC layer and either: (A) sets a lifetime value for RTA packets to provide queue management, or (B) sets a priority value for RTA packets to provide queue management, or (C) sets a requested latency for RTA packets, or (D) sets a target packet loss rate for RTA packets as either a target packet loss rate to adjust Modulation and Coding Scheme (MCS) and a retry limit for RTA packets, or as a target packet loss rate for duplicating packet transmissions or multi-link transmissions; (d)(vii) reissuing the request to start a new session by the APP layer with adjusted parameters if the new session initiation gets rejected.

3. A method for wireless communication in a network, the method comprising: (a) operating a wireless communication circuit as a WLAN station for wirelessly communicating over a channel with at least one other wireless local area network (WLAN) station in its reception area, said station being configured to support communicating real-time application (RTA) packets that are sensitive to communication delays as well as non-real time packets and distinguishing real-time application (RTA) packets from non-real-time application (non-RTA) packets; (b) wherein said instructions are configured with an application (APP) layer that generates and receives application data, a network layer that determines a route to an end-to-end peer wireless communication circuit and a next hop peer wireless communication circuit device, a medium access control (MAC) layer for controlling wireless media access protocols, a physical (PHY) layer for transmitting and receiving physical signals to the next hop peer wireless communication circuit, and an application layer for generating a new real time application (RTA) session and having an interface to communicate with a MAC layer management entity (MLME), the application layer; (c) generating a request by the application (APP) layer of the STA requesting the MAC layer to start a new session with a given set of requirements; (d) monitoring the channel by the MAC layer and obtaining key performance indicators (KPIs) to derive a response to the APP layer; (e) either accepting or rejecting the request to start a new session by the APP layer by the MAC layer according to the RTA session requirements and measured KPIs; (f) reissuing the request to start a new session by the APP layer with adjusted parameters if the new session initiation gets rejected; and (g) wherein said method is performed by a processor executing instructions stored on a non-transitory medium.

4. A wireless communication system/apparatus performing transmission of packets, wherein an application layer generates and receives application data, a network layer determines a route to the end-to-end peer communication apparatus and next hop wireless communication peer device, a MAC layer controls wireless media access protocols, a PHY layer transmits and receives physical signal to the next hop wireless communication peer device, the application layer has an interface to communicate with MAC layer management entity, the application layer generates a new real time application (RTA) session in the system/apparatus, comprising: (a) the application layer (APP layer) of STA requests MAC layer to start a new session with requirements; (b) the MAC layer monitors the channel and obtains key performance indicators (KPIs) to derive the response to the APP layer; (c) the MAC layer either accepts or rejects to APP layer's new session accommodation according to the RTA session requirements and measured KPIs; and (d) the APP layer reissues the request with the adjusted parameters if the new session initiation gets rejected.

5. The apparatus, system or method of any preceding embodiment, wherein said instructions when executed by the processor further perform one or more steps comprising the APP layer starting a new RTA session at the MAC layer and setting a lifetime value for RTA packets to provide queue management.

6. The apparatus, system or method of any preceding embodiment, wherein said instructions when executed by the processor further perform one or more steps comprising the APP layer starting a new RTA session at the MAC layer and setting a priority value for RTA packets to provide queue management.

7. The apparatus, system or method of any preceding embodiment, wherein said instructions when executed by the processor further perform one or more steps comprising the APP layer starting a new RTA session at the MAC layer and setting a target packet loss rate for RTA packets.

8. The apparatus, system or method of any preceding embodiment, wherein said instructions when executed by the processor further perform one or more steps comprising the MAC layer of the station setting the target packet loss rate as a target packet loss rate to adjust Modulation and Coding Scheme (MCS) and a retry limit for RTA packets.

9. The apparatus, system or method of any preceding embodiment, wherein said instructions when executed by the processor further perform one or more steps comprising the MAC layer of the station setting the target packet loss rate as the target packet loss rate for duplicating packet transmissions or multi-link transmissions.

10. The apparatus, system or method of any preceding embodiment, wherein said instructions when executed by the processor further perform one or more steps comprising the APP layer starting a new RTA session at the MAC layer and setting a requested latency for RTA packets.

11. The apparatus, system or method of any preceding embodiment, wherein said instructions when executed by the processor further perform one or more steps comprising the MAC layer monitoring the channel and measuring key performance indicators (KPIs) of the channel.

12. The apparatus, system or method of any preceding embodiment, wherein said key performance indicators (KPIs) of the channel are selected from the group of performance indicators consisting of bandwidth, Modulation and Coding Scheme (MCS), channel access rate, packet error rate (PER), and the time ratio that channel is used for transmitting packets.

13. The apparatus, system or method of any preceding embodiment, wherein said instructions when executed by the processor further perform one or more steps comprising the MAC layer measuring said key performance indicators (KPIs) of the channel utilizing measurement results for duplicating packet transmissions or multi-link transmissions.

14. The apparatus, system or method of any preceding embodiment, wherein said instructions when executed by the processor further perform one or more steps comprising the MAC layer monitoring the channel obtaining statistics on said key performance indicators (KPIs) of packet latency and comparing them with RTA requested latency.

15. The apparatus, system or method of any preceding embodiment, wherein said instructions when executed by the processor further perform one or more steps comprising the MAC layer in obtaining the statistics on said key performance indicators (KPIs) of packet latency and comparing them with RTA requested latency, utilizes the time-stamp at the MAC layer.

16. The apparatus, system or method of any preceding embodiment, wherein said instructions when executed by the processor further perform one or more steps comprising the MAC layer obtaining the statistics of packet latency performing measurements of latency at both transmitter and the receiver.

17. The apparatus, system or method of any preceding embodiment, wherein said instructions when executed by the processor further perform one or more steps comprising the MAC layer obtaining the statistics of packet latency performing a measurement of average retransmission rate.

18. The apparatus, system or method of any preceding embodiment, wherein said instructions when executed by the processor further perform one or more steps comprising the MAC layer monitoring the channel and measuring a key performance indicator (KPI) of packet arrival rate in determining an average time and standard deviations between channel vacancy and average time between channel occupancy.

19. The apparatus, system or method of any preceding embodiment, wherein said instructions when executed by the processor further perform one or more steps comprising the MAC layer utilizing the measuring of the packet arrival rate for scheduling packet transmissions or to performing polling based on the requested packet arrival rate during an RTA session.

20. The apparatus, system or method of any preceding embodiment, wherein said instructions when executed by the processor further perform one or more steps comprising the MAC layer performs monitoring of the channel and measuring key performance indicators (KPIs) of queue status.

21. The apparatus, system or method of any preceding embodiment, wherein said instructions when executed by the processor further perform one or more steps comprising the MAC layer performing monitoring of the channel and measuring the key performance indicators (KPIs), including current queue size.

22. The apparatus, system or method of any preceding embodiment, wherein said instructions when executed by the processor further perform one or more steps comprising the MAC layer monitoring the channel and measuring key performance indicators (KPIs) as well as recording history information on changes in packet traffic.

23. The apparatus, system or method of any preceding embodiment, wherein said instructions when executed by the processor further perform one or more steps comprising the MAC layer monitoring the channel and measuring key performance indicators (KPIs) and comparing measured KPIs with RTA session requirements and rejecting an RTA session initiation if measured KPIs do not satisfy the RTA session requirements.

24. The apparatus, system or method of any preceding embodiment, wherein said instructions when executed by the processor further perform one or more steps comprising the MAC layer rejecting a new RTA session performs reporting of key performance indicators (KPIs) obtained at the MAC layer to the APP layer.

25. The apparatus, system or method of any preceding embodiment, wherein said instructions when executed by the processor further perform one or more steps comprising the MAC layer rejecting a new RTA session and suggesting to the APP layer operating parameters for creating a new RTA session.

26. The apparatus, system or method of any preceding embodiment, where the APP layer starting a new RTA session at MAC layer could set the lifetime of the RTA packets which can be used for queue management.

27. The apparatus, system or method of any preceding embodiment, where the APP layer starting a new RTA session at MAC layer could set the priority of the RTA packets which can be used for queue management.

28. The apparatus, system or method of any preceding embodiment, where the APP layer starting a new RTA session at MAC layer could set the target packet loss rate of the RTA packets.

29. The apparatus, system or method of any preceding embodiment, where the APP layer starting a new RTA session at MAC layer could set the requested latency of the RTA packets.

30. The apparatus, system or method of any preceding embodiment, where the MAC layer of STA monitoring the channel could measure the KPIs of the channel, such as bandwidth, MCS, channel access rate, packet error rate, and the time ratio that channel is used to transmit packets.

31. The apparatus, system or method of any preceding embodiment, where the MAC layer of STA monitoring the channel could measure the KPI such as the statistics of the packet latency and compare it with RTA requested latency.

32. The apparatus, system or method of any preceding embodiment, where the MAC layer of STA monitoring the channel could measure the KPIs, such as the packet arrival rate to obtain the average time between channel vacancy, the average time between channel occupancy and their standard deviations.

33. The apparatus, system or method of any preceding embodiment, where the MAC layer of STA monitoring the channel could measure the KPI of the queue status, such as the current queue size.

34. The apparatus, system or method of any preceding embodiment, where the MAC layer of STA monitoring the channel and obtaining the KPIs could record the history of the change of the traffic.

35. The apparatus, system or method of any preceding embodiment, where the MAC layer of STA monitoring the channel and obtaining the KPIs could compare the measured KPIs with RTA session requirement and rejects the RTA session initiation if the measured KPIs do not satisfy the requirement.

36. The apparatus, system or method of any preceding embodiment, where the MAC layer rejects a new RTA session could report the KPIs obtained at the MAC layer to the APP layer.

37. The apparatus, system or method of any preceding embodiment, where the MAC layer rejects a new RTA session could suggest operating parameters of creating a new RTA session to the APP layer.

38. The apparatus, system or method of any preceding embodiment, where the MAC layer of STA setting the target packet loss rate of the RTA packets could use the target packet loss rate to adjust MCS and the retry limit of the RTA packets.

39. The apparatus, system or method of any preceding embodiment, where the MAC layer of STA setting the target packet loss rate of the RTA packets could use the target packet loss rate for duplicated packet transmission or multi-link transmissions.

40. The apparatus, system or method of any preceding embodiment, where the MAC layer of STA measuring the KPIs of the channel could use the measurement results for duplicated packet transmission or multi-link transmissions.

41. The apparatus, system or method of any preceding embodiment, where the MAC layer of STA obtaining the statistics of the packet latency could use the timestamp at the MAC layer.

42. The apparatus, system or method of any preceding embodiment, where the MAC layer of STA obtaining the statistics of the packet latency could measure the latency at both the transmitter and the receiver.

43. The apparatus, system or method of any preceding embodiment, where the MAC layer of STA obtaining the statistics of the packet latency could measure the average retransmission rate.

44. The apparatus, system or method of any preceding embodiment, where the MAC layer of STA measuring the packet arrival rate could use the measurement to schedule packet transmission or polling based on the requested packet arrival rate of RTA session.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs which indicate "at least one of" followed by a listing elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Header Information for Identifying RTA Traffic at the Transmitter Side

| Layers | Header information |
|---|---|
| APP | RTA session ID, RTA session name, signature |
| Transport | TCP/UDP port numbers |
| Network | IP address of source & destination, type of service |

TABLE 2

Listing of RTA Session Status

| Status | Header information |
|---|---|
| Active | RTA session is active to generate traffic |
| Inactive | RTA session disabled and does not generate traffic |
| Error | Session has errors |

TABLE 3

RTASESSIONINITEVENT.request message format

Function: RTASESSIONINITEVENT.request(STAAddress, RTAId, RequirementInfo, QueueInfo, MeasurementIndication, RTAKpiMeasureMethod)
When Generated: The RTA user at the APP layer of STA generates this message and passes it to its SME when STA decides to launch an RTA session initiation procedure.
Effect of Receipt: Initiation procedure started.
Parameters:

STAAddress—a MAC address then specifies the recipient STA MAC address.
RTAId—defined in FIG. 9, specifies the information to identify the RTA traffic.
RequirementInfo—defined in FIG. 14, specifies the requirement information of the RTA session for initiation. A STA can use this information to decide whether to accept an RTA session initiation or not. For example, a STA compares the measured RTA KPIs and compares them with the parameters in the requirement information. If the measurement KPIs satisfy the requirement, then the STA accepts the RTA session initiation. Otherwise, it rejects the RTA session initiation.
QueueInfo—defined in FIG. 14, specifies the queue information of the RTA session for initiation. The STA can use this information for queue management for the packet generated by the RTA session.
MeasurementIndication—defined in FIG. 14, specifies whether the RTA KPIs measurement is needed.
RTAKpiMeasureMethod—defined in FIG. 14, specifies what types of RTA KPIs measurement to launch for the RTA session initiation at the originator STA and recipient STA. STA uses this information to launch RTA KPI measurements. STA is able to compare the measurement results with the RequirementInfo to decide whether to accept or reject RTA session initiation.

TABLE 4

RTASESSIONINITEVENT.indicate message format

Function: RTASESSIONINITEVENT.indicate (STAAddress, RTAId, RequirementInfo, QueueInfo, MeasurementIndication, RTAKpiMeasureMethod)
When Generated: The SME of STA generates this message and passes it to its RTA user at the APP when the SME receives an RTASESSIONINIT.indicate message.
Effect of Receipt: When the APP of STA receives this message, it needs to decide whether to accept the RTA session initiation event request or reject it.
Parameters:

STAAddress—a MAC address then specifies originator STA MAC address.
RTAId—defined in FIG. 9, specifies the information to identify the RTA traffic.
RequirementInfo—defined in FIG. 14, specifies the requirement information of the RTA session for initiation. A STA can use this information to decide whether to accept an RTA session initiation or not. For example, a STA compares the measured RTA KPIs and compares them with the parameters in the requirement information. If the measurement KPIs satisfy the requirement, then the STA accepts the RTA session initiation. Otherwise, it rejects the RTA session initiation.
QueueInfo—defined in FIG. 14, specifies the queue information of the RTA session for initiation. The STA can use this information for queue management for the packet generated by the RTA session.
MeasurementIndication—defined in FIG. 14, specifies whether the RTA KPIs measurement is needed.
RTAKpiMeasureMethod—defined in FIG. 14, specifies what types of RTA KPIs measurement to launch for the RTA session initiation at the recipient STA. STA uses this information to launch RTA KPI measurements. STA is able to compare the measurement results with the RequirementInfo to decide whether to accept or reject RTA session initiation.

TABLE 5

RTASESSIONINITEVENT.response message format

Function: RTASESSIONINITEVENT.response (STAAddress, RTAId, FollowEvent,
  RequirementInfo, QueueInfo, MeasurementIndication,
  RTAKpiMeasureMethod)
When Generated: APP of STA generates this message and passes it to the SME
  when the APP receives an RTASESSIONINITEVENT.indicate message.
Effect of Receipt: When the SME of STA receives this message, it knows whether to
  continue the RTA session initiation or not.
Parameters:

STAAddress—a MAC address then specifies originator STA MAC address.
  RTAId—defined in FIG. 9, specifies the information to identify the RTA traffic.
  FollowEvent—specifies whether to follow the RTA session initiation event. For
example a one bit indication, when set to "1" = STA follows the event; set to "0" = STA
does not follow the event.
  RequirementInfo—defined in FIG. 14, specifies requirement information of the
RTA session for initiation. A STA can use this information to decide whether to accept
an RTA session initiation or not. For example, a STA compares the measured RTA
KPIs and compares them with the parameters in the requirement information. If the
measurement KPIs satisfy the requirement, then the STA accepts the RTA session
initiation. Otherwise, it rejects the RTA session initiation.
  QueueInfo—defined in FIG. 14, specifies the queue information of the RTA
session for initiation. The STA can use this information for queue management for
the packet generated by the RTA session.
  MeasurementIndication—defined in FIG. 14, specifies whether the RTA KPIs
measurement is needed.
  RTAKpiMeasureMethod—defined in FIG. 14, specifies what types of RTA KPIs
measurement to launch for the RTA session initiation at the recipient STA. STA uses
this information to launch RTA KPI measurements. STA is able to compare the
measurement results with the RequirementInfo to decide whether to accept or reject
RTA session initiation.

TABLE 6

RTASESSIONINITEVENT.confirm message format

Function: RTASESSIONINITEVENT.confirm (STAAddress, RTAId,
  InitiationSuccess, TransmissionInfo, StatusInfo, RTAKpiMReport)
When Generated: The SME of STA is aware of an RTA session initiation results.
Effect of Receipt: When the APP of STA receives this message, it knows the RTA
  session initiation result.
Parameters:

STAAddress—a MAC address specifies recipient STA MAC address.
  RTAId—defined in FIG. 9, specifies the information to identify the RTA traffic.
  InitiationSuccess—(e.g., Boolean) If set to true initiation procedure succeeds,
otherwise if set to false the procedure fails.
  TransmissionInfo—defined in FIG. 14, specifies the transmission information of
the RTA session for initiation. STA is able to use the channel resources allocated in
the transmission information to transmit packets generated by the RTA session.
  RequirementInfo—defined in FIG. 14, specifies the transmission information of
the RTA session for initiation. STA is able to use the channel resources allocated in
the transmission information to transmit packets generated by the RTA session.
  StatusInfo—defined in FIG. 14, specifies the status information of the RTA
session for initiation, making the STA aware of the status of RTA session information.
  RTAKpiMReport—defined in FIG. 14, Specifies the measurement results for
RTA session initiation.

TABLE 7

RTASESSIONINIT.request message format

Function: RTASESSIONINIT.request (STAAddress, RTAId, RequirementInfo,
  QueueInfo, MeasurementIndication, RTAKpiMeasureMethod)
When Generated: The SME of STA generates this message and passes it to its
  MLME when STA decides to launch an RTA session initiation procedure.
Effect of Receipt: When the MLME of STA receives this message, it transmits an
  RTA session initiation request frame to the recipient STA.

TABLE 7-continued

RTASESSIONINIT.request message format

Parameters:

STAAddress—a MAC address then specifies the recipient STA MAC address.
RTAId—defined in FIG. 9, specifies the information to identify the RTA traffic.
RequirementInfo—defined in FIG. 14, specifies the requirement information of the RTA session for initiation. A STA can use this information to decide whether to accept an RTA session initiation or not. For example, a STA compares the measured RTA KPIs and compares them with the parameters in the requirement information. If the measurement KPIs satisfy the requirement, then the STA accepts the RTA session initiation. Otherwise, it rejects the RTA session initiation.
QueueInfo—defined in FIG. 14, specifies the queue information of the RTA session for initiation. The STA can use this information for queue management for the packet generated by the RTA session.
MeasurementIndication—defined in FIG. 14, specifies whether the RTA KPIs measurement is needed.
RTAKpiMeasureMethod—defined in FIG. 14, specifies what types of RTA KPIs measurement to launch for the RTA session initiation at the originator STA and recipient STA. STA uses this information to launch RTA KPI measurements. STA is able to compare the measurement results with the RequirementInfo to decide whether to accept or reject RTA session initiation.

TABLE 8

RTASESSIONINIT.indicate message format

Function: RTASESSIONINIT.indicate (STAAddress, RTAId, RequirementInfo, QueueInfo, RTAKpiMeasureMethod)
When Generated: The MLME of the STA generates this message and passes it to its SME when the MLME of STA receives an RTA session initiation request frame.
Effect of Receipt: When the SME of STA receives this message, it needs to communicate with the RTA user to decide whether to accept the RTA session initiation request or reject it.

Parameters:

STAAddress—a MAC address then specifies originator STA MAC address.
RTAId—defined in FIG. 9, specifies the information to identify the RTA traffic.
RequirementInfo—defined in FIG. 14, specifies the requirement information of the RTA session for initiation. A STA can use this information to decide whether to accept an RTA session initiation or not. For example, a STA compares the measured RTA KPIs and compares them with the parameters in the requirement information. If the measurement KPIs satisfy the requirement, then the STA accepts the RTA session initiation. Otherwise, it rejects the RTA session initiation.
QueueInfo—defined in FIG. 14, specifies the queue information of the RTA session for initiation. The STA can use this information for queue management for the packet generated by the RTA session.
MeasurementIndication—defined in FIG. 14, specifies whether the RTA KPIs measurement is needed.
RTAKpiMeasureMethod—defined in FIG. 14, specifies what types of RTA KPIs measurement to launch for the RTA session initiation at the recipient STA. The STA uses this information to launch RTA KPI measurements. The STA is able to compare the measurement results with the RequirementInfo to decide whether to accept or reject RTA session initiation.

TABLE 9

RTASESSIONINIT.response message format

Function: RTASESSIONINIT.response (STAAddress, RTAId, InitiationSuccess, TransmissionInfo, StatusInfo, RTAKpiMReport)
When Generated: The SME of STA generates this message and transmits it to its MLME when the STA decides to accept an RTA session initiation request.
Effect of Receipt: When the MLME of STA receives this message, it transmits an RTA session initiation response frame to the recipient STA.

Parameters:

STAAddress—a MAC address that specifies originator STA MAC address.
RTAId—defined in FIG. 9, specifies the information to identify the RTA traffic.

TABLE 9-continued

RTASESSIONINIT.response message format

InitiationSuccess—(e.g., Boolean) If set to true initiation procedure succeeds, otherwise if set to false the procedure fails.
TransmissionInfo—defined in FIG. 14, specifies the transmission information of the RTA session for initiation. STA is able to use the channel resources allocated in the transmission information to transmit packets generated by the RTA session.
StatusInfo—defined in FIG. 14, Specifies the status information of the RTA session for initiation, making the STA aware of the status of the RTA session.
RTAKpiMReport—defined in FIG. 14, specifies the measurement results for RTA session initiation.

TABLE 10

RTASESSIONINIT.confirm message format

Function: RTASESSIONINIT.confirm (STAAddress, RTAId, InitiationSuccess, TransmissionInfo, StatusInfo, RTAKpiMReport)
When Generated: The MLME of an STA generates this message and passes it to its SME when the MLME of STA receives an RTA session initiation response frame.
Effect of Receipt: When the SME of STA receives this message, it knows the RTA session initiation is finished and informs the RTA users.
Parameters:

STAAddress—specifies recipient STA MAC address.
RTAId—defined in FIG. 9, specifies the information to identify the RTA traffic.
InitiationSuccess—(e.g., Boolean) If set to true initiation procedure succeeds, otherwise if set to false the procedure fails.
TransmissionInfo—defined in FIG. 14, specifies the transmission information of the RTA session for initiation. The STA is able to use the channel resources allocated in the transmission information to transmit packets generated by the RTA session.
StatusInfo—defined in FIG. 14, specifies the status information of the RTA session for initiation, making the STA aware of the status of RTA session information.
RTAKpiMReport—defined in FIG. 14, Specifies the measurement results for RTA session initiation.

TABLE 11

Example of RTA session initiation at STA 0 (AP)

| Session Information | Session ID 1 | Session ID 2 | Session ID 3 |
|---|---|---|---|
| Tx Node | STA0 | STA3 | STA4 |
| Rx Node | STA2 | STA0 | STA0 |
| Session Start Time | 1 ms | 3 ms | 3 ms |
| Session End Time | 900 ms | 800 ms | 700 ms |
| Time Allocation Options | flexible | flexible | flexible |
| RU Allocation Options | flexible | flexible | flexible |
| SS Allocation Options | flexible | fixed | flexible |
| Periodic Time | 10 ms | 20 ms | 0 ms |
| RTA Priority | 5 | 5 | 6 |
| Queue Type | VI | VI | VO |
| Session Type | active | active | active |

TABLE 12

Example of RTA session initiation rejected

| Session Information | Session ID 1 | Session ID 2 | Session ID 3 | Session ID 4 |
|---|---|---|---|---|
| Tx Node | STA0 | STA3 | STA4 | STA1 |
| Rx Node | STA2 | STA0 | STA0 | STA0 |
| Session Start Time | 1 ms | 3 ms | 3 ms | 1 ms |
| Session End Time | 900 ms | 800 ms | 700 ms | 600 ms |
| Time Allocation Options | flexible | flexible | flexible | flexible |
| RU Allocation Options | flexible | flexible | flexible | flexible |
| SS Allocation Options | flexible | fixed | flexible | flexible |
| Periodic Time | 10 ms | 20 ms | 0 ms | 10 ms |
| RTA Priority | 5 | 5 | 6 | 4 |
| Queue Type | VI | VI | VO | VI |
| Session Type | active | active | active | error |

TABLE 13

Example of RTA session re-initiation

| Session Information | Session ID 1 | Session ID 2 | Session ID 3 | Session ID 4 |
|---|---|---|---|---|
| Tx Node | STA0 | STA3 | STA4 | STA1 |
| Rx Node | STA2 | STA0 | STA0 | STA0 |
| Session Start Time | 1 ms | 3 ms | 3 ms | 8 ms |
| Session End Time | 900 ms | 800 ms | 700 ms | 600 ms |
| Time Allocation Options | flexible | flexible | flexible | flexible |
| RU Allocation Options | flexible | flexible | flexible | flexible |
| SS Allocation Options | flexible | fixed | flexible | flexible |
| Periodic Time | 10 ms | 20 ms | 0 ms | 10 ms |
| RTA Priority | 5 | 5 | 6 | 4 |
| Queue Type | VI | VI | VO | VI |
| Session Type | active | active | active | active |

TABLE 14

RTASESSIONDESTRUCT.request message format

Function: RTASESSIONDESTRUCT.request (STAAddress, RTAId)
When Generated: (1) The APP layer generates this message and passes it to SME when the RTA user decides to destruct an RTA session. (2) The SME of STA generates this message and passes it to its MLME when SME receives this message from the APP layer.
Effect of Receipt: (1) When the SME receives this message from the APP layer, it passes this message to its MLME. (2) When the MLME of STA receives this message, it transmits an RTA session destruction request frame to the recipient STA.
Parameters:

STAAddress—a specifies recipient STA MAC address.
RTAId—defined in FIG. 9, specifies the information to identify the RTA traffic.

TABLE 15

RTASESSIONDESTRUCT.confirm message format

Function: RTASESSIONDESTRUCT.confirm (STAAddress, RTAId)
When Generated: (1) The MLME of STA generates this message and passes it to its SME when the MLME of STA receives an RTA session destruction request frame. (2) The SME passes this message to the APP when it receives it from the MLME.
Effect of Receipt: When the SME of STA receives this message, it needs to destruct the RTA session and report it to the RTA user at APP layer.
Parameters:

STAAddress—specifies originator STA MAC address.
RTAId—defined in FIG. 9, specifies the information to identify the RTA traffic.

TABLE 16

Example of RTA session destruction

| Session Information | Session ID | | |
|---|---|---|---|
| | 1 | 2 | 4 |
| Tx Node | STA0 | STA3 | STA1 |
| Rx Node | STA2 | STA0 | STA0 |
| Session Start Time | 1 ms | 5 ms | 8 ms |
| Session End Time | 900 ms | 800 ms | 600 ms |
| Time Allocation Options | flexible | flexible | flexible |
| RU Allocation Options | flexible | flexible | flexible |
| SS Allocation Options | flexible | fixed | flexible |
| Periodic Time | 0 ms | 20 ms | 10 ms |
| RTA Priority | 5 | 5 | 4 |
| Queue Type | VI | VI | VI |
| Session Type | active | active | active |

TABLE 17

RTASESSIONANNOUNCE.request message format

Function: RTASESSINANNOUNCE.request ( STAAddress, RTAId, RequirementInfo, TransmissionInfo, StatusInfo)
When Generated: (1) The APP layer of STA generates this message and passes it to SME when STA decides to inform it RTA session to other STAs.
(2) The SME of STA forwards this message to its MLME when it receives this message from the APP.
Effect of Receipt: When the APP of STA receives this message, it knows the RTA session initiation result.
Parameters:
    STAAddress - specifies recipient STA MAC address.
    RTAId - defined in FIG. 9, specifies information to identify the RTA traffic.
    RequirementInfo - defined in FIG. 14, specifies the requirement information of the RTA session for initiation.
    TransmissionInfo - defined in FIG. 14, specifies the transmission information of the RTA session for initiation.
    Statusinfo - defined in FIG. 14, specifies the status information of the RTA session for initiation.

TABLE 18

RTASESSIONANNOUNCE.confirm message format

Function: RTASESSIONANNOUNCE.confirm (STAAddress, RTAId,
    RequirementInfo, TransmissionInfo, StatusInfo)
When Generated: (1) The MLME of STA generates this message and passes it to its
    SME when the MLME of STA receives an RTA session announce frame.
    (2) The SME forwards it to the APP when it receives this message from the
    MLME.
Effect of Receipt: When the SME of STA receives this message, it needs to add the
    RTA session into the RTA session table and report to the RTA user of the
    existence of the RTA session from other STAs.
Parameters:
    STAAddress - specifies originator STA MAC address.
    RTAId - defined in FIG. 9, specifies information to identify the RTA traffic.
    RequirementInfo - defined in FIG. 14, specifies the requirement information of
the RTA session for initiation.
    TransmissionInfo - defined in FIG. 14, specifies the transmission information of
the RTA session for initiation.
    StatusInfo - defined in FIG. 14, specifies the status information of the RTA
session for initiation.

TABLE 19

Example of RTA session announcement

| Session Information | Session ID | | | |
|---|---|---|---|---|
| | 1 | 2 | 4 | 5 |
| Tx Node | STA0 | STA3 | STA1 | STA5 |
| Rx Node | STA2 | STA0 | STA0 | STA6 |
| Session Start Time | 1 ms | 5 ms | 8 ms | 1 ms |
| Session End Time | 900 ms | 800 ms | 600 ms | 900 ms |
| Time Allocation Options | flexible | flexible | flexible | flexible |
| RU Allocation Options | flexible | flexible | flexible | flexible |
| SS Allocation Options | flexible | fixed | flexible | flexible |
| Periodic Time | 10 ms | 20 ms | 10 ms | 0 ms |
| RTA Priority | 6 | 5 | 4 | 6 |
| Queue Type | EA | TA/SA | TA/SA | — |
| Session Type | active | active | active | active |

TABLE 20

RTAQUEUEPARASETREQUEST.request message format

Function: RTAQUEUEPARASETREQUEST.request (STAAddress, RTAQueuePara)
When Generated: The SME of STA generates this message and passes it to its
    MLME when STA decides to set the parameters of a queue at another STA.
Effect of Receipt: When the MLME of STA receives this message, it transmits an
    RTA queue parameter setting request frame to the recipient STA.
Parameters:
    STAAddress - specifies recipient STA MAC address.
    RTAQueuePara - defined in FIG. 27, specifies RTA queue parameters to set.

TABLE 21

RTAQUEUEPARASETREQUEST.indicate message format

Function: RTAQUEUEPARASETREQUEST.indicate (STAAddress, RTAQueuePara)
When Generated: The MLME of STA generates this message and passes it to its
    SME when the MLME of STA receives an RTA queue parameter setting
    request frame.
Effect of Receipt: When the MLME of STA receives this message, it transmits an
    RTA queue parameter setting response frame to the recipient STA.
Parameters:
    STAAddress - specifies originator STA MAC address.
    RTAQueuePara - defined in FIG. 27, specifies RTA queue parameters to set.

TABLE 22

RTAQUEUEPARASETREQUEST.response message format

Function: RTAQUEUEPARASETREQUEST.response(STAAddress,
    RTAQueueSetResult)
When Generated: The SME of STA generates this message and transmits it to its
    MLME when the STA finishes queue parameter setting.
Effect of Receipt: When the MLME of STA receives this message, it transmits an
    RTA queue parameter setting response frame to the recipient STA.
Parameters:
    STAAddress - specifies originator STA MAC address.
    RTAQueueSetResult - an RTA Queue Parameter defined in FIG. 9 which
specifies whether the RTA Queue Parameter Setting was successful or not.

TABLE 23

RTAQUEUEPARASETREQUEST.confirm message format

Function: RTAQUEUEPARASETREQUEST.confirm(STAAddress,
    RTAQueueSetResult)
When Generated: The MLME of STA generates this message and passes it to its
    SME when the MLME of STA receives an RTA queue parameter setting
    response frame.
Effect of Receipt: When the SME of STA receives this message, it knows the RTA
    queue parameter setting is done by the recipient STA.
Parameters:
    STAAddress - specifies recipient STA MAC address.
    RTAQueueSetResult - an RTA Queue Parameter defined in FIG. 9 which
specifies whether the RTA Queue Parameter Setting was successful or not.

TABLE 24

RTAQUEUEPARASET.request message format

Function: RTAQUEUEPARASET.request (STAAddress, RTAQueuePara)
When Generated: The SME of STA generates this message and passes it to its
    MLME when STA decides to set queue parameters.
Effect of Receipt: When the MLME of STA receives this message, it sets the
    queue parameters and sends RTAQUEUEPARASET.confirm message
    back to SME.
Parameters:
    STAAddress - Specifies the MAC address of the STA who requests the queue
parameter setting.
    RTAQueueSetResult - an RTA Queue Parameter defined in FIG. 27 which
specifies the RTA queue parameters to set.

TABLE 25

RTAQUEUEPARASET.confirm message format

Function: RTAQUEUEPARASET.confirm (STAAddress, RTAQueueSetResult)
When Generated: The MLME of STA generates this message and passes it to its
    SME when the MLME of STA receives RTAQUEUEPARASET.request
    message from SME and reports the queue parameter setting results to
    SME.
Effect of Receipt: When the SME of STA receives this message, it knows the
    queue parameter setting is done by the MLME.
Parameters:
    STAAddress - Specifies the originator STA MAC address.
    RTAQueueSetResult - an RTA Queue Parameter defined in FIG. 9 which
specifies whether the RTA Queue Parameters Setting was successful or not.

TABLE 26

RTAKPIMREQUEST.request message format

Function: RTAKPIMREQUEST.request (STAAddress, RTAKpiMeasureMethod,
    RTAKpiReportMethod)
When Generated: The SME of STA generates this message and passes it to its
    MLME when STA decides to request an RTA KPI measurement at another
    STA

TABLE 26-continued

RTAKPIMREQUEST.request message format

Effect of Receipt: When the MLME of STA receives this message, it transmits an
   RTA KPI measure request frame to the recipient STA.
Parameters:
   STAAddress - Specifies the recipient STA MAC address.
   RTAKpiMeasureMethod - an RTA KPI Measure Method as defined in FIG. 32
which specifies the RTA KPI measure method.
   RTAKpiReportMethod - an RTA KPI Report Method as defined in FIG. 32
which specifies the RTA KPI report method.

TABLE 27

RTAKPIMREQUEST.indicate message format

Function: RTAKPIMREQUEST.indicate (STAAddress, RTAKpiMeasureMethod,
   RTAKpiReportMethod)
When Generated: The MLME of STA generates this message and passes it to its
   SME when the MLME of STA receives an RTA KPI measure request frame.
Effect of Receipt: When the SME of STA receives this message, it needs to
   measure RTA KPIs as requested by the message.
Parameters:
   STAAddress - Specifies the originator STA MAC address.
   RTAKpiMeasureMethod - an RTA KPI Measure Method as defined in FIG. 32
which specifies the RTA KPI measure method.
   RTAKpiReportMethod - an RTA KPI Report Method as defined in FIG. 32
which specifies the RTA KPI report method.

TABLE 28

RTAKPIMREPORT.request message format

Function: RTAKPIMREPORT.request(STAAddress,RTAKpiMeasureReport)
When Generated: The SME of STA generates this message and transmits it to its
   MLME when the STA finishes RTA KPI measurement and needs to report
   the measurement results to other STAs.
Effect of Receipt: When the MLME of STA receives this message, it transmits an
   RTA KPI measure response frame to the recipient STA.
Parameters:
   STAAddress - Specifies the originator STA MAC address.
   RTAKpiMeasureReport - an RTA KPI Measure Report as defined in FIG. 9
which carries the RTA KPI measurement report.

TABLE 29

RTAKPIMREPORT.confirm message format

Function: RTAKPIMREPORT.confirm(STAAddress, RTAQueueSetResult)
When Generated: The MLME of STA generates this message and passes it to its
   SME when the MLME of STA receives an RTA KPI measure response
   frame.
Effect of Receipt: When the SME of STA receives this message, it knows the RTA
   KPI measurement results at the recipient STA.
Parameters:
   STAAddress - Specifies the recipient STA MAC address.
   RTAKpiMeasureReport - an RTA KPI Measure Report as defined in FIG. 9
which carries the RTA KPI measurement report.

TABLE 30

RTAKPIMEASURE.request message format

Function: RTAKPIMEASURE.request ( STAAddress, RTAId, RTAKpiMRequire)
When Generated: The SME of STA generates this message and passes it to its
   MLME when STA decides to measure RTA KPIs.
Effect of Receipt: When the MLME of STA receives this message, it measures the
   RTA KPIs and sends RTA KPIMEASRE.confirm message back to SME.
Parameters:
   STAAddress - Specifies a MAC address of the STA who requested the RTA
KPI measure.
   RTAId - defined in FIG. 9, specifies information to identify the RTA traffic.

TABLE 30-continued

RTAKPIMEASURE.request message format

RTAKpiMRequire - an RTA KPI Measure Report as defined in FIG. 14 which specifies which RTA KPIs need to be measured.

TABLE 31

RTAKPIMEASURE.confirm message format

Function: RTAKPIMEASURE.confirm ( STAAddress, RTAId, RTAKpiMReport)
When Generated: The MLME of STA generates this message and passes it to its
    SME when the MLME of STA receives RTAKPIMEASURE.request
    message from SME and reports the RTA KPIs measurement results to
    SME.
Effect of Receipt: When the SME of STA receives this message, it receives the
    RTA KPIs measurement report from the MLME.
Parameters:
    STAAddress - Specifies the originator STA MAC address.
    RTAId - defined in FIG. 9, specifies information to identify the RTA traffic.
    RTAKpiMReport - an RTA KPI Measurement Report as defined in FIG. 14
which specifies the RTA KPI measurement results.

What is claimed is:

1. An apparatus for wireless communication in a network, the apparatus comprising:

(a) a wireless communication circuit for wirelessly communicating over a channel with at least one other wireless local area network (WLAN) station in its reception area;

(b) a processor coupled to said wireless communication circuit within a station (STA) configured for operating on the WLAN under IEEE 802.11 and utilizing an enhanced distributed channel access (EDCA) queue system; and (c) a non-transitory memory storing instructions executable by the processor for providing a real-time application (RTA) interface between a medium access control (MAC) layer and application (APP) layer in an open systems interconnection (OSI) model to support interworking communications;

(d) wherein said instructions, when executed by the processor, perform steps comprising:

(i) operating said wireless communication circuit as a WLAN station configured to support communicating real-time application (RTA) packets that are sensitive to communication delays as well as non-real time packets and distinguishing real-time application (RTA) packets from non-real-time application (non-RTA) packets;

(ii) wherein said instructions are configured in an open systems interconnection (OSI) model having at least an application (APP) layer that generates and receives application data, a network layer that determines a route to an end-to-end peer wireless communication circuit and a next hop peer wireless communication circuit device, a medium access control (MAC) layer for controlling wireless media access protocols, a physical (PHY) layer for transmitting and receiving physical signals to the next hop peer wireless communication circuit;

(iii) creating new internetworking between network layers by creating an RTA interface between the MAC layer and Application layers, which provides the APP layer the ability to control and monitor MAC layer functions through a MAC layer management entity (MLME) so that RTA packets in the RTA session obtain low latency service, while non-RTA packets obtain random channel access under a conventional OSI model using carrier sense multiple access/collision avoidance (CSMA/CA) mechanism;

(iv) wherein upon starting an RTA session, after prior negotiation from the APP layer for establishing RTA connection-oriented communications, an RTA session identifier is created with information on type of service, source port and destination port; wherein when passed traffic from upper layers which is to be transmitted, the MAC layer extracts information embedded in the traffic and compares this with the RTA session identifiers to determine if this is RTA traffic and sends packets having a MAC header identifying the RTA session; and wherein the PHY layer upon receiving a packet checks its MAC header for RTA session information to determine it this is RTA traffic;

(v) generating a request by the application (APP) layer of the STA requesting the MAC layer to start a new session with a given set of requirements;

(vi) monitoring the channel by the MAC layer and obtaining key performance indicators (KPIs) to derive a response to the APP layer;

(vii) either accepting or rejecting the request to start a new session by the APP layer by the MAC layer according to the RTA session requirements and measured KPIs; and (viii) reissuing the request to start a new session by the APP layer with adjusted parameters if the new session initiation gets rejected.

2. The apparatus of claim 1, wherein said instructions when executed by the processor further perform one or more steps comprising the APP layer starting a new RTA session at the MAC layer and setting a lifetime value for RTA packets to provide queue management.

3. The apparatus of claim 1, wherein said instructions when executed by the processor further perform one or more steps comprising the APP layer starting a new RTA session at the MAC layer and setting a priority value for RTA packets to provide queue management.

4. The apparatus of claim 1, wherein said instructions when executed by the processor further perform one or more steps comprising the APP layer starting a new RTA session at the MAC layer and setting a target packet loss rate for RTA packets.

5. The apparatus of claim 4, wherein said instructions when executed by the processor further perform one or more steps comprising the MAC layer of the station setting the target packet loss rate as a target packet loss rate to adjust Modulation and Coding Scheme (MCS) and a retry limit for RTA packets.

6. The apparatus of claim 4, wherein said instructions when executed by the processor further perform one or more steps comprising the MAC layer of the station setting the target packet loss rate as the target packet loss rate for duplicating packet transmissions or multi-link transmissions.

7. The apparatus of claim 1, wherein said instructions when executed by the processor further perform one or more steps comprising the APP layer starting a new RTA session at the MAC layer and setting a requested latency for RTA packets.

8. The apparatus of claim 1, wherein said instructions when executed by the processor further perform one or more steps comprising the MAC layer monitoring the channel and measuring key performance indicators (KPIs) of the channel.

9. The apparatus of claim 8, wherein said key performance indicators (KPIs) of the channel are selected from the group of performance indicators consisting of bandwidth, Modulation and Coding Scheme (MCS), channel access rate, packet error rate (PER), and the time ratio that channel is used for transmitting packets.

10. The apparatus of claim 8, wherein said instructions when executed by the processor further perform one or more steps comprising the MAC layer measuring said key performance indicators (KPIs) of the channel utilizing measurement results for duplicating packet transmissions or multi-link transmissions.

11. The apparatus of claim 1, wherein said instructions when executed by the processor further perform one or more steps comprising the MAC layer monitoring the channel obtaining statistics on said key performance indicators (KPIs) of packet latency and comparing them with RTA requested latency.

12. The apparatus of claim 11, wherein said instructions when executed by the processor further perform one or more steps comprising the MAC layer in obtaining the statistics on said key performance indicators (KPIs) of packet latency and comparing them with RTA requested latency, utilizes the timestamp at the MAC layer.

13. The apparatus of claim 12, wherein said instructions when executed by the processor further perform one or more steps comprising the MAC layer obtaining the statistics of packet latency performing measurements of latency at both transmitter and the receiver.

14. The apparatus of claim 11, wherein said instructions when executed by the processor further perform one or more steps comprising the MAC layer obtaining the statistics of packet latency performing a measurement of average retransmission rate.

15. The apparatus of claim 1, wherein said instructions when executed by the processor further perform one or more steps comprising the MAC layer monitoring the channel and measuring a key performance indicator (KPI) of packet arrival rate in determining an average time and standard deviations between channel vacancy and average time between channel occupancy.

16. The apparatus of claim 15, wherein said instructions when executed by the processor further perform one or more steps comprising the MAC layer utilizing the measuring of the packet arrival rate for scheduling packet transmissions or to performing polling based on the requested packet arrival rate during an RTA session.

17. The apparatus of claim 1, wherein said instructions when executed by the processor further perform one or more steps comprising the MAC layer performs monitoring of the channel and measuring key performance indicators (KPIs) of queue status.

18. The apparatus of claim 17, wherein said instructions when executed by the processor further perform one or more steps comprising the MAC layer performing monitoring of the channel and measuring the key performance indicators (KPIs), including current queue size.

19. The apparatus of claim 1, wherein said instructions when executed by the processor further perform one or more steps comprising the MAC layer monitoring the channel and measuring key performance indicators (KPIs) as well as recording history information on changes in packet traffic.

20. The apparatus of claim 1, wherein said instructions when executed by the processor further perform one or more steps comprising the MAC layer monitoring the channel and measuring key performance indicators (KPIs) and comparing measured KPIs with RTA session requirements and rejecting an RTA session initiation if measured KPIs do not satisfy the RTA session requirements.

21. The apparatus of claim 1, wherein said instructions when executed by the processor further perform one or more steps comprising the MAC layer rejecting a new RTA session performs reporting of key performance indicators (KPIs) obtained at the MAC layer to the APP layer.

22. The apparatus of claim 1, wherein said instructions when executed by the processor further perform one or more steps comprising the MAC layer rejecting a new RTA session and suggesting to the APP layer operating parameters for creating a new RTA session.

23. An apparatus for wireless communication in a network, the apparatus comprising:
(a) a wireless communication circuit for wirelessly communicating over a channel with at least one other wireless local area network (WLAN) station in its reception area;
(b) a processor coupled to said wireless communication circuit within a station (STA) configured for operating on the WLAN; and
(c) a non-transitory memory storing instructions executable by the processor for providing a real-time application (RTA) interface between a medium access control (MAC) layer and application (APP) layer in an open systems interconnection (OSI) model to support interworking communications;
(d) wherein said instructions, when executed by the processor, comprising:
(i) operating said wireless communication circuit as a WLAN station configured to support communicating real-time application (RTA) packets that are sensitive to communication delays as well as non-real time packets and distinguishing real-time application (RTA) packets from non-real-time application (non-RTA) packets;
(ii) wherein said instructions are configured in an open systems interconnection (OSI) model having at least an application (APP) layer that generates and receives application data, a network layer that determines a route to an end-to-end peer wireless communication circuit and a next hop peer wireless communication circuit device, a medium access control (MAC) layer for controlling wireless media access protocols, a physical (PHY) layer for transmitting and receiving physical signals to the next hop peer wireless communication circuit;

(iii) creating new internetworking between network layers by creating an RTA interface between the MAC layer and Application layers, which provides the APP layer the ability to control and monitor MAC layer functions through a MAC layer management entity (MLME) so that RTA packets in the RTA session obtain low latency service, while non-RTA packets obtain random channel access under a conventional OSI model using carrier sense multiple access/collision avoidance (CSMA/CA) mechanism;

(iv) wherein upon starting an RTA session, after prior negotiation from the APP layer for establishing RTA connection-oriented communications, an RTA session identifier is created with information on type of service, source port and destination port; wherein when passed traffic from upper layers which is to be transmitted, the MAC layer extracts information embedded in the traffic and compares this with the RTA session identifiers to determine if this is RTA traffic and sends packets having a MAC header identifying the RTA session; and wherein the PHY layer upon receiving a packet checks its MAC header for RTA session information to determine it this is RTA traffic;

(v) generating a request by the application (APP) layer of the STA requesting the MAC layer to start a new session with a given set of requirements;

(vi) monitoring the channel by the MAC layer and obtaining key performance indicators (KPIs) to derive a response to the APP layer;

(vii) either accepting or rejecting the request to start a new session by the APP layer at the MAC layer according to the RTA session requirements and measured KPIs;

(viii) wherein if the request to start a new session by the APP layer at the MAC layer is accepted, then the APP layer starts a new RTA session at the MAC layer and either: (A) sets a lifetime value for RTA packets to provide queue management, or (B) sets a priority value for RTA packets to provide queue management, or (C) sets a requested latency for RTA packets, or (D) sets a target packet loss rate for RTA packets as either a target packet loss rate to adjust Modulation and Coding Scheme (MCS) and a retry limit for RTA packets, or as a target packet loss rate for duplicating packet transmissions or multi-link transmissions; and (ix) reissuing the request to start a new session by the APP layer with adjusted parameters if the new session initiation gets rejected.

24. A method for wireless communication in a network, the method comprising:

(a) operating a wireless communication circuit as a WLAN station for wirelessly communicating over a channel with at least one other wireless local area network (WLAN) station in its reception area, said station being configured to support communicating real-time application (RTA) packets that are sensitive to communication delays as well as non-real time packets and distinguishing real-time application (RTA) packets from non-real-time application (non-RTA) packets;

(b) wherein said instructions are configured in an open systems interconnection (OSI) model having at least an application (APP) layer that generates and receives application data, a network layer that determines a route to an end-to-end peer wireless communication circuit and a next hop peer wireless communication circuit device, a medium access control (MAC) layer for controlling wireless media access protocols, a physical (PHY) layer for transmitting and receiving physical signals to the next hop peer wireless communication circuit;

(c) creating new internetworking between network layers by creating an RTA interface between the MAC layer and Application layers, which provides the APP layer the ability to control and monitor MAC layer functions through a MAC layer management entity (MLME) so that RTA packets in the RTA session obtain low latency service, while non-RTA packets obtain random channel access under a conventional OSI model using carrier sense multiple access/collision avoidance (CSMA/CA) mechanism;

(d) wherein upon starting an RTA session, after prior negotiation for establishing RTA connection-oriented communications, an RTA session identifier is created with information on type of service, source port and destination port; wherein when passed traffic from upper layers which is to be transmitted, the MAC layer extracts information embedded in the traffic and compares this with the RTA session identifiers to determine if this is RTA traffic and sends packets having a MAC header identifying the RTA session; and wherein the PHY layer upon receiving a packet checks its MAC header for RTA session information to determine it this is RTA traffic;

(e) generating a request by the application (APP) layer of the STA requesting the MAC layer to start a new session with a given set of requirements;

(f) monitoring the channel by the MAC layer and obtaining key performance indicators (KPIs) to derive a response to the APP layer;

(g) either accepting or rejecting the request to start a new session by the APP layer by the MAC layer according to the RTA session requirements and measured KPIs;

(h) reissuing the request to start a new session by the APP layer with adjusted parameters if the new session initiation gets rejected; and (i) wherein said method is performed by a processor executing instructions stored on a non-transitory medium.

\* \* \* \* \*